US012792061B2

(12) United States Patent
Rosencrance et al.

(10) Patent No.: US 12,792,061 B2
(45) Date of Patent: Nov. 10, 2026

(54) CART

(71) Applicant: Oshkosh Corporation, Oshkosh, WI (US)

(72) Inventors: Devin Rosencrance, Oshkosh, WI (US); Tyler Adkins, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 26 days.

(21) Appl. No.: 19/086,976

(22) Filed: Mar. 21, 2025

(65) Prior Publication Data

US 2025/0346273 A1 Nov. 13, 2025

Related U.S. Application Data

(60) Provisional application No. 63/775,273, filed on Mar. 20, 2025, provisional application No. 63/741,710, (Continued)

(51) Int. Cl.
*B60D 1/14* (2006.01)
*B60D 1/155* (2006.01)
(Continued)

(52) U.S. Cl.
CPC ............. *G05D 1/656* (2024.01); *B60D 1/155* (2013.01); *B60D 1/62* (2013.01); *B60K 1/00* (2013.01);
(Continued)

(58) Field of Classification Search
CPC ........ G05D 1/656; G05D 1/667; G05D 1/622; G05D 1/693; G05D 1/644; G05D 1/639; G05D 1/637; G05D 1/69; G05D 1/246; G05D 2111/17; G05D 2111/20; G05D 2105/45; G05D 2101/22; G05D 2107/70; B60L 50/60; B60L 58/12; G01S 17/931; G01S 7/4811; B60D 1/155; B60D 1/62;
(Continued)

(56) References Cited

U.S. PATENT DOCUMENTS 3,879,053 A * 4/1975 Chvala ...................... B62B 3/02
280/47.12
4,286,918 A 9/1981 Shannon
(Continued)

FOREIGN PATENT DOCUMENTS

CN 106629482 A 5/2017
CN 209833735 U 12/2019
(Continued)

*Primary Examiner* — Karen Beck
*Assistant Examiner* — Matthew James O'Neill
(74) *Attorney, Agent, or Firm* — Foley & Lardner LLP

(57) ABSTRACT

A cart includes a chassis including one or more frame members, one or more casters, a first channel and a second channel coupled to the chassis, the first channel defining a longitudinal axis and the second channel defining a lateral axis. The first channel and the second channel each include a pair of guides each including a first portion and a second portion and a flat member coupling the guide to the frame members. The first portions extend substantially parallel to one another. The second portions are angled to increase a distance between the second portions as the second portions extend away from the first portions.

20 Claims, 38 Drawing Sheets

Related U.S. Application Data filed on Jan. 3, 2025, provisional application No. 63/741,768, filed on Jan. 3, 2025, provisional application No. 63/712,647, filed on Oct. 28, 2024, provisional application No. 63/712,602, filed on Oct. 28, 2024, provisional application No. 63/712,621, filed on Oct. 28, 2024, provisional application No. 63/712,662, filed on Oct. 28, 2024, provisional application No. 63/713,023, filed on Oct. 28, 2024, provisional application No. 63/643,617, filed on May 7, 2024, provisional application No. 63/643,723, filed on May 7, 2024, provisional application No. 63/643,627, filed on May 7, 2024, provisional application No. 63/643,541, filed on May 7, 2024, provisional application No. 63/643,653, filed on May 7, 2024, provisional application No. 63/643,788, filed on May 7, 2024, provisional application No. 63/643,528, filed on May 7, 2024, provisional application No. 63/643,631, filed on May 7, 2024, provisional application No. 63/643,608, filed on May 7, 2024.

(51) Int. Cl.

| | |
|---|---|
| ***B60D 1/62*** | (2006.01) |
| ***B60K 1/00*** | (2006.01) |
| ***B60L 50/60*** | (2019.01) |
| ***B60L 58/12*** | (2019.01) |
| ***B60P 1/02*** | (2006.01) |
| ***B60P 3/06*** | (2006.01) |
| ***B60P 7/13*** | (2006.01) |
| ***B60R 16/08*** | (2006.01) |
| ***B62B 3/02*** | (2006.01) |
| ***B62B 3/04*** | (2006.01) |
| ***B62B 5/00*** | (2006.01) |
| ***B62D 21/02*** | (2006.01) |
| ***B62D 33/08*** | (2006.01) |
| ***B62D 65/18*** | (2006.01) |
| ***B66F 9/06*** | (2006.01) |
| ***B66F 9/065*** | (2006.01) |
| ***B66F 9/075*** | (2006.01) |
| ***B66F 9/20*** | (2006.01) |
| ***G01C 21/20*** | (2006.01) |
| ***G01S 7/481*** | (2006.01) |
| ***G01S 17/931*** | (2020.01) |
| ***G05B 19/418*** | (2006.01) |
| ***G05D 1/246*** | (2024.01) |
| ***G05D 1/622*** | (2024.01) |
| ***G05D 1/639*** | (2024.01) |
| ***G05D 1/644*** | (2024.01) |
| ***G05D 1/656*** | (2024.01) |
| ***G05D 1/667*** | (2024.01) |
| ***G05D 1/69*** | (2024.01) |
| ***G05D 1/693*** | (2024.01) |
| ***G07C 5/02*** | (2006.01) |
| ***G07C 5/08*** | (2006.01) |
| *B62B 3/00* | (2006.01) |
| *B62B 3/06* | (2006.01) |
| *B62B 3/14* | (2006.01) |
| *B62B 3/16* | (2006.01) |
| *B62B 5/06* | (2006.01) |
| *B62B 5/08* | (2006.01) |
| *B62B 7/06* | (2006.01) |
| *B62D 51/02* | (2006.01) |
| *B66F 7/00* | (2006.01) |
| *B66F 7/06* | (2006.01) |
| *B66F 7/08* | (2006.01) |
| *G05D 101/00* | (2024.01) |
| *G05D 105/28* | (2024.01) |
| *G05D 105/45* | (2024.01) |
| *G05D 107/70* | (2024.01) |
| *G05D 109/10* | (2024.01) |
| *G05D 111/10* | (2024.01) |
| *G05D 111/20* | (2024.01) |

(52) U.S. Cl.

CPC ............... *B60L 50/60* (2019.02); *B60L 58/12* (2019.02); *B60P 1/02* (2013.01); *B60P 3/06* (2013.01); *B60P 7/13* (2013.01); *B60R 16/08* (2013.01); *B62B 3/022* (2013.01); *B62B 3/04* (2013.01); *B62B 5/0033* (2013.01); *B62D 21/02* (2013.01); *B62D 33/08* (2013.01); *B62D 65/18* (2013.01); *B66F 9/063* (2013.01); *B66F 9/065* (2013.01); *B66F 9/0755* (2013.01); *B66F 9/205* (2013.01); *G01C 21/20* (2013.01); *G01S 7/4811* (2013.01); *G01S 17/931* (2020.01); *G05B 19/41865* (2013.01); *G05D 1/246* (2024.01); *G05D 1/2469* (2024.01); *G05D 1/622* (2024.01); *G05D 1/637* (2024.01); *G05D 1/639* (2024.01); *G05D 1/644* (2024.01); *G05D 1/667* (2024.01); *G05D 1/69* (2024.01); *G05D 1/693* (2024.01); *G07C 5/02* (2013.01); *G07C 5/0825* (2013.01); *G07C 5/0833* (2013.01); *B62B 3/00* (2013.01); *B62B 3/02* (2013.01); *B62B 3/06* (2013.01); *B62B 3/0606* (2013.01); *B62B 3/0612* (2013.01); *B62B 3/0618* (2013.01); *B62B 3/0625* (2013.01); *B62B 3/0631* (2013.01); *B62B 3/0643* (2013.01); *B62B 3/1476* (2013.01); *B62B 3/16* (2013.01); *B62B 5/0036* (2013.01); *B62B 5/0043* (2013.01); *B62B 5/005* (2013.01); *B62B 5/0053* (2013.01); *B62B 5/064* (2013.01); *B62B 5/065* (2013.01); *B62B 5/087* (2013.01); *B62B 7/06* (2013.01); *B62B 2203/07* (2013.01); *B62B 2203/10* (2013.01); *B62B 2203/13* (2013.01); *B62B 2203/60* (2013.01); *B62B 2205/003* (2013.01); *B62B 2205/04* (2013.01); *B62B 2205/06* (2013.01); *B62B 2205/20* (2013.01); *B62B 2205/26* (2013.01); *B62B 2205/30* (2013.01); *B62B 2206/06* (2013.01); *B62D 51/02* (2013.01); *B66F 7/00* (2013.01); *B66F 7/06* (2013.01); *B66F 7/065* (2013.01); *B66F 7/0658* (2013.01); *B66F 7/0666* (2013.01); *B66F 7/08* (2013.01); *B66F 7/085* (2013.01); *G05B 2219/45067* (2013.01); *G05D 2101/22* (2024.01); *G05D 2105/28* (2024.01); *G05D 2105/45* (2024.01); *G05D 2107/70* (2024.01); *G05D 2109/10* (2024.01); *G05D 2111/17* (2024.01); *G05D 2111/20* (2024.01)

(58) Field of Classification Search

CPC ...... B60K 1/00; B60P 1/02; B60P 3/06; B60P 7/13; B60R 16/08; B62B 3/022; B62B 3/04; B62B 5/0033; B62D 21/02; B62D 33/08; B62D 65/18; B66F 9/063; B66F 9/065; B66F 9/0755; B66F 9/205; G01C 21/20; G05B 19/41865; G07C 5/02; G07C 5/0825; G07C 5/0833

See application file for complete search history.

(56) References Cited

U.S. PATENT DOCUMENTS

| | | | |
|---|---|---|---|
| 5,848,658 | A | 12/1998 | Pulver |
| 5,944,131 | A | 8/1999 | Schaffner et al. |
| 6,129,165 | A | 10/2000 | Schaffner et al. |
| 6,176,335 | B1 | 1/2001 | Schaffner et al. |
| 6,460,641 | B1 | 10/2002 | Kral |
| 6,601,863 | B1 | 8/2003 | Mentessi et al. |
| 8,113,531 | B2 | 2/2012 | Zhou et al. |
| 9,009,893 | B2 | 4/2015 | Menkedick et al. |
| 9,079,662 | B1 | 7/2015 | Duffy et al. |
| 10,134,278 | B1 | 11/2018 | Konrardy et al. |
| 11,155,247 | B1 | 10/2021 | Ebrahimi Afrouzi et al. |
| 2004/0004342 | A1 | 1/2004 | Mulhern et al. |
| 2005/0127631 | A1 | 6/2005 | Schaffner |
| 2007/0100501 | A1 | 5/2007 | Im et al. |
| 2009/0236574 | A1 | 9/2009 | Smith |
| 2011/0036084 | A1 | 2/2011 | Mallan et al. |
| 2011/0042164 | A1 | 2/2011 | Clark et al. |
| 2011/0083913 | A1 | 4/2011 | Cuson et al. |
| 2012/0261204 | A1 | 10/2012 | Won |
| 2013/0190981 | A1 | 7/2013 | Dolinar et al. |
| 2013/0207364 | A1 | 8/2013 | Bekoscke et al. |
| 2016/0243988 | A1 | 8/2016 | Peterson et al. |
| 2016/0327383 | A1 | 11/2016 | Becker et al. |
| 2017/0219713 | A1 | 8/2017 | Gruver et al. |
| 2017/0355295 | A1 | 12/2017 | Gutowitz |
| 2018/0065242 | A1 | 3/2018 | Tanaka et al. |
| 2018/0129220 | A1 | 5/2018 | Beach et al. |
| 2018/0180719 | A1 | 6/2018 | Bier |
| 2018/0339890 | A1 | 11/2018 | Perlstein |
| 2019/0092364 | A1 | 3/2019 | Pettinato et al. |
| 2019/0110125 | A1 | 4/2019 | Ramalingam et al. |
| 2019/0176328 | A1 | 6/2019 | Kichkaylo et al. |
| 2019/0193711 | A1 | 6/2019 | Deshpande et al. |
| 2019/0299393 | A1 | 10/2019 | Mehmet et al. |
| 2019/0330822 | A1 | 10/2019 | Whiteman |
| 2019/0384280 | A1 | 12/2019 | Osawa et al. |
| 2020/0031266 | A1 | 1/2020 | Cassway et al. |
| 2020/0108678 | A1 | 4/2020 | Pierce |
| 2020/0150655 | A1 | 5/2020 | Artes et al. |
| 2020/0163815 | A1 | 5/2020 | Puschmann et al. |
| 2020/0238906 | A1 | 7/2020 | Yoshizaki et al. |
| 2020/0239055 | A1 | 7/2020 | Carlson et al. |
| 2020/0377113 | A1 | 12/2020 | Whikehart et al. |
| 2021/0018617 | A1 | 1/2021 | Iwase et al. |
| 2021/0061312 | A1 | 3/2021 | Wang |
| 2021/0163226 | A1 | 6/2021 | Worden et al. |
| 2021/0244479 | A1 | 8/2021 | Wassall et al. |
| 2022/0019237 | A1 | 1/2022 | Lee et al. |
| 2022/0116546 | A1 | 4/2022 | Gummadi et al. |
| 2022/0214170 | A1 | 7/2022 | Singh et al. |
| 2022/0258979 | A1 | 8/2022 | Helsel et al. |
| 2022/0371868 | A1 | 11/2022 | Barlow et al. |
| 2023/0025647 | A1 | 1/2023 | Kanemoto et al. |
| 2023/0027627 | A1 | 1/2023 | Schmitt et al. |
| 2023/0255840 | A1 | 8/2023 | Dupuy et al. |
| 2023/0277397 | A1 | 9/2023 | Monson et al. |
| 2023/0278475 | A1 | 9/2023 | Steffens et al. |
| 2023/0286565 | A1 | 9/2023 | Armbrust et al. |
| 2023/0311991 | A1 | 10/2023 | Fisher et al. |
| 2024/0114839 | A1 | 4/2024 | Peter |
| 2024/0124282 | A1 | 4/2024 | Kritzer |
| 2024/0124285 | A1 | 4/2024 | Neubauer et al. |
| 2024/0147888 | A1 | 5/2024 | Kakkar et al. |
| 2024/0199399 | A1 | 6/2024 | Neubauer et al. |
| 2024/0308791 | A1 | 9/2024 | Warrier et al. |
| 2024/0393212 | A1 | 11/2024 | Iwahori et al. |
| 2025/0091671 | A1 | 3/2025 | Hatano et al. |
| 2025/0100797 | A1 * | 3/2025 | Nishar .................. B66F 11/042 |
| 2025/0136162 | A1 | 5/2025 | Newkirk et al. |
| 2025/0162850 | A1 | 5/2025 | Miller et al. |
| 2025/0178678 | A1 | 6/2025 | Leblanc et al. |
| 2025/0207359 | A1 | 6/2025 | Ready-Campbell et al. |
| 2025/0223142 | A1 | 7/2025 | Le et al. |
| 2025/0298418 | A1 | 9/2025 | Rangamannar et al. |
| 2026/0030417 | A1 | 1/2026 | Sheehan et al. |

FOREIGN PATENT DOCUMENTS

| | | | |
|---|---|---|---|
| CN | 110862048 | A | 3/2020 |
| CN | 112339824 | A | 2/2021 |
| CN | 214112416 | U | 9/2021 |
| CN | 219098659 | U | 5/2023 |
| GB | 2 053 157 | A | 2/1981 |
| GB | 2 616 640 | A | 9/2023 |
| KR | 20130043092 | A | 4/2013 |
| WO | WO-2006/112857 | A2 | 10/2006 |
| WO | WO-2019/130421 | A1 | 7/2019 |

* cited by examiner

CART

CROSS-REFERENCE TO RELATED PATENT APPLICATIONS

This application claims the benefit of and priority to (a) U.S. Provisional Patent Application 63/643,653, filed on May 7, 2024, (b) U.S. Provisional Patent Application 63/643,631, filed on May 7, 2024, (c) U.S. Provisional Patent Application 63/643,541, filed on May 7, 2024, (d) U.S. Provisional Patent Application 63/643,627, filed on May 7, 2024, (e) U.S. Provisional Patent Application 63/643,723, filed on May 7, 2024, (f) U.S. Provisional Patent Application 63/643,528, filed on May 7, 2024, (g) U.S. Provisional Patent Application 63/643,788, filed on May 7, 2024, (h) U.S. Provisional Patent Application 63/643,617, filed on May 7, 2024, (i) U.S. Provisional Patent Application 63/643,608, filed on May 7, 2024, (j) U.S. Provisional Patent Application 63/712,602, filed on Oct. 28, 2024, (k) U.S. Provisional Patent Application 63/712,621, filed on Oct. 28, 2024, (1) U.S. Provisional Patent Application 63/713,023, filed on Oct. 28, 2024, (m) U.S. Provisional Patent Application 63/712,662, filed on Oct. 28, 2024, (n) U.S. Provisional Patent Application 63/712,647, filed on Oct. 28, 2024, (o) U.S. Provisional Patent Application 63/741,768, filed on Jan. 3, 2025, (p) U.S. Provisional Patent Application 63/741,710, filed on Jan. 3, 2025, and (q) U.S. Provisional Patent Application 63/775,273, filed on Mar. 20, 2025, each of which is incorporated herein by reference in its entirety.

BACKGROUND

The present disclosure relates generally to vehicles. More specifically, the present disclosure relates to vehicles utilized to transport material.

In a manufacturing environment, products are moved along a manufacturing line as various assembly processes are performed. In some such embodiments, the products are supported and/or propelled by vehicles. These vehicles may have varying ways of supporting the products and may incorporate varying levels of autonomy.

SUMMARY

In an exemplary embodiment, a cart includes: a chassis including one or more frame members, the chassis including a platform configured to support a product; one or more casters coupled to the chassis and configured to support the chassis; and a first channel and a second channel coupled to the chassis, the first channel extending along a longitudinal axis and the second channel extending along a lateral axis, the first channel and the second channel each including: a first guide and a second guide offset from one another and each including a first portion and a second portion, wherein the first portions extend substantially parallel to one another, and wherein the second portions extend away from one another as the second portions extend away from the first portions.

In another exemplary embodiment, a cart includes: a chassis; a caster supporting the chassis; a first channel and a second channel coupled to the chassis, the first channel extending along a longitudinal axis and the second channel extending along a lateral axis, the first channel and the second channel each including: a pair of guides each including a first portion and a second portion; a flat member coupling the guides to the chassis; and a pair of ramps coupled to the flat member, wherein each ramp slopes downward from the flat member; and a frame plate extending between one of the guides of the first channel and one of the guides of the second channel.

In another exemplary embodiment, a cart includes: a chassis including one or more frame members and one or more support members extending between adjacent frame members; one or more legs extending downward from the from the chassis; one or more casters coupled to each of the one or more legs; a first channel and a second channel coupled to a bottom portion of the chassis, the first channel defining a longitudinal axis and the second channel defining a lateral axis, the first channel and the second channel each including: a pair of guides each including a first portion and a second portion, wherein the first portions extend substantially parallel to one another, and wherein the second portions are angled to increase a distance between the second portions as the second portions extend away from the first portions; a flat member coupling the guide to the frame members; and one or more positioning members coupled to the flat member; one or more frame plates extending between adjacent portions of the first channel and the second channel; a third channel and a fourth channel coupled to a top portion of the chassis, each of the third channel and the fourth channel configured to receive a cradle; an actuator coupled to the chassis and configured to reposition the cradle; and a first switch and a second switch coupled to the top portion of the chassis, wherein the first switch is configured to control movement of the actuator when operated simultaneously with the second switch.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a cart may include a chassis or frame, a platform, one or more wheels or casters, and one or more channels. The channels include a guide, a flat member, and a positioning mechanism. The guide includes a first portion along an axis defined by the channels and a second portion angled relative to the first portion. The flat member couples the guides to the frame. The positioning mechanism is angled relative to the flat member and configured to retract upon engagement.

Referring generally to the figures, a cart interface or coupling assembly may be coupled to a frame of vehicle to detachably couple the vehicle to a cart. More specifically, the cart interface may be coupled to a top surface of the vehicle. The cart interface includes an actuator coupled to a mounting interface, which is configured to be mounted to the top surface of the vehicle. The actuator engages a cam plate coupled to one or more pin assemblies configured to engage a bottom portion of the cart. In some embodiments, the one or more pin assemblies engage the bottom portion of the cart to couple the vehicle to the cart. The pin assemblies may be overextended to lift up on the cart, increasing the weight supported by the vehicle and increasing the traction of a drivetrain of the vehicle.

Overall Vehicle

Figure 1:
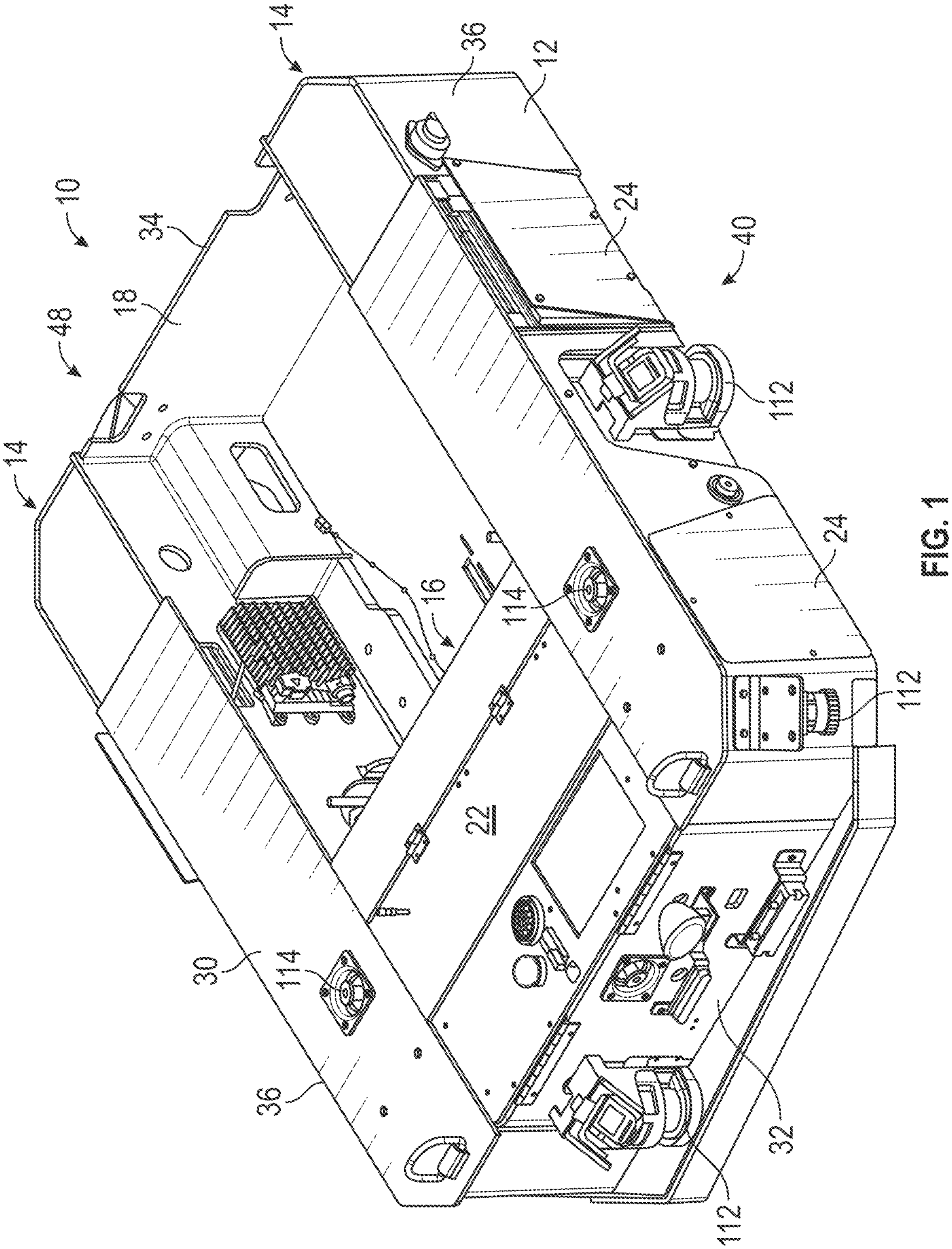
FIG. 1 is a perspective view of a vehicle according to an exemplary embodiment.
Figure 2:
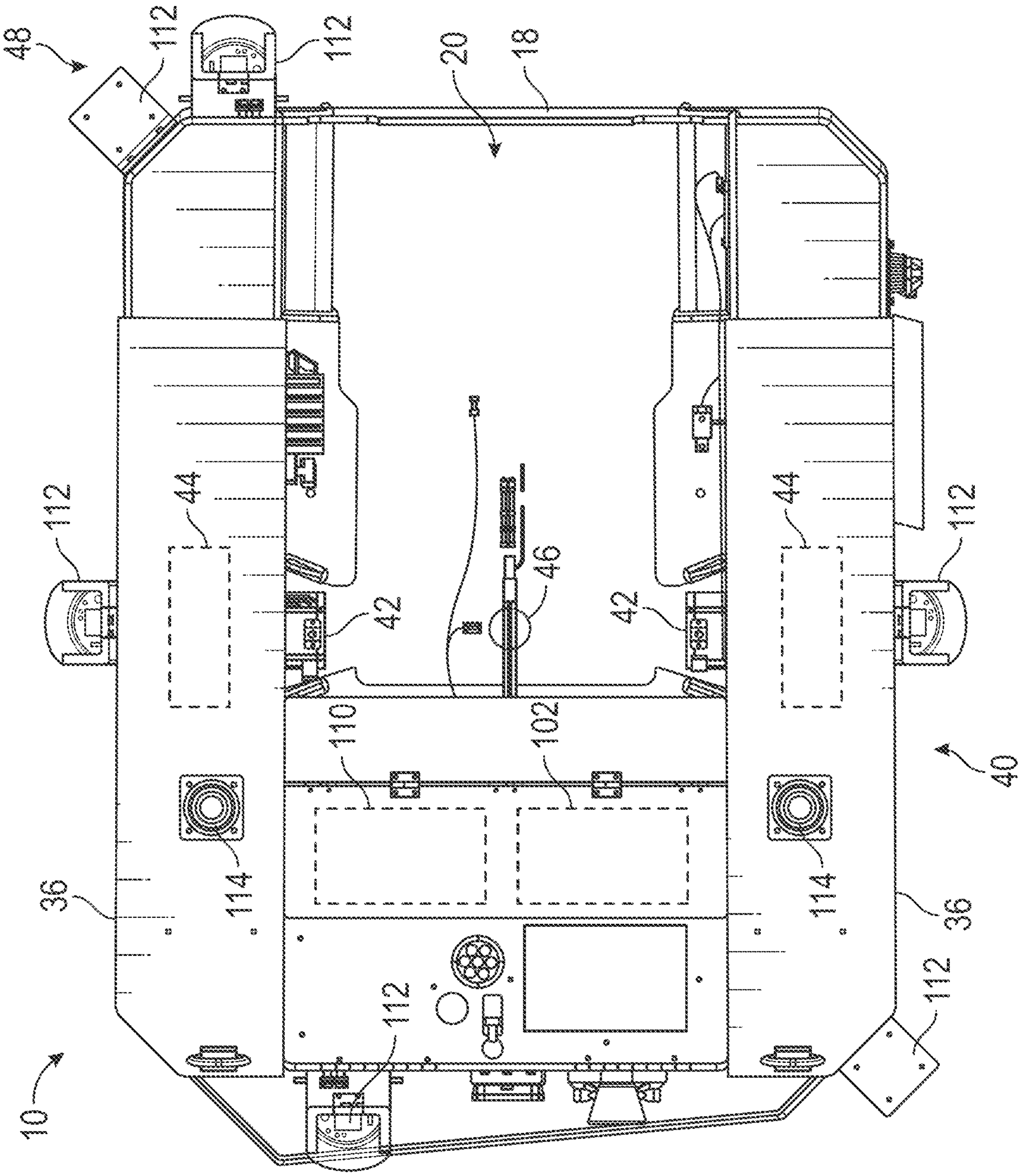
FIG. 2 is a top view of the vehicle of FIG. 1.

Referring to FIGS. 1 and 2, a machine, vehicle, trolley, transport, hauler, mule, or tug, is shown as vehicle 10 according to an exemplary embodiment. The vehicle 10 may be configured to support, push, pull, turn, or otherwise facilitate movement of a product or components of a product throughout a manufacturing environment. By way of example, the vehicle 10 may move a product (e.g., another vehicle or machine) along a manufacturing line as the product is assembled. The vehicle 10 may move the product between stations where different assembly operations are performed. Additionally or alternatively, the vehicle 10 may be used to move parts or subassemblies (e.g., booms, engines, tires, etc.) throughout the manufacturing environment (e.g., to the product, to a storage area, etc.).

The vehicle 10 may be manually controlled, partially autonomous, or fully autonomous. In some embodiments, the vehicle 10 is configured as a semi-automated guided vehicle (SGV). When configured as an SGV, the vehicle 10 may be manually operated by an operator (e.g., through a wireless or tethered user interface). By way of example, the operator may manually control the steering of the vehicle 10. In some embodiments, the vehicle 10 is configured as an automated guided vehicle (AGV). When configured as an AGV, the vehicle 10 may navigate along a predefined route (e.g., using a magnetic strip or other fixed navigation element). If the vehicle 10 configured as an AGV encounters an obstacle, the vehicle 10 may rely on manual intervention from an operator (e.g., through a user interface) to correct course and navigate around the obstacle. In some embodiments, the vehicle 10 is configured as an autonomous mobile robot (AMR). When configured as an AMR, the vehicle 10 may autonomously navigate through an area without requiring a predefined path. The vehicle 10 configured as an AMR may avoid obstacles without manual intervention by an operator.

The vehicle 10 includes a chassis, shown as frame 12, that supports the other components of the vehicle 10. In some embodiments, the frame 12 defines an enclosure that contains one or more components of the vehicle 10. The frame 12 includes a pair of side portions, shown as drive modules 14, a central portion, shown as controls enclosure 16, and a lateral member, shown as back plate 18. The drive modules 14 each extend longitudinally along the vehicle 10 and are laterally offset from one another. The controls enclosure 16 and the back plate 18 each extend laterally between the drive modules 14, fixedly coupling the drive modules 14 to one another. The controls enclosure 16 and the back plate 18 are longitudinally offset from one another, such that a recess or passage, shown as implement recess 20, is defined between the controls enclosure 16, the back plate 18, and the drive modules 14.

The drive modules 14 may contain components that facilitate propulsion of the vehicle (e.g., the drivetrain 40). The drive modules 14 may include one or more removable or repositionable panels, shown as drive module doors 24, that facilitate access to components within the drive modules 14 from outside of the vehicle 10. The controls enclosure 16 may contain components that facilitate powering or control over the vehicle (e.g., the controller 102, the batteries 110). The controls enclosure 16 includes a removable or repositionable panel, shown as controls enclosure door 22, that facilitates access to components within the controls enclosure 16 from outside of the vehicle 10. In other embodiments, the vehicle 10 includes a separate housing, body, or enclosure that is coupled to the frame 12 and contains one or more components of the vehicle.

The frame 12 defines a top surface 30, a front surface 32, a rear surface 34, and a pair of side surfaces 36 of the vehicle 10. The top surface 30 extends substantially horizontally across the drive modules 14 and the controls enclosure 16. A distance from the top surface 30 to the ground beneath the vehicle 10 may define a height of the vehicle 10. The front surface 32 is positioned at a front end portion of the frame 12 and extends substantially vertically and laterally across the drive modules 14 and the controls enclosure 16. The rear surface 34 is positioned at a rear end portion of the frame 12 and extends substantially vertically and laterally across the drive modules 14 and the back plate 18. The side surfaces 36 each extend longitudinally along one of the drive modules 14, between the front surface 32 and the rear surface 34.

The vehicle 10 includes a drive system or driveline, shown as drivetrain 40, that is configured to propel and steer the vehicle 10. The driveline includes a pair of actuators or motors (e.g., hydraulic motors, pneumatic motors, electric motors, etc.), shown as drive motors 42. In some embodiments, the drive motors 42 are electric motors powered by an electrical energy source (e.g., the batteries 110, energy from a power grid external to the vehicle 10, etc.). The drive motors 42 are each configured to provide rotational mechanical energy to drive rotation of one or more tractive elements 44 (e.g., wheel and tire assemblies). In some embodiments, the drive motors 42 drive the left and right sides of the drivetrain 40 independently, facilitating skid steer operation of the vehicle 10. By way of example, the tractive elements 44 may be driven at the same speed and in the same direction to travel straight. By way of another example, the tractive elements 44 may be driven at different directions and/or at different speeds to turn the vehicle 10. By driving the tractive elements 44 at the same speed and in opposite directions, the drivetrain 40 may rotate the vehicle 10 about a substantially vertical axis, shown as central axis 46, that is substantially centered relative to the frame 12. Rotation of the vehicle 10 about the central axis 46 may facilitate reorienting the vehicle 10 without changing position (i.e., turning in place).

Figure 3:
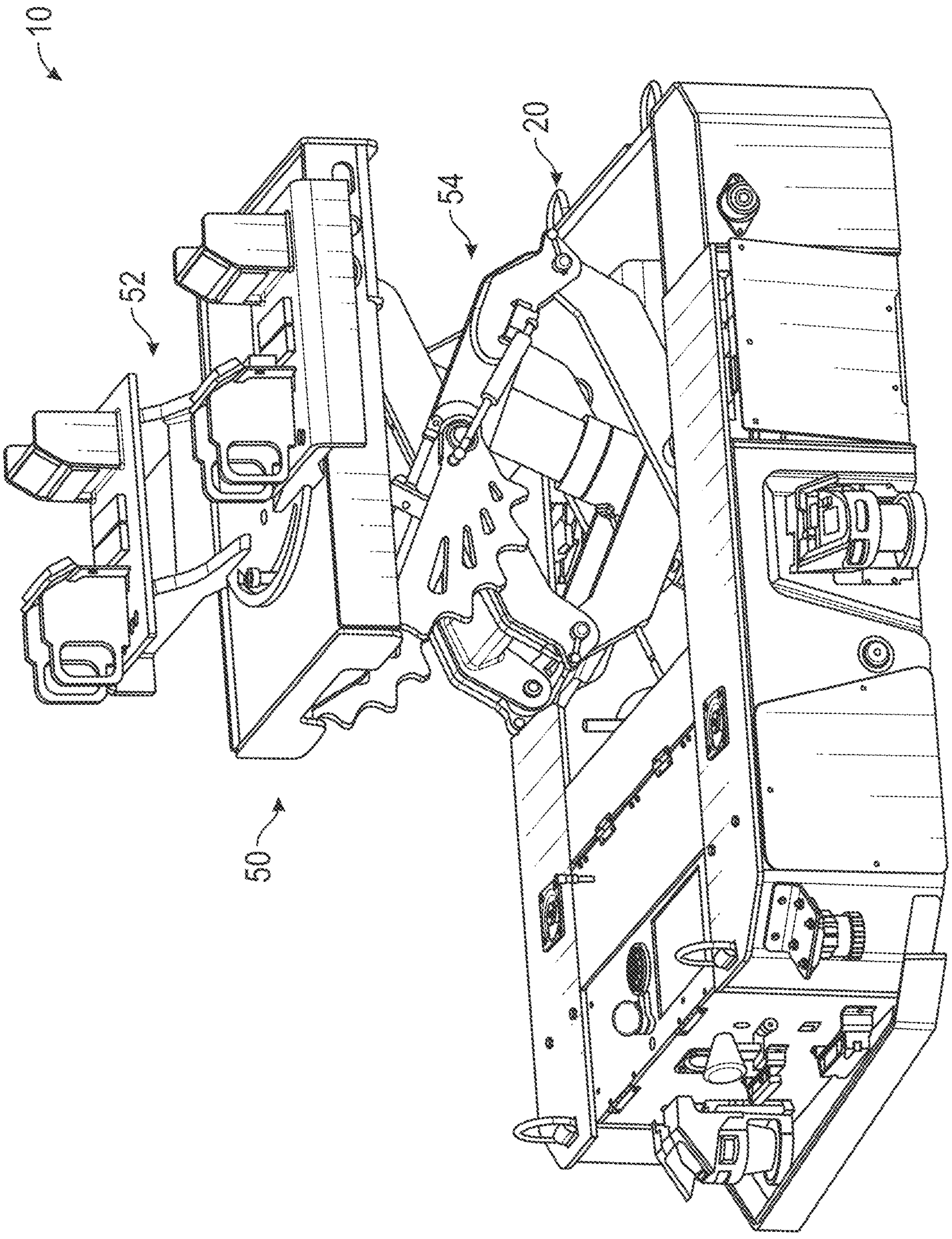
FIG. 3 is a perspective view of the vehicle of FIG. 1 equipped with a lifting implement, according to an exemplary embodiment.
Figure 4:
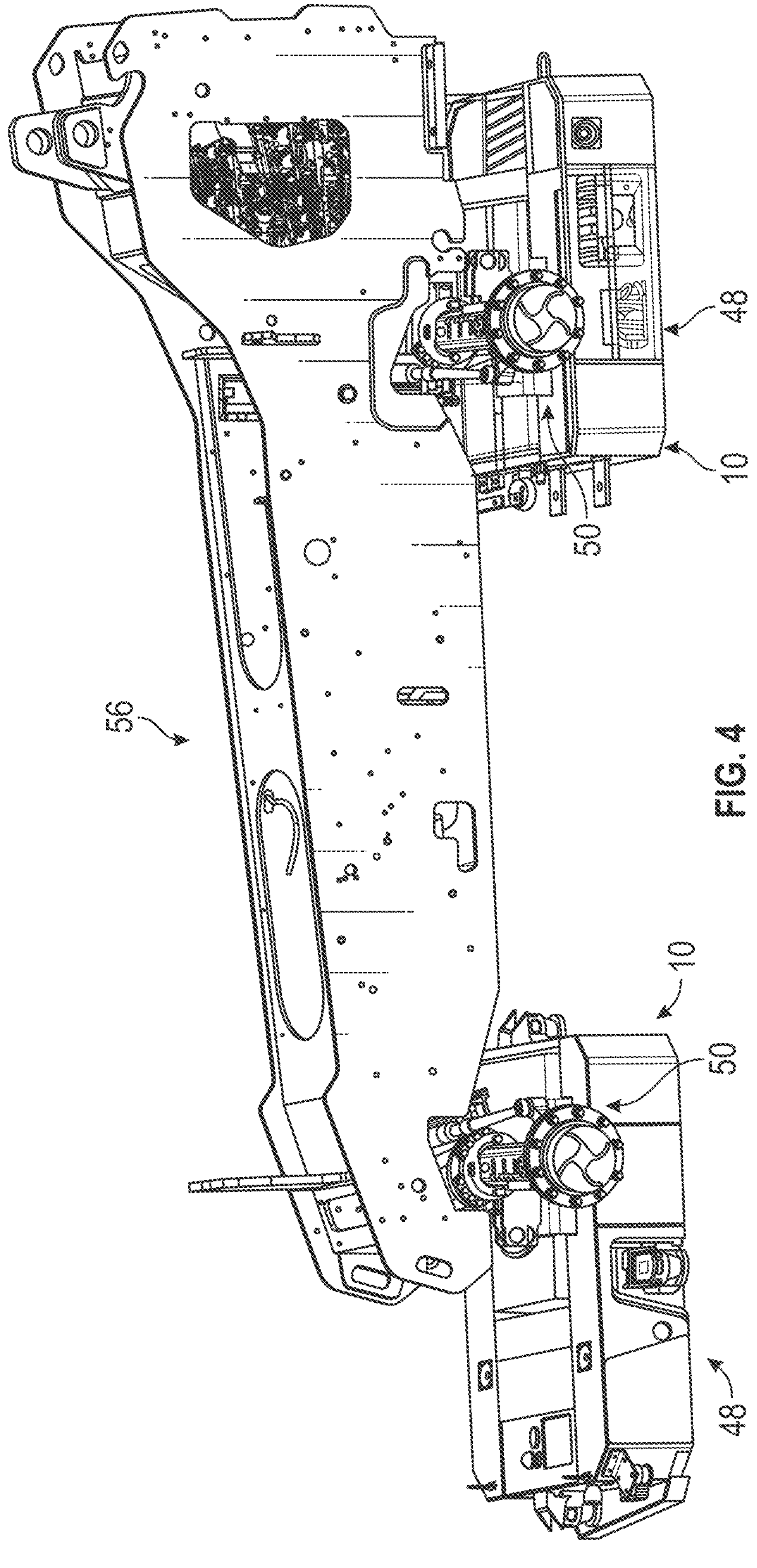
FIG. 4 is a perspective view of the vehicle of FIG. 3 and another vehicle cooperating to support a telehandler, according to an exemplary embodiment.
Figure 5:
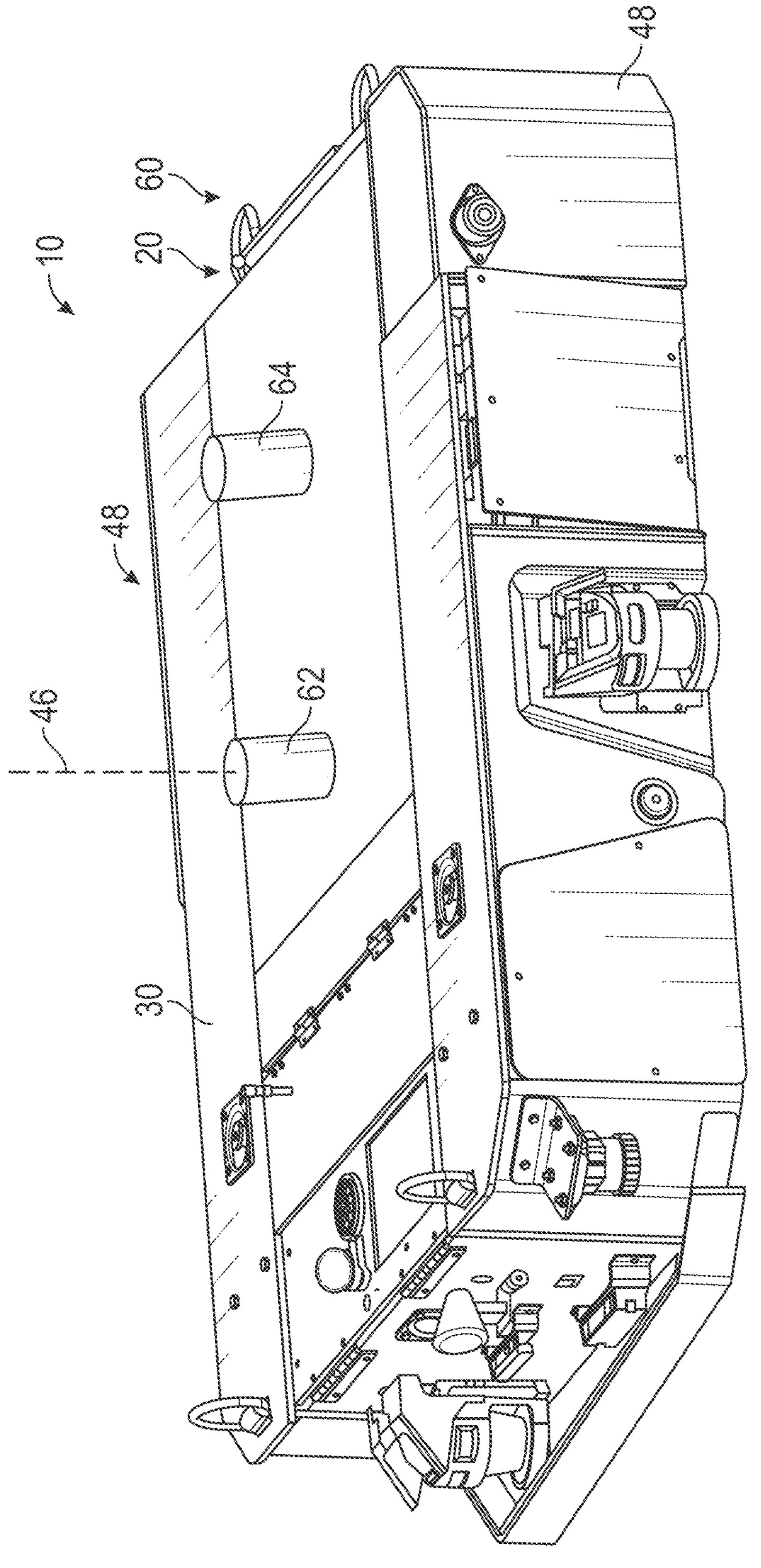
FIG. 5 is a perspective view of the vehicle of FIG. 1 equipped with a cart implement, according to an exemplary embodiment.
Figure 6:
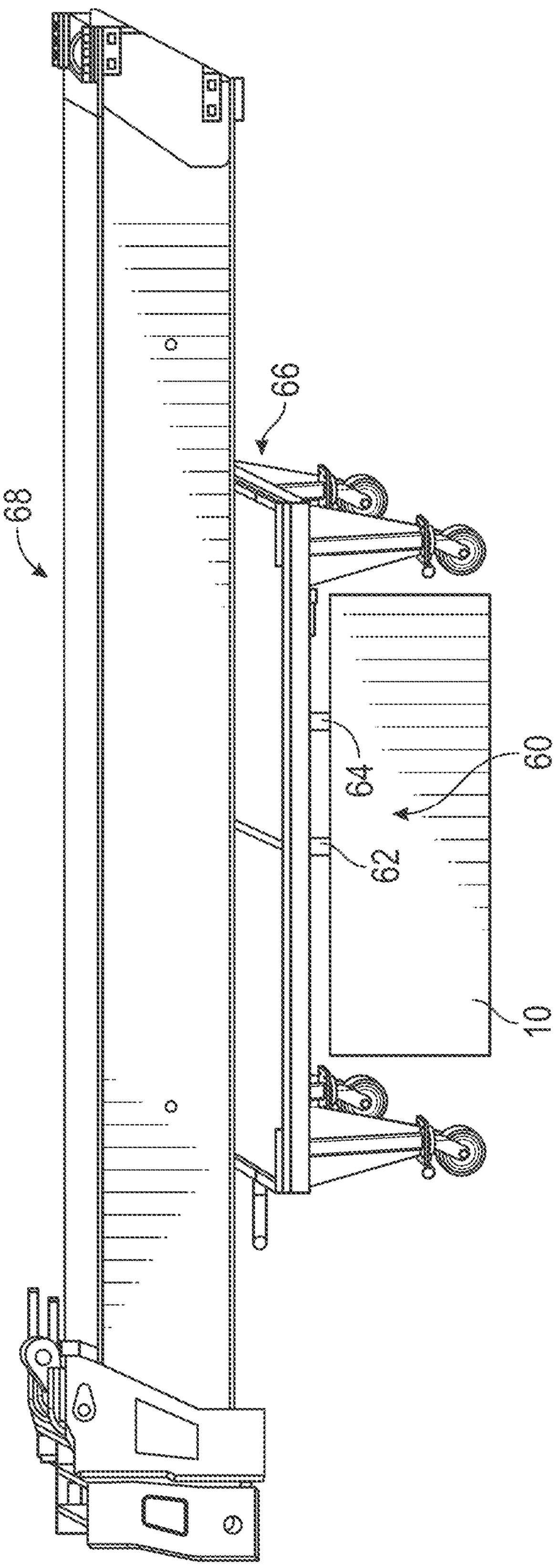
FIG. 6 is a perspective view of the vehicle of FIG. 3 interfacing with a cart supporting a boom assembly, according to an exemplary embodiment.

The frame 12, the drivetrain 40, and various other components coupled to the frame 12 form a base portion of the vehicle 10, shown as base assembly 48. To facilitate moving a product, the vehicle 10 may include an implement that that selectively couples the base assembly 48 to a product. FIGS. 3 and 4 illustrate a first implement, shown as lifting implement 50, and FIGS. 5 and 6 illustrate a second implement, shown as cart implement 60. Each implement may be received within the implement recess 20 and fixedly coupled to the frame 12. In some embodiments, the implement is removable from the implement recess 20 to facilitate interchanging with another type of implement. By way of example, the lifting implement 50 may be removed and replaced with the cart implement 60. In other embodiments, the implement is permanently installed on the vehicle.

Referring to FIGS. 3 and 4, the lifting implement 50 includes a product interface, shown as cradle 52, and a lift device or lifting assembly, shown as lift assembly 54. The cradle 52 is configured to receive and directly support a product, shown as telehandler 56. By way of example, the cradle 52 may receive an axle assembly of the telehandler 56. The lift assembly 54 couples the cradle 52 to the frame 12. The lift assembly 54 may be extended to raise the cradle 52 or retracted to lower the cradle 52. Accordingly, the lift assembly 54 may be used to raise or lower the telehandler 56.

Certain large products, such as the telehandler 56, may be difficult to support with only a single vehicle 10. To facilitate steering the product and spreading out the weight of the product, multiple vehicles 10 may be utilized. In the example shown in FIG. 4, a front axle of the telehandler 56 is supported by one vehicle 10, and a rear axle of the telehandler 56 is supported by another vehicle 10. In some embodiments, the vehicles 10 are independently operable. In other embodiments, operation of one vehicle 10 is dependent upon the other vehicle 10. By way of example, a first vehicle 10 may supply electrical energy to, propel, and/or control operation of the other vehicle 10.

Referring to FIGS. 5 and 6, the cart implement 60 includes a pair of protruding interface elements (e.g., pins), extending above the top surface 30. Specifically, the cart implement 60 includes a central pin, shown as driving pin 62, and an offset pin, shown as turning pin 64, that can each be selectively raised and lowered by an actuator of the cart implement 60. The driving pin 62 is centered about the central axis 46, and the turning pin 64 is offset from the central axis 46. The driving pin 62 and the turning pin 64 are positioned to a mobile platform, shown as cart 66, that supports a product subassembly, shown as boom assembly 68.

When extended, the driving pin 62 and the turning pin 64 each engage the cart 66 to limit movement of the cart 66 relative to the base assembly 48. When both the driving pin 62 and the turning pin 64 engage the cart 66, the cart 66 may be fixed to the base assembly 48. When only the driving pin 62 engages the cart 66, the base assembly 48 may rotate freely about the central axis 46 relative to the cart 66, but movement of the vehicle 10 in a particular direction may cause movement of the cart 66 in that same direction. When the driving pin 62 and the turning pin 64 are both retracted away from the cart 66, the vehicle 10 may move freely relative to the cart 66.

The cart 66 may be equipped with casters or slides to facilitate free movement of the cart 66 along the ground. In some embodiments, the cart 66 supports some or all of the weight of the boom assembly 68. The driving pin 62 and the turning pin 64 may generally push horizontally on the cart 66, such that there may be little or no transmission of vertical forces between the cart implement 60 and the cart 66. Accordingly, the vertical load on the vehicle 10 may be minimized while still permitting the vehicle 10 move the cart 66 and the boom assembly 68 throughout the environment as desired. This reduction in load may reduce the overall cost of the vehicle 10.

Figure 7:
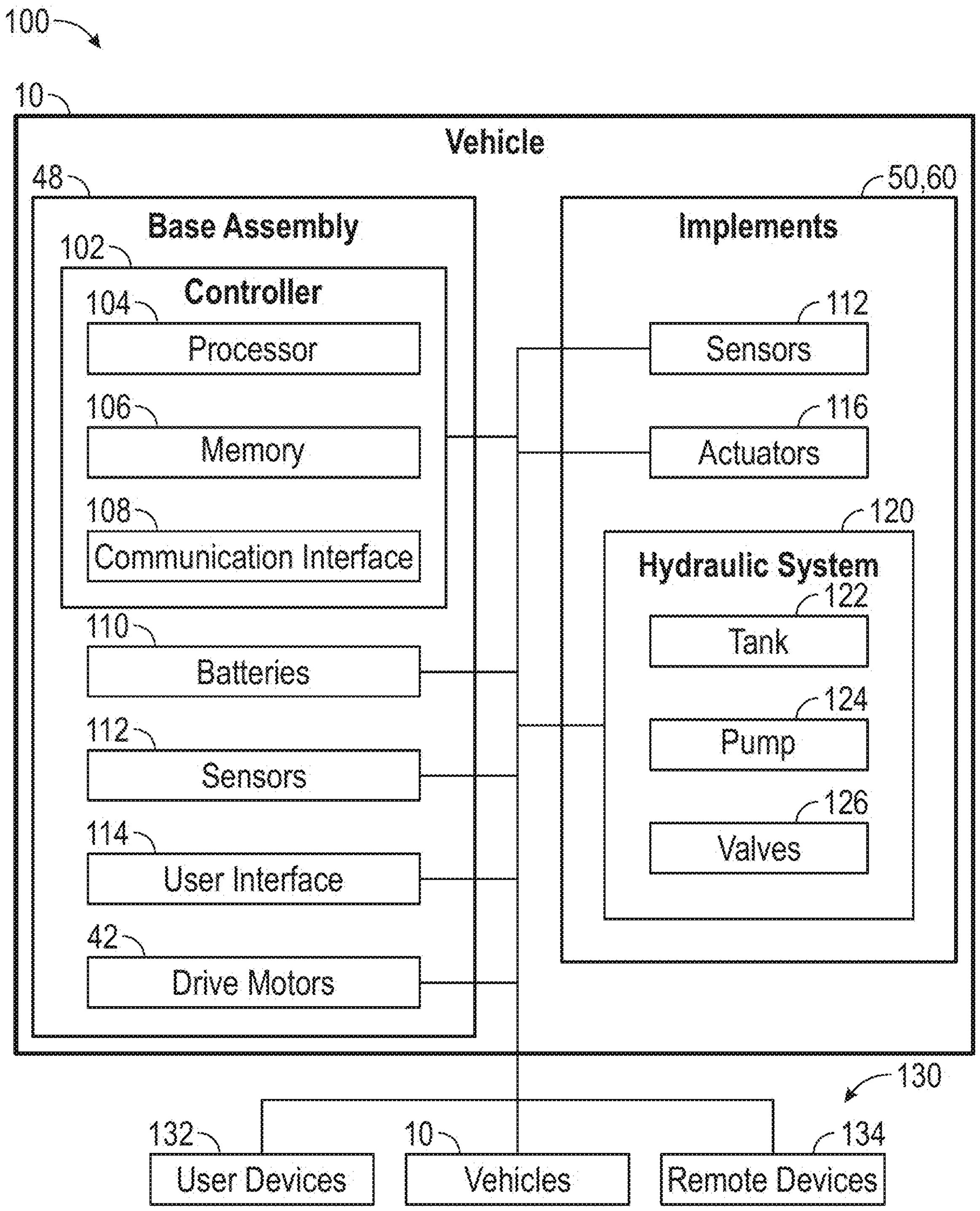
FIG. 7 is a block diagram of a control system for the vehicle of FIG. 1.

Referring to FIG. 7, the vehicle 10 and a control system 100 for the vehicle 10 are shown according to an exemplary embodiment. The control system 100 may facilitate operation of the vehicle 10 and/or other devices of a production environment. Although certain components are shown as being included in the base assembly 48 and/or the implements 50 and 60, it should be understood that any component may be positioned in the base assembly 48, the lifting implement 50, or the cart implement 60 or duplicated across multiple thereof.

The vehicle 10 includes a controller 102 that controls operation of the vehicle 10. The controller 102 includes a processing circuit, shown as processor 104, and a memory device, shown as memory 106. The memory 106 may contain one or more instruction that, when executed by the processor 104, cause the processor to perform the various functions described herein.

The controller 102 further includes a communication interface 108 (e.g., a communication circuit, a network interface, etc.) that facilitates communication with (e.g., to and from) other components of the vehicle 10 and/or the control system 100. The communication interface 108 may facilitate wired communication (e.g., through CAN, Ethernet, communication of power, etc.). Additionally or alternatively, the communication interface 108 may facilitate wireless communication (e.g., through Bluetooth, Wi-Fi, radio transmission, inductive transmission of energy, etc.).

The base assembly 48 includes one or more energy storage devices, shown as batteries 110. The batteries 110 store energy (e.g., as chemical energy). The batteries 110 may deliver electrical energy to other components of the vehicle 10 to power the vehicle 10. The batteries 110 may be charged by an outside source of energy (e.g., an electrical grid, a wireless charging interface, etc.). In other embodiments, the base assembly 48 includes a different type of energy storage device (e.g., a fuel tank for an internal combustion engine of a generator, a fuel cell, etc.).

The base assembly 48, the lifting implement 50, and the cart implement 60 may each include one or more sensors 112 operatively coupled to the controller 102. The sensors 112 may provide sensor data describing the current status of the vehicle 10 and/or the surrounding environment. By way of example, the sensors 112 may include mapping or imaging sensors (e.g., LIDAR sensors, light curtains, cameras, ultrasonic sensors, etc.). By way of example, the sensors 112 may include position sensors (e.g., GPS, potentiometers, encoders, etc.). By way of example, the sensors 112 may include orientation or acceleration sensors (e.g., accelerometers, gyroscopic sensors, inertial measurement units, compasses, etc.). By way of example, the sensors 112 may include pressure sensors, flowmeters, buttons, or other types of sensors.

The base assembly 48 may include one or more operator interface elements (e.g., input devices, output devices, etc.), shown as user interface 114. The user interface 114 may include output devices that provide information to one or more users. By way of example, the user interface 114 may include displays, speakers, lights, haptic feedback (e.g., vibrators, etc.), or other output devices. The user interface 114 may include input devices that receive information (e.g., commands) from one or more users. By way of example, the user interface 114 may include buttons, switches, knobs, touchscreens, microphones, or other input devices.

The lifting implement 50 and/or the cart implement 60 may include one or more actuators 116 that facilitate controlled movement (e.g., movement of the lifting implement 50 or the cart implement 60). The actuators 116 may include linear actuators (e.g., electric linear actuators, hydraulic cylinders, etc.), motors (e.g., electric motors, hydraulic motors, etc.), or other types of actuators. The actuators 116 may be electrically-powered, hydraulically-powered, or otherwise powered.

The lifting implement 50 and/or the cart implement 60 may include a hydraulic system 120. They hydraulic system 120 may supply pressurized hydraulic fluid (e.g., hydraulic oil) to facilitate operation of other components of the vehicle 10. By way of example, the hydraulic system 120 may supply pressurized hydraulic fluid to an actuator 116. In some embodiments, the hydraulic system 120 forms a self-contained hydraulic loop with one or more actuators 116.

The hydraulic system 120 includes a low-pressure reservoir, shown as tank 122, that stores a volume of hydraulic fluid at a low pressure. A pump 124 receives electrical energy from the batteries 110, draws hydraulic fluid from the tank 122, and supplies a flow of pressurized hydraulic fluid. One or more valves 126 (e.g., solenoid valves, directional control valves, etc.) control the flow of the hydraulic fluid from the pump 124. By way of example, the valves 126 may control the flow rate, direction, and destination of hydraulic fluid flowing throughout the hydraulic system 120. The controller 102 may control operation of the actuators 116 by controlling the valves 126.

The control system 100 further includes additional devices in communication with the vehicle 10. The devices may communicate with the vehicle 10 directly or through a network 130 (e.g., a local area network, a wide area network, the Internet, etc.). The network 130 may utilize wireless and/or wired communication. In some embodiments, the network 130 is a mesh network formed between multiple devices of the control system 100 (e.g., permitting indirect communication between two devices through a third device).

The control system 100 may include multiple vehicles 10. A vehicle 10 may communicate with other vehicles 10 to share information and facilitate operation. By way of example, a vehicle 10 may provide commands to another vehicle 10 to coordinate transportation of a large item that is carried by both of the vehicles 10. By way of another example, a vehicle 10 may provide its location to another vehicle 10 to facilitate path generation and avoid collisions.

The control system 100 may include one or more user devices 132 (e.g., smartphones, tablets, laptops, desktop computers, etc.). The user devices 132 may facilitate a user monitoring and/or controlling operation of the vehicles 10. By way of example, the user devices 132 may indicate statuses of the vehicles 10 (e.g., positions, whether maintenance is needed, if any errors are occurring, what task a vehicle 10 is assigned, etc.). By way of example, the user devices 132 may permit a user to command a vehicle 10 to travel to a different place or to assign a vehicle 10 to a particular production line.

The control system may include one or more remote devices 134 (e.g., servers). In some embodiments, a remote device 134 functions as a production manager that controls various operations throughout a manufacturing environment. The production manager may receive requests for production of certain equipment (e.g., fifteen telehandlers are requested for production by Apr. 12, 2025, etc.). The production manager may monitor the statuses of vehicles 10, personnel, equipment, and raw materials. By way of example, the vehicles 10 may provide sensor data from the sensors 112 to a remote device 134 for storage and/or analysis. Based on the available data, the production manager may generate assignments for vehicles 10, personnel, equipment, and raw materials to meet the production requests. The production manager may adapt to changes in availability (e.g., by reassigning a vehicle 10 to a different task or area in response to a failure of one of the vehicles 10). The assignments for a vehicle 10 may include a path along which the vehicle 10 should travel, a desired configuration of the vehicle 10 (e.g., the type of implement available to the vehicle 10), an amount of time that the vehicle 10 should wait at a given station, etc.

Figure 8:
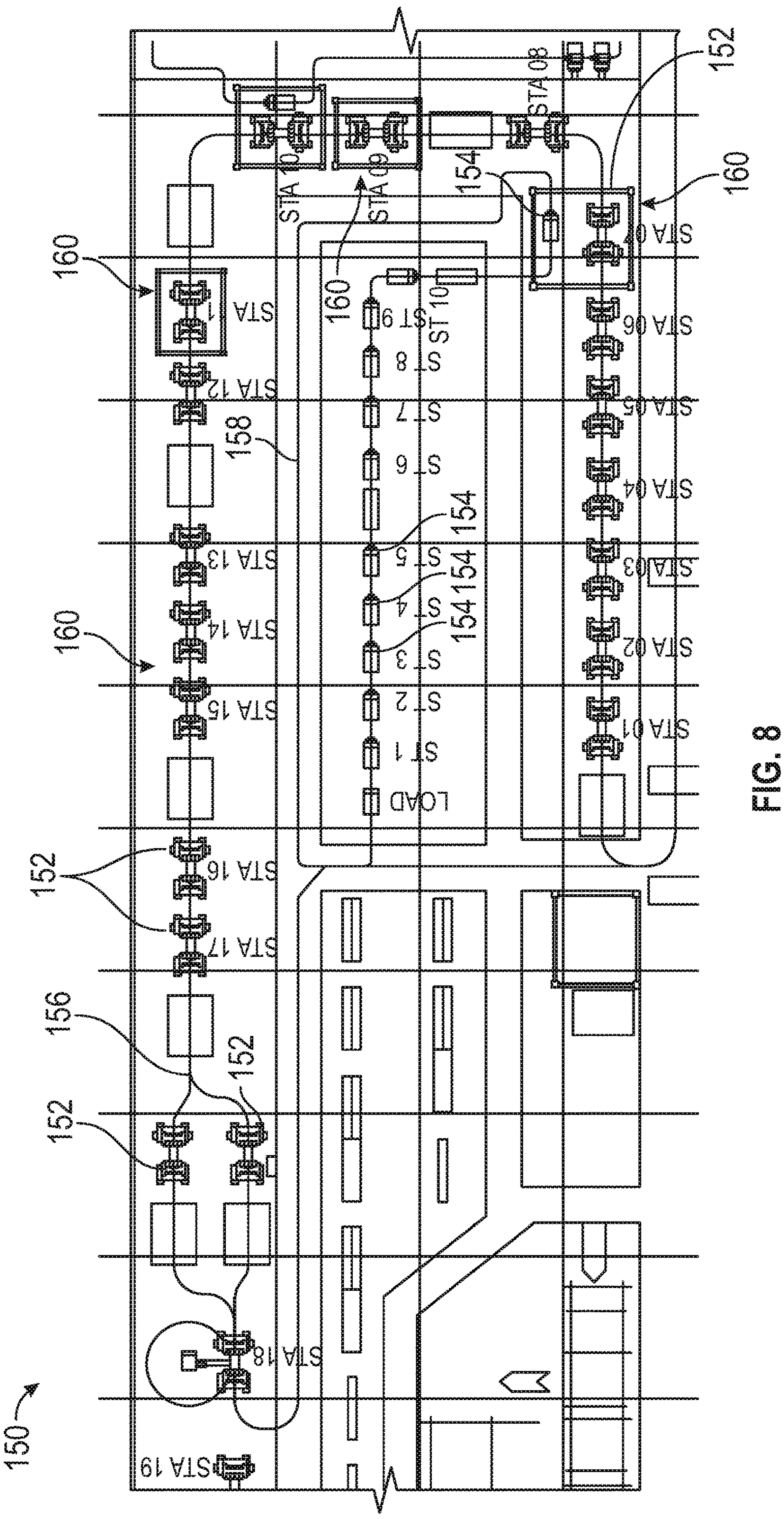
FIG. 8 is a top view of a production system including the vehicle of FIG. 1, according to an exemplary embodiment.

Referring to FIG. 8, a manufacturing environment or production system 150 is shown according to an exemplary embodiment. The production system 150 may include a series of vehicles 10 that move a product 152 and a subassembly 154 through various stages of assembly (e.g., as controlled by a remote device 134). The vehicles 10 move the product 152 along a first path, shown as manufacturing line 156, and the vehicles 10 move the subassembly 154 along a second path, shown as manufacturing line 158. A series of manufacturing or assembly stations, shown as stations 160, are spaced at regular intervals along the manufacturing lines 156 and 158. Each station 160 may be associated with a different manufacturing or assembly process that is performed there. By way of example, there may be stations 160 for attaching components to a product 152, coupling components with hoses or wires, confirming that certain functions are operating properly, etc.

Initially the product 152 and the subassembly 154 move along separate manufacturing lines 156 and 158. After the last station 160 needed to prepare the subassembly 154, the manufacturing line 158 intersects the manufacturing line 156, and the subassembly 154 is attached to the product 152. The product 152 and the subassembly 154 then move together along the manufacturing line 156. This proceeds until the product 152 is fully assembled and removed from the vehicles 10. The vehicles 10 may then return to collect another product that requires assembly, and the manufacturing process is repeated.

In some embodiments, the product 152 assembled by the production system is a vehicle or work machine. By way of example, the product 152 may be a lift device, such as a telehandler, a scissor lift, a boom lift, a vertical lift, an aerial work platform, or another type of lift device. By way of another example, the product 152 may be a fire truck, an aircraft rescue and firefighting apparatus (ARFF) truck, a refuse vehicle, a concrete mixing truck, a tow truck, a broadcast van, a military vehicle, a robot, a truck, a van, a passenger vehicle, or another type of vehicle. In other embodiments, the product 152 is not a vehicle (e.g., is a stationary piece of equipment).

Cart

Figure 9:
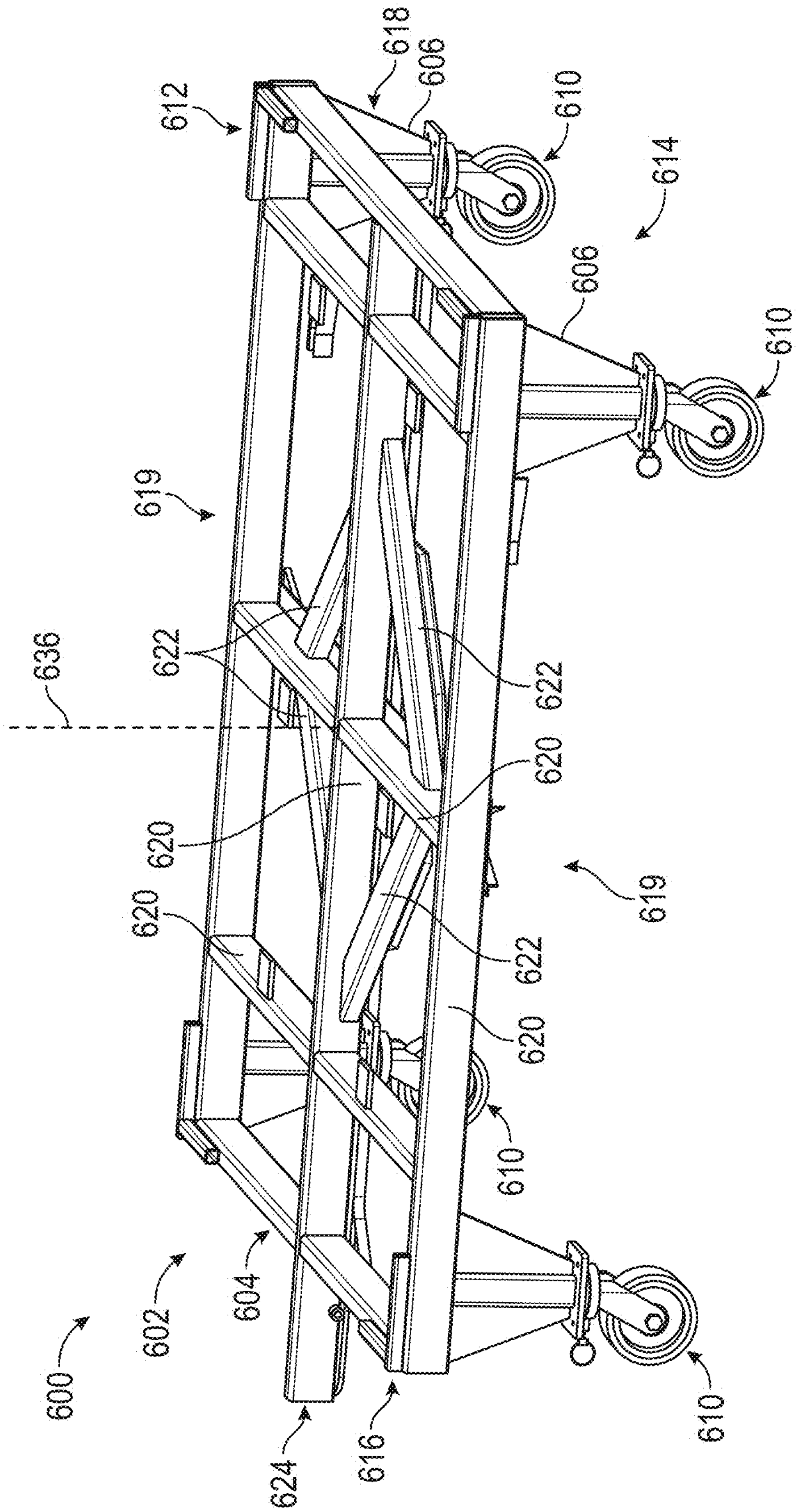
FIG. 9 is a perspective view of a cart, according to an exemplary embodiment.
Figure 10:
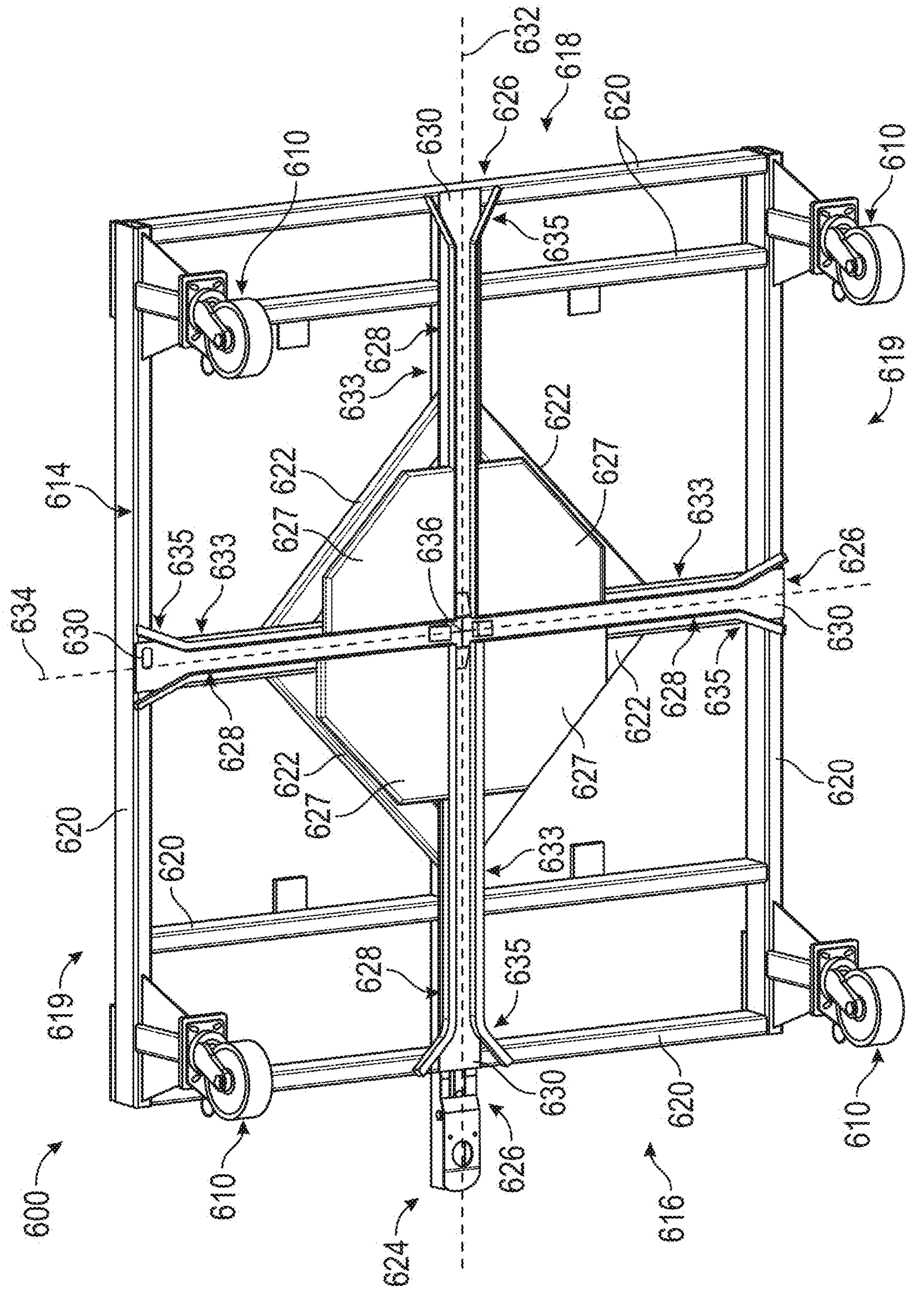
FIG. 10 is a perspective view of the cart of the FIG. 9, according to an exemplary embodiment.

Referring to FIGS. 9 and 10, a cart 600 (e.g., the cart 66) includes a chassis or frame 602, a platform 604, one or more carts legs, shown as legs 606, extending downward from the platform 604, and one or more independent or caster wheels, shown as casters 610. The cart 600 includes a first or top portion 612, a second or bottom portion 614 opposite the top portion 616, a third or front portion 616, a fourth or rear portion 618 opposite the front portion 616, and a pair of side portions 619. The top portion 612 of the cart 600 includes the platform 604. The frame 602 includes one or more frame members, shown as frame members 620 that define the platform 604. The frame 602 also includes one or more support members, braces, or crossbars, shown as support members 622. The platform 604 defines a substantially horizontal plane that extends horizontally across the top portion 612 of the cart 600. The front portion 616 of the cart 600 includes a hitch, towing interface, or tow point, shown as tug 624, that couples the cart 600 to a driven vehicle (e.g., a forklift, etc.) or handle to facilitating towing or otherwise moving the cart 600. By way of example, the tug 624 may be used when the cart 600 is being transported by a vehicle other than the vehicle 10.

The bottom portion 614 of the cart 600 includes one or more channels or troughs (e.g., a first channel, a second channel, etc.), shown as channels 626, and one or more support or linking plates, shown as frame plates 627. The channels 626 are fixedly coupled to a bottom side or underside of the frame members 620. Each of the channels 626 includes a pair of channel walls, rails, or guards (e.g., cattle chutes), shown as guides 628, and a flat member, top member, or ceiling, shown as plate 630. A first pair of the channels 626 extend longitudinally across the cart 600 (e.g., from the front portion 616 to the rear portion 618), defining and centered about a longitudinal axis 632. A second pair of the channels 626 extend laterally across the cart 600 (e.g., between the pair of side portions 619), defining and centered about a lateral axis 634.

Figure 11:
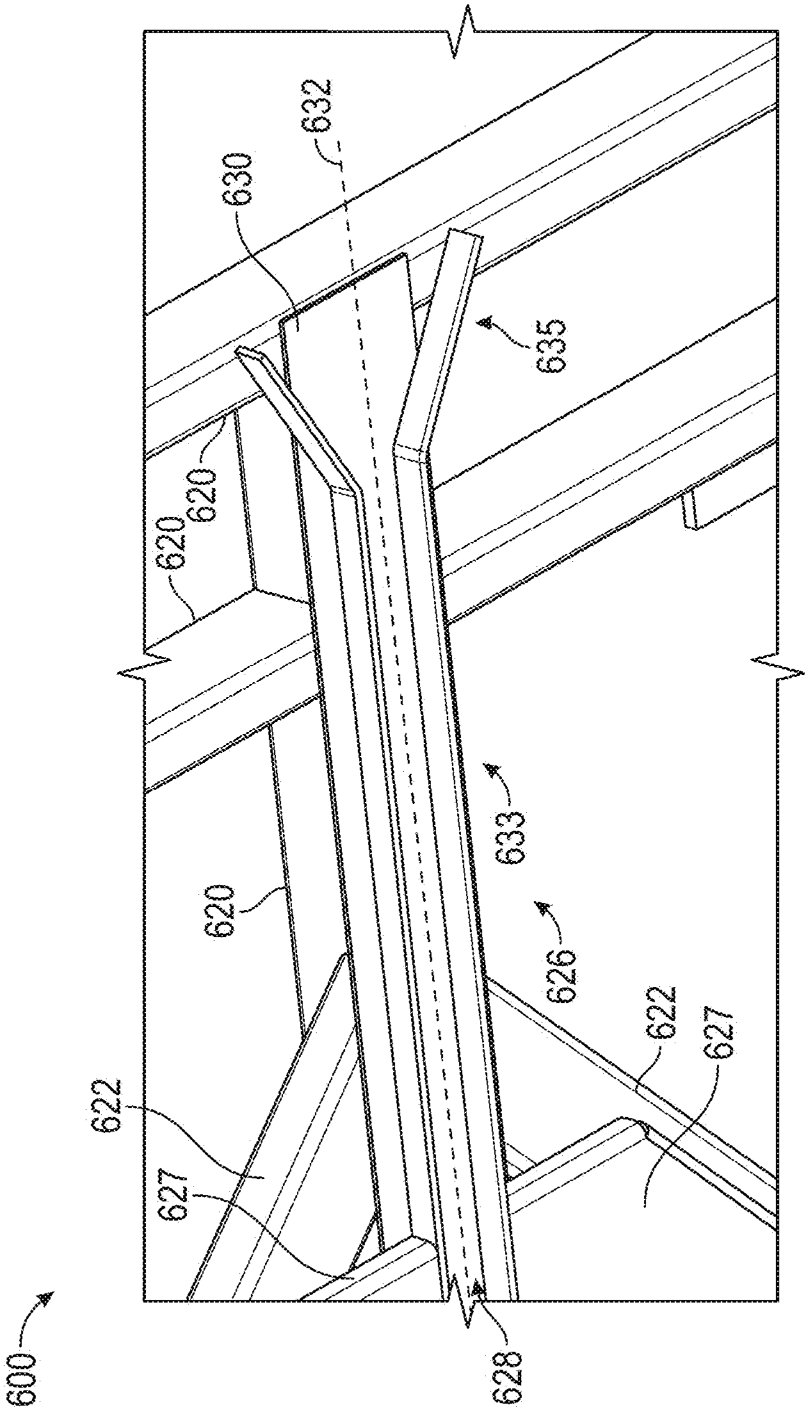
FIG. 11 is a perspective view of a guide of the cart of FIG. 9, according to an exemplary embodiment.

As shown in FIG. 11, the guides 628 each include a straight, constant width, or first portion 633 and a diagonal, sloped, ramped, narrowing, or second portion 635. The first portion 633 extends along (e.g., substantially parallel to) one of the longitudinal axis 632 or the lateral axis 634 and is substantially perpendicular relative to one of the frame members 620 along the front portion 616, the rear portion 618, or the pair of side portions 619 (e.g., the channels 626 extending from the front portion 616 and the rear portion 618 include the first portion 633 that is perpendicular relative to the front portion 616 and the rear portion 618, etc.). Accordingly, a width of the channel 626 defined between the first portions 633 is substantially constant. The second portion 635 is angled relative to the first portion 633. Specifically, the second portions 635 are angled toward one another as the second portions 635 extend toward the first portions 633. Accordingly, a width of the channel 626 defined between the second portions 635 decreases as the channel 626 extends toward the center of the cart 600, forming a funnel shape.

In some embodiments, the first portion 633 and the second portion 635 of each channel 626 are fixedly coupled (e.g., welded, etc.) with one another and the plate 630. In some embodiments, the guides 628 and the plate 630 are assembled to the cart 600 using a series of fasteners. In some embodiments, there are more or fewer channels 626 than shown in the FIGS. 9 and 10 (e.g., two channels 626, six channels 626, etc.). In some embodiments, the channels 626 extend only partially between the front portion 616 and the rear portion 618 or only partially between the pair of side portions 619. In some embodiments, the channels 626 may extend diagonally (e.g., from opposite corners) across the cart 600.

The channels 626 along the longitudinal axis 632 and the channels 626 along the lateral axis 634 intersect once another at a substantially vertical axis 636. In some embodiments, the cart 600 is rotatable (e.g., relative to the vehicle 10) about the substantially vertical axis 636. In some embodiments, the frame members 620 arranged on the front portion 616, the rear portion 618, and the pair of side portions 619 define an outer or external perimeter of the cart 600. In such embodiments, the substantially vertical axis 636 may be positioned within and extending through the external perimeter (e.g., the substantially vertical axis 636 is laterally and/or longitudinally centered on the cart 600).

Figure 12:
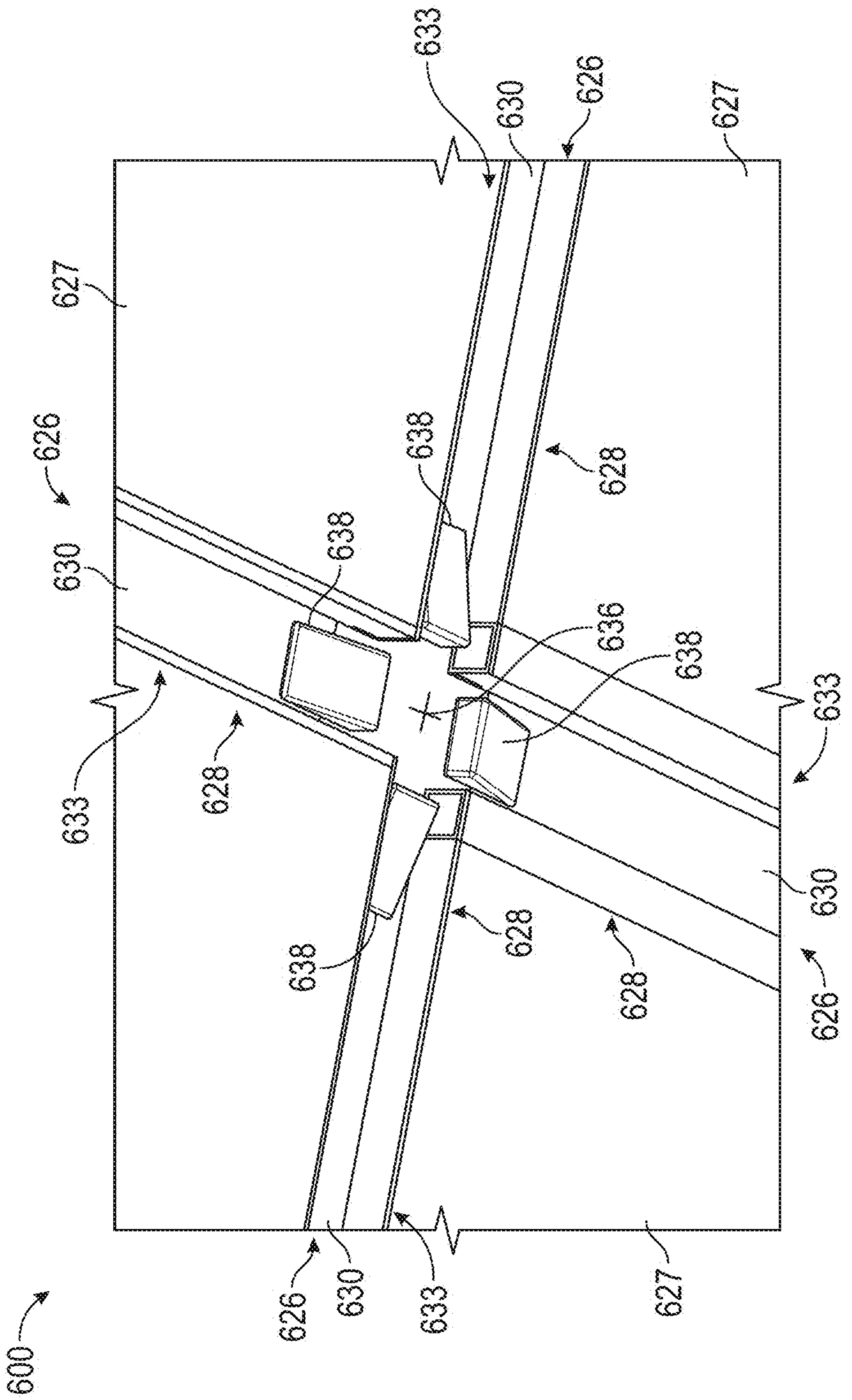
FIG. 12 is a perspective view of a positioning mechanism of the cart of FIG. 9, according to an exemplary embodiment.

Referring to FIG. 12, the channels 626 further include a series of sloped or ramped plates or ramps, shown as a positioning members 638, each fixedly coupled to the plate 630. Each positioning member 638 has an outer edge that is substantially level with the plate 630 and gradually increases in height (e.g., slopes outward from the plate 630) as the positioning member 638 extends toward the substantially vertical axis 636. Accordingly, the highest point or edge of the positioning member is the end of the positioning member 638 that is closest to a center of the cart 600. In some embodiments, the faces of the positioning members 638 that face toward the substantially vertical axis 636 are substantially vertical.

Referring to FIG. 10, the frame plates 627 extend horizontally between adjacent portions of the channels 626. Specifically, each frame plate 627 abuts (e.g., touches) portions of two adjacent guides 628 that are closest to the substantially vertical axis 636. The bottom surfaces of the frame plates 627 may be flush with the bottom surfaces of the guides 628, such that the bottom surfaces of the frame plates 627 and the bottom surfaces of the guides 628 are coplanar.

FIG. 6 illustrates an example of the cart 600 being used to support a single boom assembly 68. In this example, the boom assembly 68 may be placed directly atop the top portion of the cart 600. In other situations, it may be advantageous to carry multiple boom assemblies or other products on a single cart. In some such situations, the manufacturing environment may be limited in how the booms can be added to the cart. By way of example, a manufacturing line may only be capable of placing boom assemblies onto a cart from one side of the cart.

Figure 13:
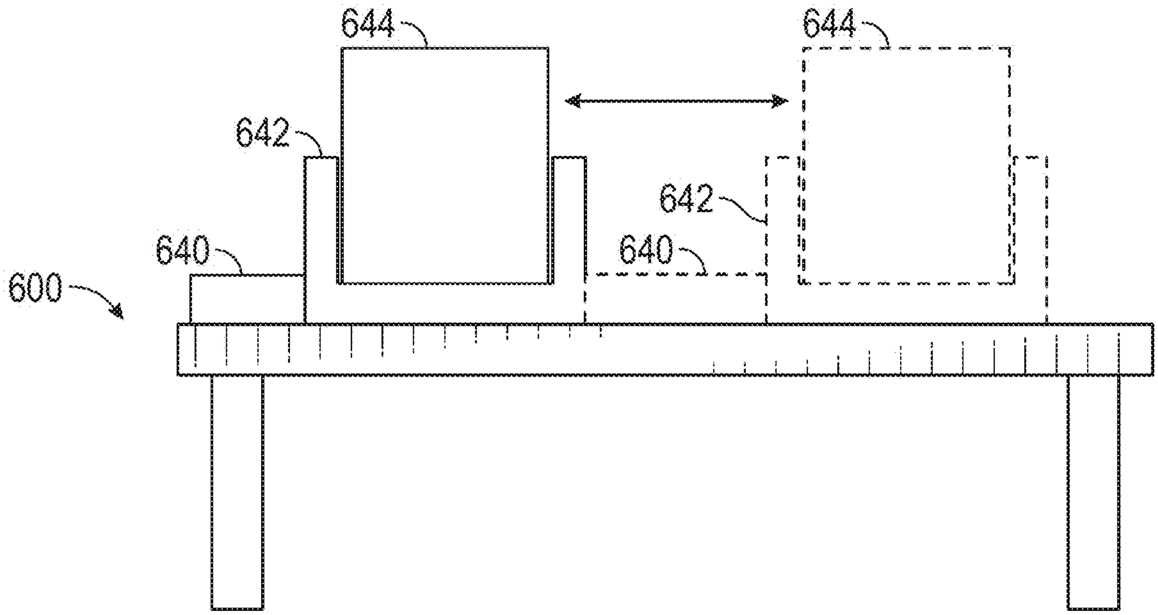
FIG. 13 is a perspective view of a cart arrangement of the cart of FIG. 9, according to an exemplary embodiment.

Referring to FIG. 13, the cart 600 may equipped with or coupled to an actuator 640 (e.g., a linear actuator, a hydraulic actuator, an electric actuator, a pneumatic actuator, etc.) and a slot, basket, platform, receiving member, or channel, shown as cradle 642. The actuator 640 and the cradle 642 may be arranged on the top portion 616 of the cart 600. In some embodiments, the cradle 642 is sized and/shaped to receive equipment 644 (e.g., a boom, etc.). In such embodiments, the actuator 640 may push, move, or reposition the cradle 642 to adjust a location of the equipment 644 relative to the cart 600. By way of example, the actuator 640 may translate (e.g., laterally, as shown in FIG. 13) the cradle 642 along the top portion 616 of the cart 600 from an initial position to a secondary position (e.g., shown in dashed lines) to move the equipment 644 received by the cradle 642 to a desired location.

The actuator 640 and the cradle may facilitate adding multiple products onto the cart 600 simultaneously. This may be advantageous in a manufacturing environment that is only capable of placing products onto one side of the cart 600. By way of example, a first equipment 644 may be placed into the cradle 642 in the position shown in solid lines in FIG. 13. The actuator 640 may reposition the first equipment 644 laterally to the position shown in dashed lines in FIG. 13. A second equipment 644 may then be placed in the location previously occupied by the first equipment 644. A similar process may be followed in reverse to remove the first and second equipment 644 from the cart 600.

Referring generally to FIGS. 14-22, an alternative embodiment of the cart 600 is shown. The cart 600 may be similar substantially similar to the embodiment of FIGS. 9-13 except as otherwise specified herein. Accordingly, any description of the cart 600 of FIGS. 9-13 may apply to the cart 600 of FIGS. 14-22 except as otherwise specified herein.

Figure 21:
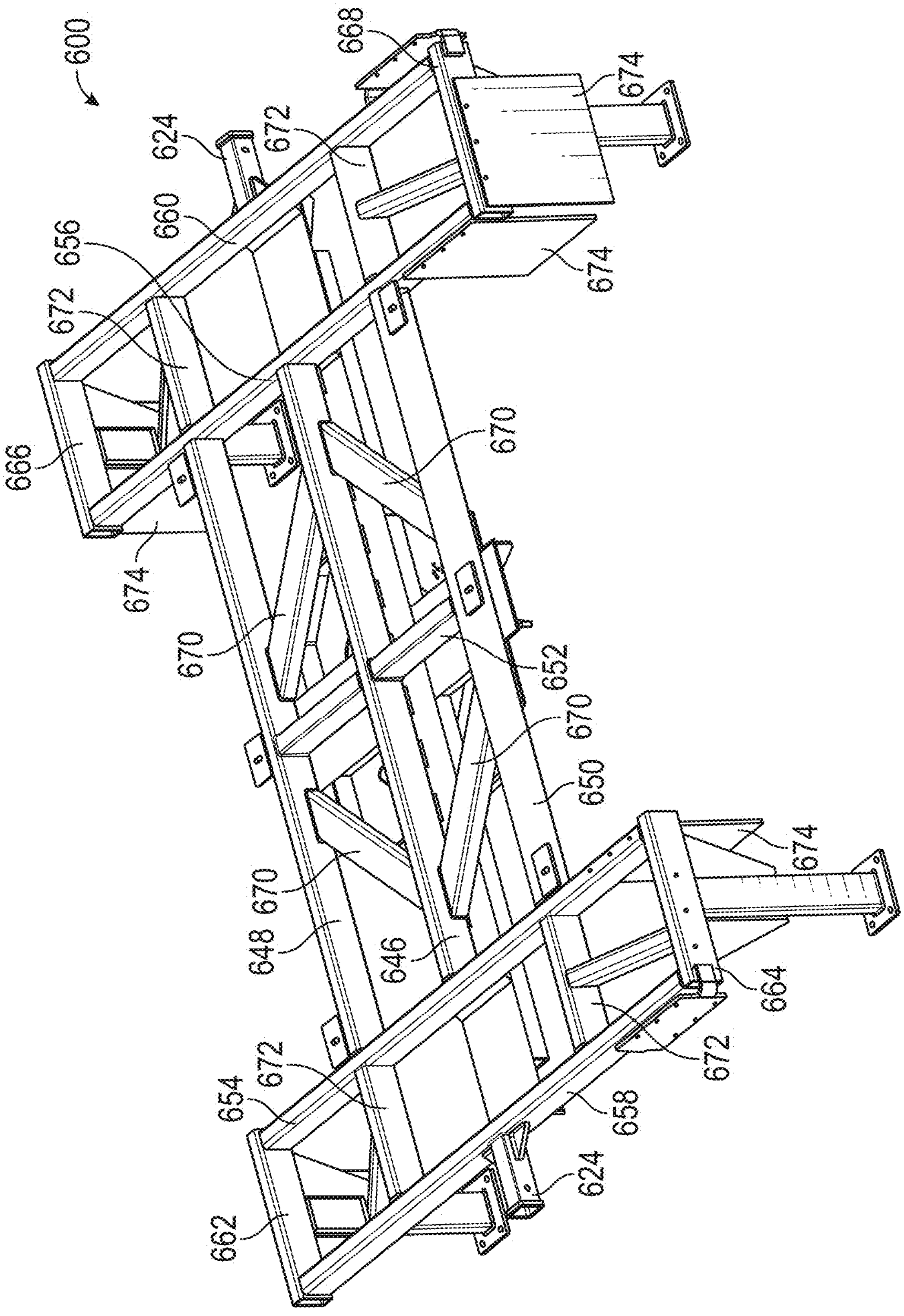
FIG. 21 is a top perspective view of the cart of FIG. 14, according to an exemplary embodiment.
Figure 22:
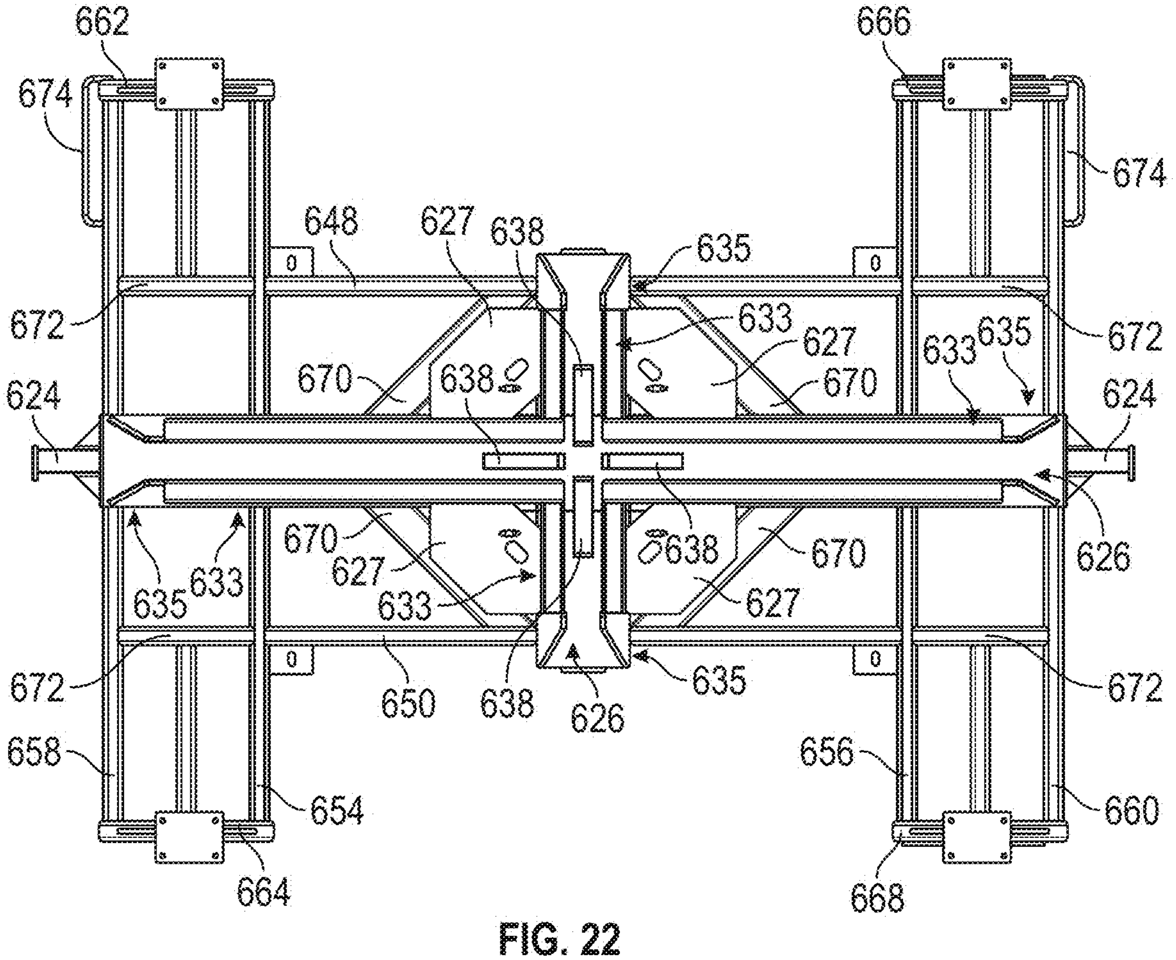
FIG. 22 is a top view of the cart of FIG. 14, according to an exemplary embodiment.

Referring now to FIGS. 21 and 22, the frame members 620 of the cart 600 include a first frame member 646, a second frame member 648, a third frame member 650, a fourth frame member 652, and a fifth frame member 654. The first frame member 646 extends along the longitudinal axis 632. The second frame member 648 extends substantially parallel to and offset from the first frame member 646 in a first direction. The third frame member 650 extends substantially parallel and offset from the first frame member 646 in a second direction opposite the first direction. The third frame member 650 is substantially the same length as the second frame member 648. The third frame member 650 is longer than the first frame member 646. The fourth frame member 652 extends along the lateral axis 634, and intersects at least a portion of the first frame member 646, the second frame member 648, and the third frame member 650. The fifth frame member 654 extends substantially parallel to and offset from the fourth frame member 652 in a third direction.

The frame members 620 include a sixth frame member 656, a seventh frame member 658, and an eighth frame member 660. The sixth frame member 656 extends substantially parallel to and offset from the fourth frame member 652 in a fourth direction opposite the third direction. The fifth frame member 654 intersects at least a portion of the first frame member 646, second frame member 648, and the third frame member 650. The sixth frame member 656 is substantially the same length as the fifth frame member 654 and is longer than the fourth frame member 652. The sixth frame member 656 intersects at least a portion of the first frame member 646, the second frame member 648, and the third frame member 650. The seventh frame member 658 extends substantially parallel to the fifth frame member 654 and is offset from the fifth frame member 654 in the third direction. The eighth frame member 660 extends substantially parallel to the sixth frame member 656, and is offset from the sixth frame member 656 in the fourth direction.

The frame members 620 includes a ninth frame member 662, a tenth frame member 664, an eleventh frame member 666, and a twelfth frame member 668. The ninth frame member 662 extends between a first end of the fifth frame member 654 and a first end of the seventh frame member 658, and the tenth frame member 664 extends between a second end of the fifth frame member 654 and a second end of the fifth frame member 654, the first ends opposite the second ends. The eleventh frame member 666 extends between a first end of the sixth frame member 656 and a first end of the eighth frame member 660, and the twelfth frame member 668 extends between a second end of the sixth frame member 656 and a second end of the eight frame member 660, the second end opposite the first end.

The support members 622 include a series of first support members 670 and a series of second support members 672. The first support members 670 are each angled with respect to the corresponding frame members 620, and the second support members 672 are each perpendicular with respect to the corresponding frame members 620. Two of the first support members 670 extend between the first frame member 646 and the second frame member 648, and two of the first support members 670 extend between the first frame member 646 and the third frame member 650. Two of the second support members 672 extend between the fifth frame member 654 and the seventh frame member 658, and two of the second support members 672 extend between the sixth frame member 656 and the eighth frame member 660.

The shape, size, and arrangement of the frame members 620 and the support members 622 cause the frame 602 to form an I shape as viewed from above. Specifically, the lateral width of the frame 602 is greater at the front end and the rear end of the frame 602 than in the longitudinal center of the frame. This arrangement forms a first recess between the fifth frame member 654, the second frame member 648, and the sixth frame member 656, and a second recess between the fifth frame member 654, the third frame member 650 and the sixth frame member 656. These recesses extend laterally inward from the left and right sides of the frame 602. The recesses may provide clearance for lifting forks used to place the boom assemblies 68 or other equipment 644 onto the cart 600, while still ensuring that the front and rear ends of the boom assemblies 68 are supported by the cart 600.

The cart 600 includes a series of side panels 674, as shown in FIGS. 14-17, 21, and 22. Each of the side panels 674 is fixedly coupled to extends from one or more of the frame members 620. Two of the side panels 674 extend from the fifth frame member 654, one of the side panels 674 extends from the ninth frame member 662, one of the side panels 674 extends from the sixth frame member 656, one of the side panels 674 extends from the eleventh frame member 666, and one of the side panels 674 extends from the twelfth frame member 668.

The side panels 674 face outward from the frame 602. Each of the side panels 674 includes a visual indicator (e.g., QR code, etc.) that can be viewed by a vehicle 10 nearby the cart 600. The visual indicators each provide information visually. A sensor 112 of the vehicle 10, such as a camera, may detect and read the visual indicator to gather information about the cart 600. By way of example, the visual indicators may contain information used to identify the cart 600 or a component carried by the cart 600 (e.g., an identification number). By way of another example, the visual indicators may be placed at predetermined locations on the cart 600, such that by locating the visual indicators, the controller 102 may determine a position of the cart 600 relative to the vehicle 10.

Figure 17:
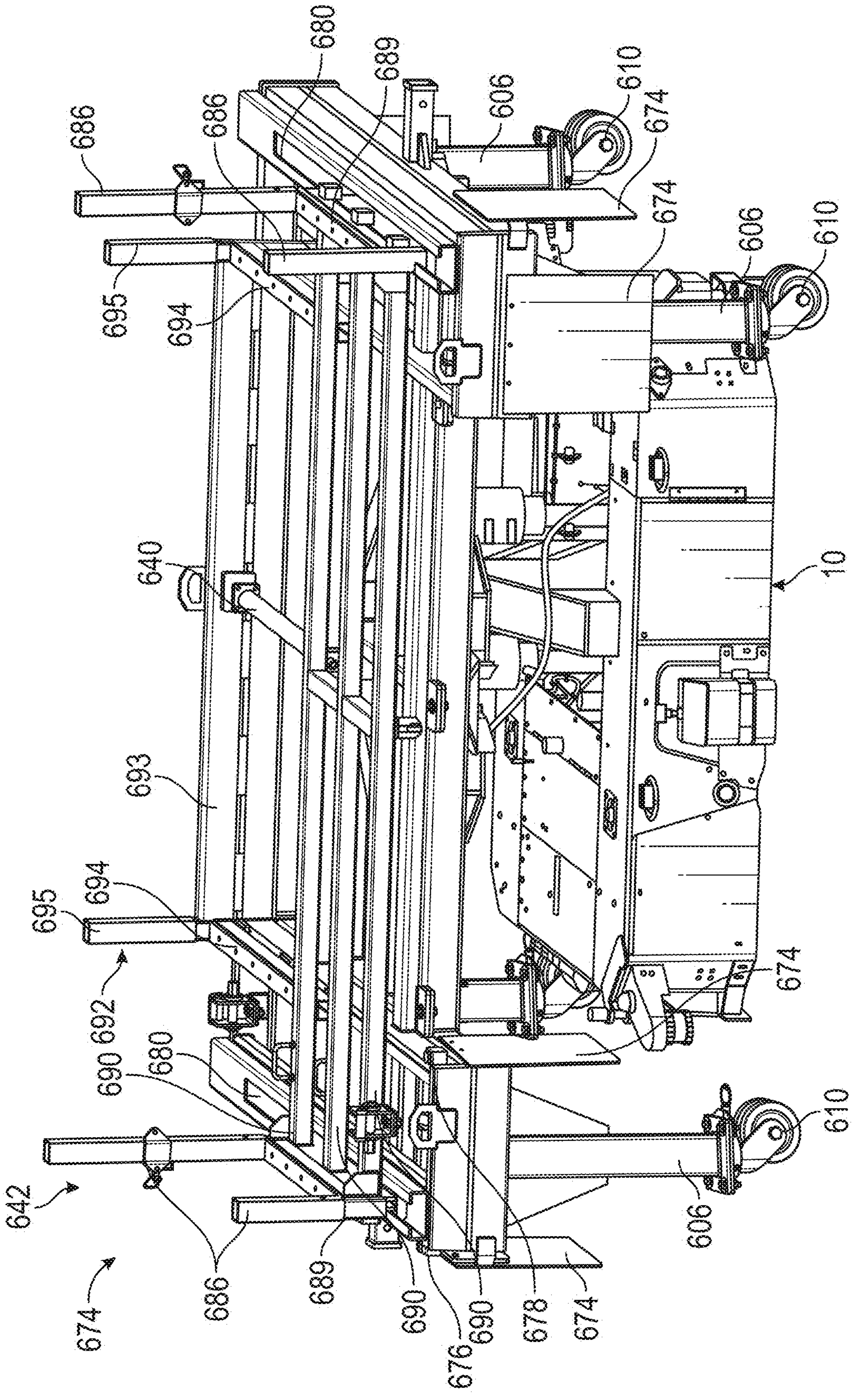
FIG. 17 is a perspective view of the vehicle and cart of FIG. 14, according to an exemplary embodiment.
Figure 18:
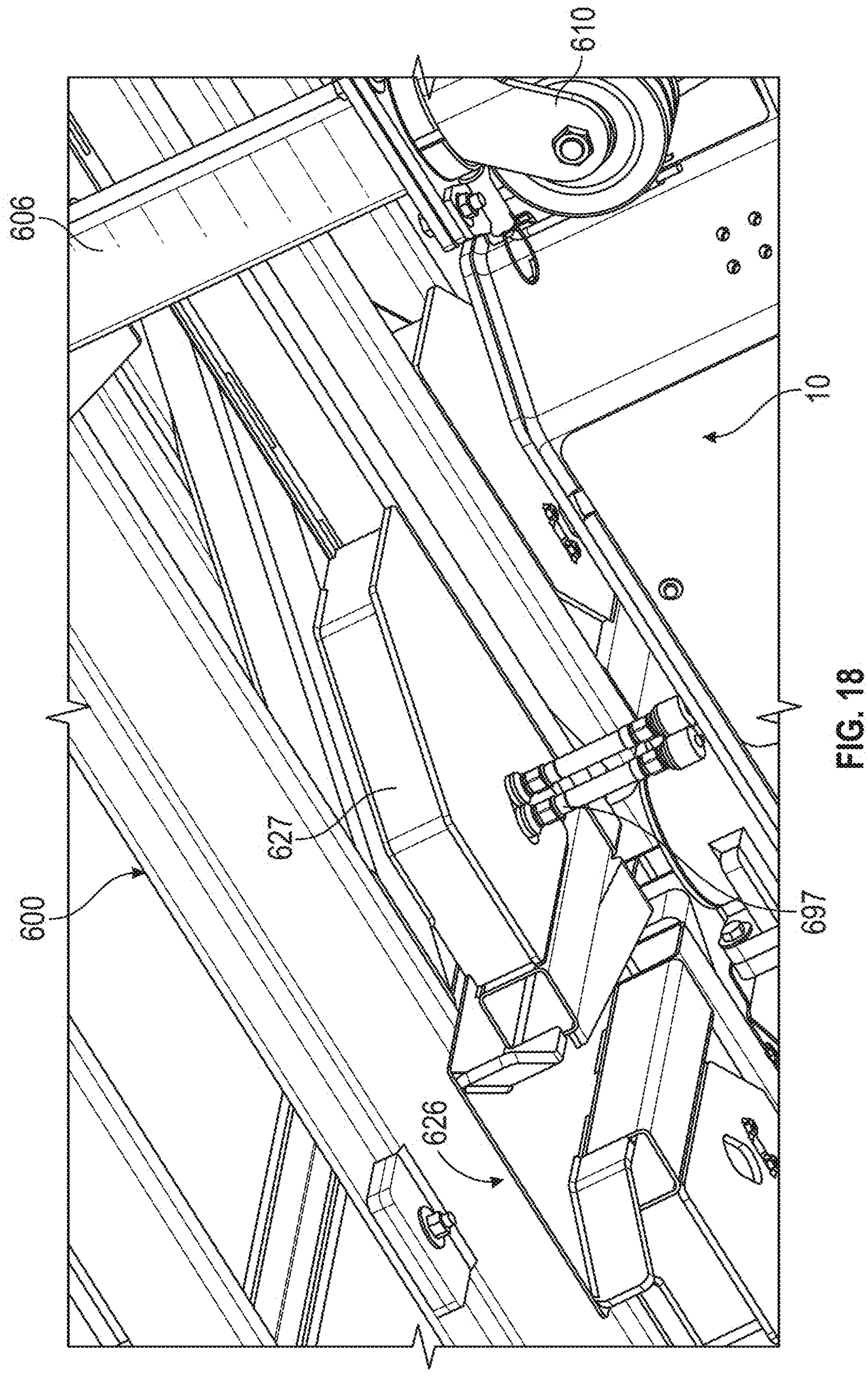
FIG. 18 is a bottom perspective view of the vehicle and cart of FIG. 14, according to an exemplary embodiment.
Figure 19:
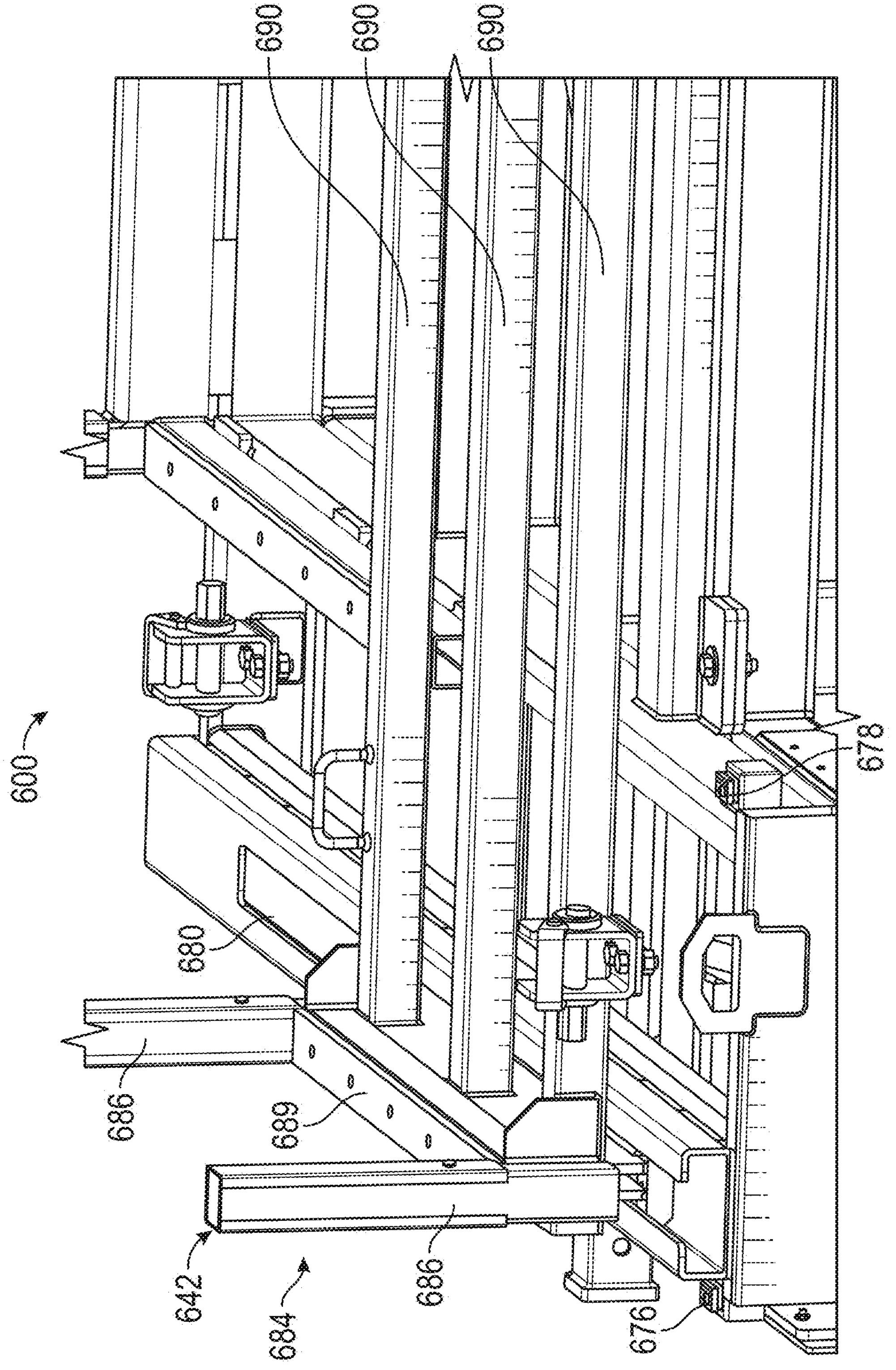
FIG. 19 is a top perspective view of the cart and cradle of FIG. 14, according to an exemplary embodiment.

Referring to FIGS. 17 and 18, the top portion 612 of the cart 600 includes a first switch 676 and a second switch 678 coupled to the frame 602. The first switch 676 and the second switch 678 are configured to control movement of the actuator 640 to reposition of the cradle 642. The actuator 640, the first switch 676, and the second switch 678 may be operatively coupled to the controller 102, and the controller 102 may operate the actuator 640 based on inputs received through the first switch 676 and the second switch 678. The first switch 676 may be operated to indicate a desired direction of motion (e.g., forward or backward). The controller 102 may require the operator to interact with (e.g., press) the second switch 678 simultaneously with the first switch 676 in order to enable operation of the first switch 676. The controller 102 may prevent operation of the actuator 640 unless both of the switches are pressed simultaneously. This may verify the operator's intent and prevent unintentional operation of the actuator 640.

A of slots 680 are arranged along the seventh frame member 658 and the eighth frame member 660 of the cart 600, and are configured to receive the cradle 642. The slots 680 extend from locations vertically aligned with the ninth frame member 662 and the eleventh frame member 666 to locations closer to the tenth frame member 664 and the twelfth frame member 668 than the ninth frame member 662 and the eleventh frame member 666. The cradle 642 is configured to extend between and slide along the slots 680.

Referring now to FIGS. 14-17 and 19, the cradle 642 includes a frame 684. The frame 684 includes series of vertical members 686, a series of lateral members 689, and a series of longitudinal members 690, that are fixedly coupled (e.g., welded) to one another to form the cradle 642. The lateral members 689 are each slidably received within one of the slots 680. The longitudinal members 690 extend between the lateral members 689 and are configured to receive the boom assembly 68. The vertical members 686 extend upward from the lateral members 689, and are configured to prevent the boom assembly 68 from leaving the cradle 642.

The cart 600 further includes a secondary cradle 692 fixedly coupled to the frame 602. The secondary cradle 692 includes a series of lateral members 693, a longitudinal member 694, and a series of vertical members 695. The longitudinal member 694 extends between the tenth frame member 664 and the twelfth frame member 668, and is substantially parallel and offset from the third frame member 650 along the second direction. The lateral members 693 each extend from the longitudinal member 694 towards the second frame member 648. The vertical members 695 each extend from the lateral members 693 and the longitudinal member 694. The actuator 640 extends from the longitudinal member 694 of the secondary cradle 692. The cradle 642 is vertically offset from the secondary cradle 692, facilitating movement of the cradle 642 relative to the secondary cradle 692.

Figure 14:
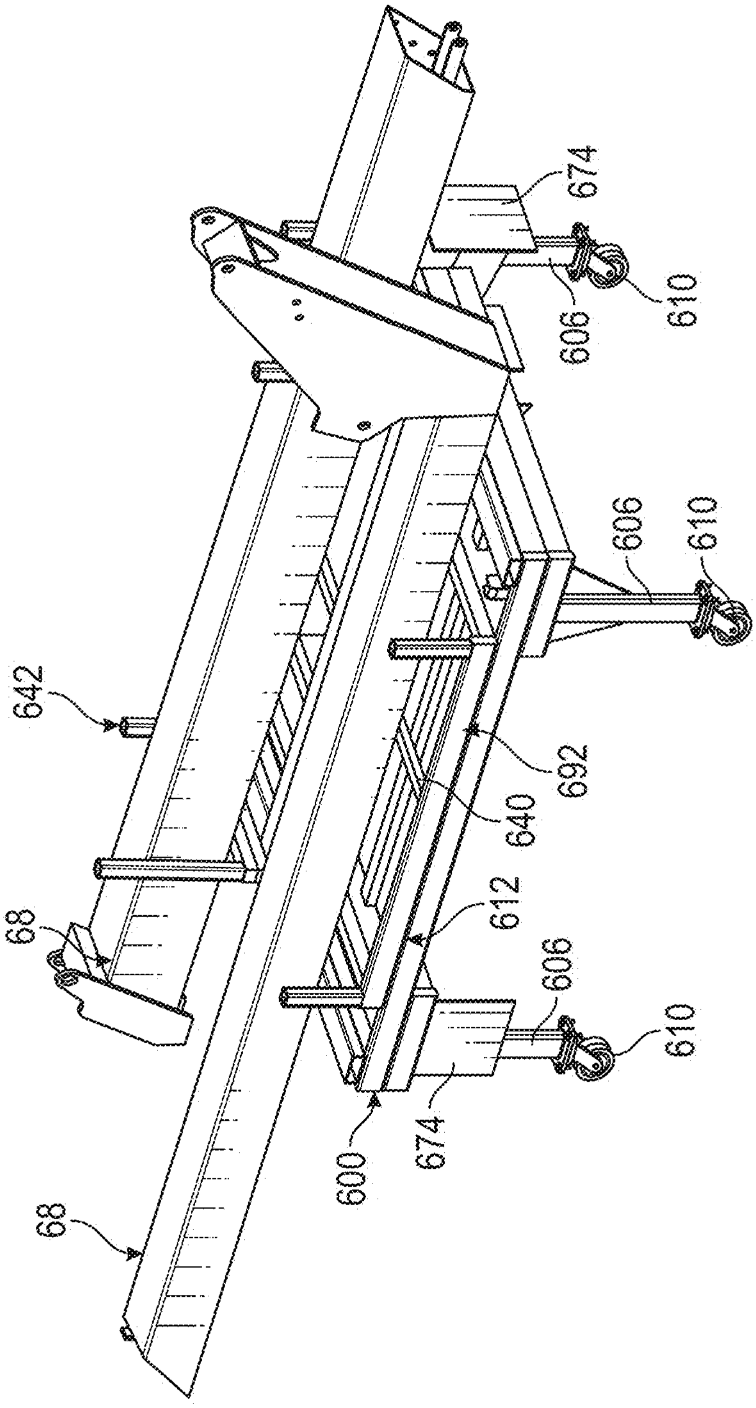
FIG. 14 is a perspective view of a vehicle, a cart including casters, and booms, according to an exemplary embodiment.
Figure 15:
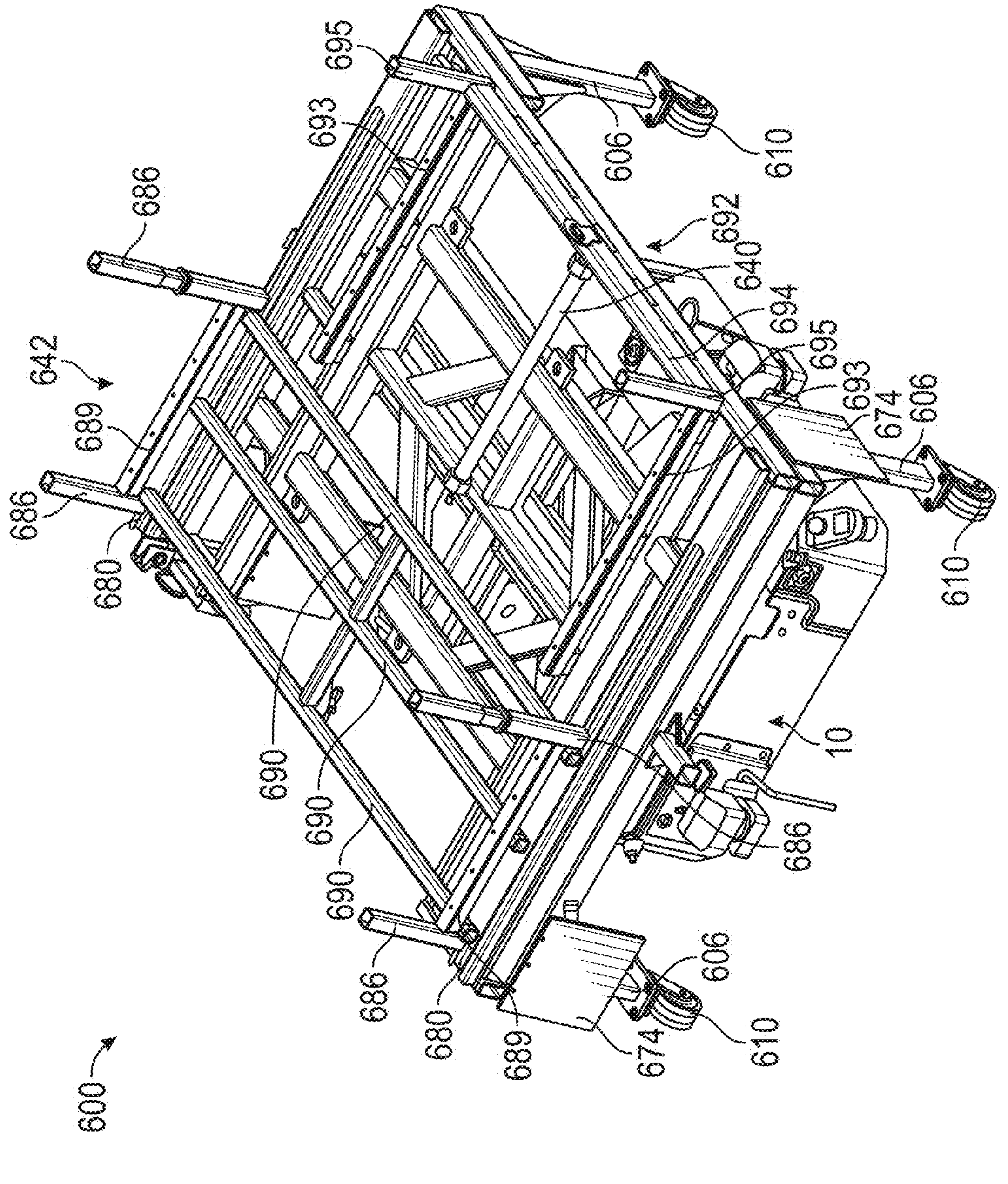
FIG. 15 is a top perspective view of the cart of FIG. 14, according to an exemplary embodiment.
Figure 16:
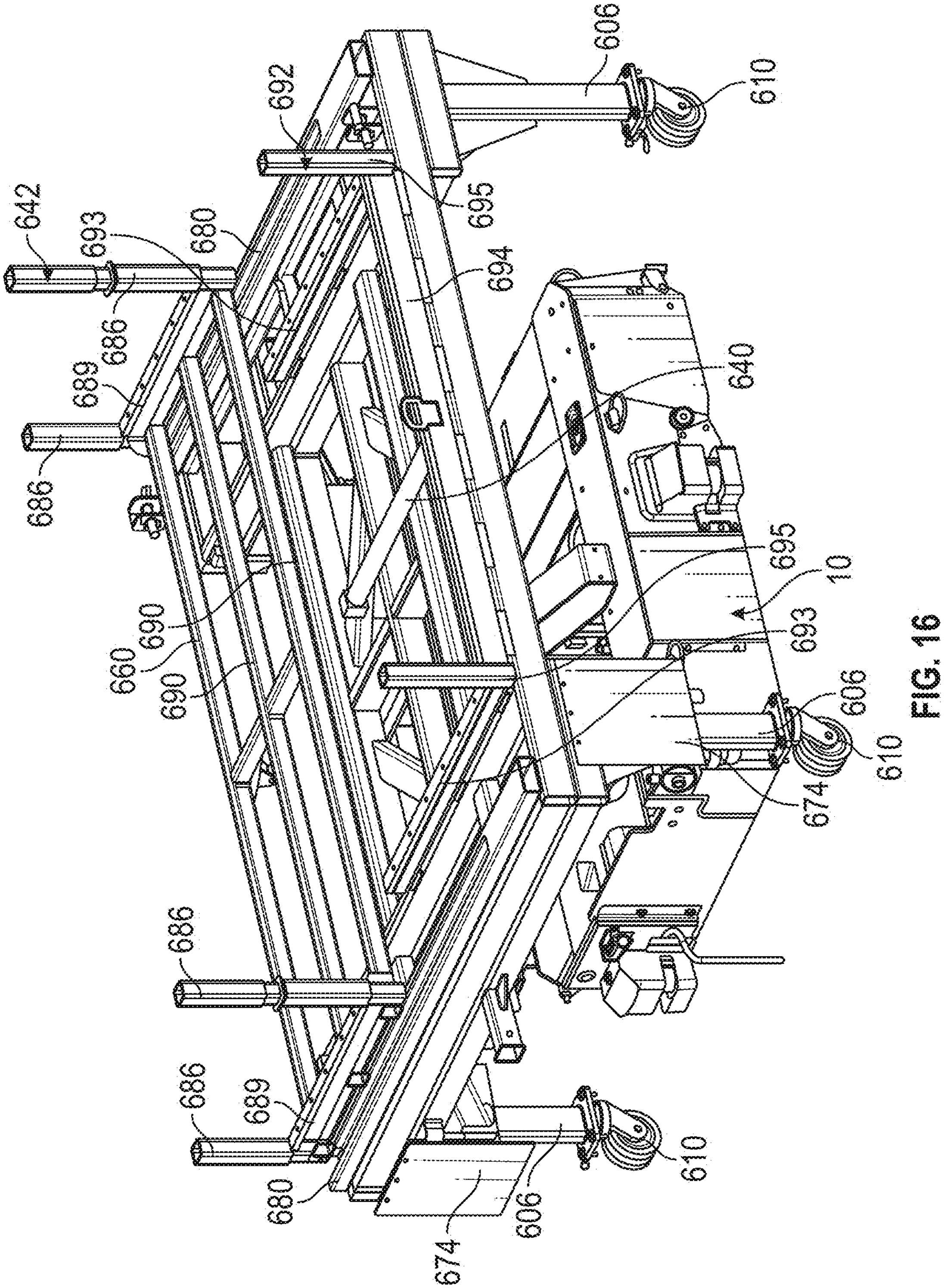
FIG. 16 is a perspective view of the vehicle and cart of FIG. 14, according to an exemplary embodiment.

As shown in FIG. 14, a first boom assembly 68 may be received within and supported by the cradle 642. In response to a user interaction with the first switch 676 and the second switch 678, the actuator 640 may reposition the cradle 642 with the first boom assembly 68 into the position shown in FIG. 14. A second boom assembly 68 may then be received within and supported by the secondary cradle 692.

Referring now to FIG. 18, the cart 600 includes an actuator connection 697. The actuator connection 697 includes a pair of conduits or hoses that fluidly couple the actuator 640 to a pump onboard the vehicle 10. The hoses of the actuator connection 697 may extend from a pump within the vehicle 10, through an upper surface of the vehicle 10, through one of the frame plates 627, and to the actuator 640. The actuator connection 697 may be disconnected when moving the cart 600 relative to the vehicle 10.

Figure 20:
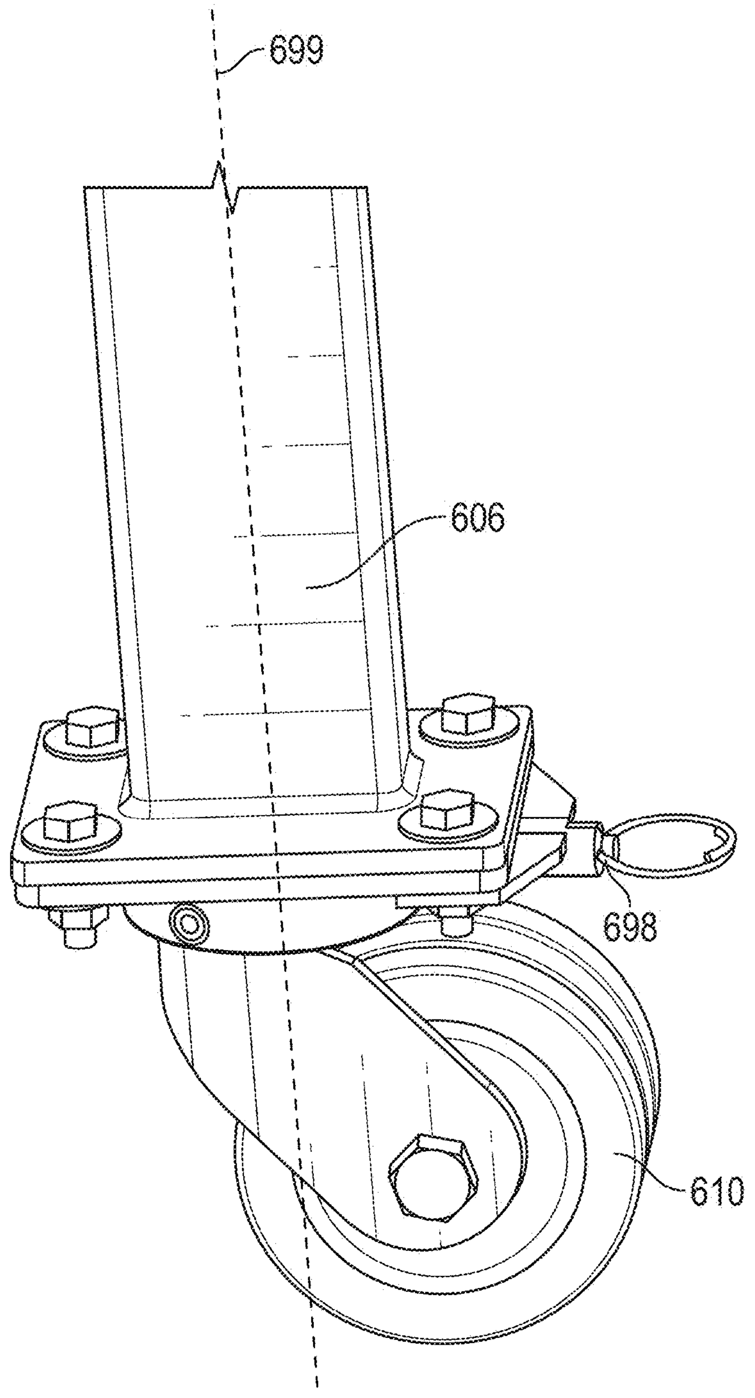
FIG. 20 is a top perspective view of one of the casters of FIG. 14, according to an exemplary embodiment.

Referring now to FIG. 20, each of the casters 610 includes a pin 698. The pin 698 is reconfigurable between a first state and a second state. In the first state, the pin 698 engages the caster 610 to prevent the caster 610 rotating about a vertical axis 699. In the second state, the pin 698 is disengaged from the caster 610, and the caster 610 is permitted to rotate about the vertical axis 699 (e.g., in the first state the location of the caster 610 is fixed and in the second state the caster 610 can spin freely). A user may manually reconfigure the pin 698 between the first state and the second state (e.g., by pulling the pin 698). By way of example, the first state may be used when pulling the cart 600 through the tug 624, and second state may be used when connecting the cart 600 to the vehicle 10.

Cart Interface

Figure 23:
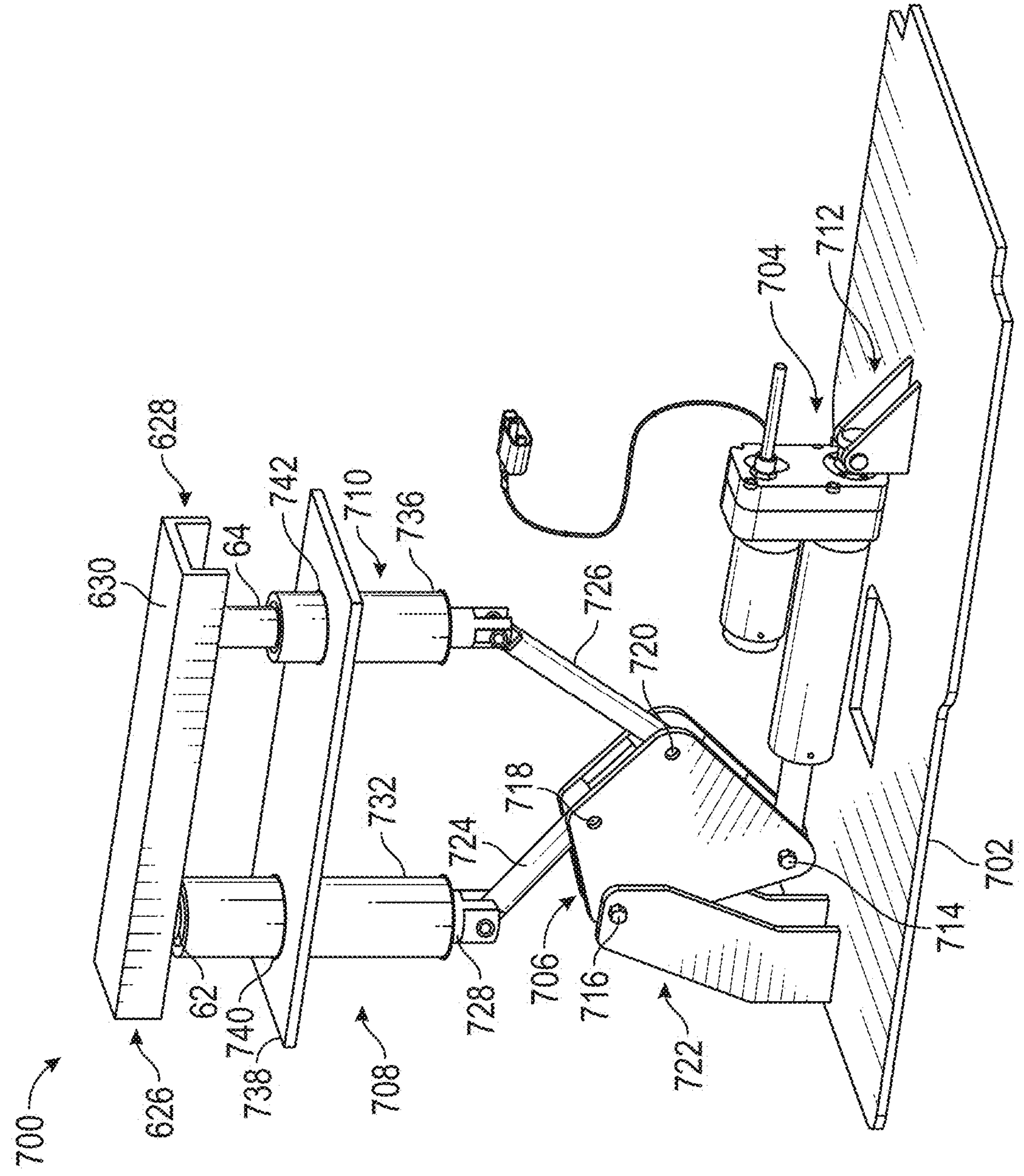
FIG. 23 is a perspective view of a cart interface, according to an exemplary embodiment.
Figure 24:
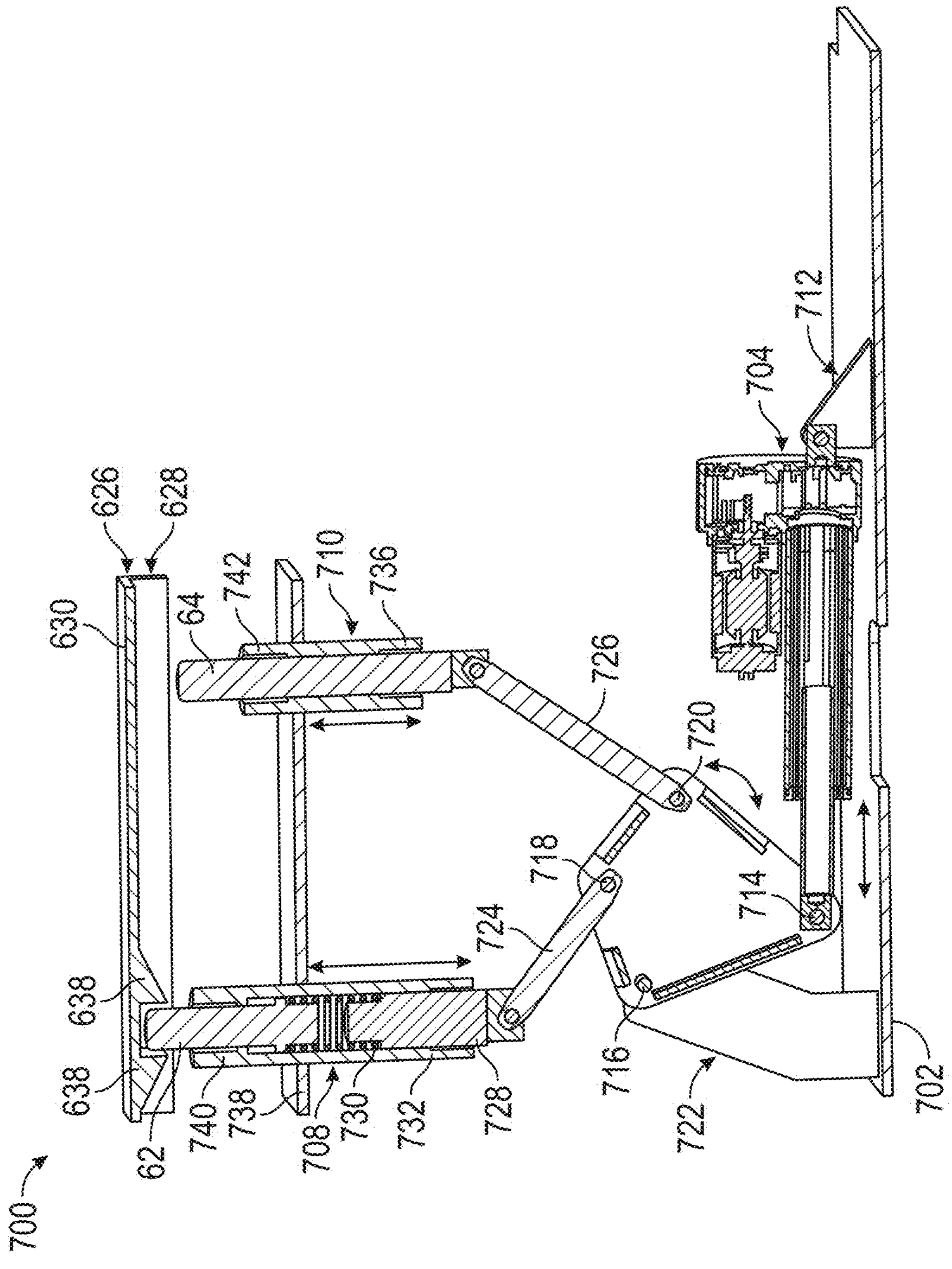
FIG. 24 is a cross-sectional view taken along a right side of the cart interface of FIG. 23, according to an exemplary embodiment.

Referring generally to FIGS. 23 and 24, a cart interface or coupling assembly, shown as cart interface 700, may be coupled to the frame 12 of vehicle 10. The cart interface 700 may be an example of the cart implement 60. The cart interface 700 includes an actuator coupled to a mounting interface, which is configured to be mounted (e.g., removably coupled) to the frame 12 of the vehicle 10. The actuator engages a cam plate coupled to one or more pin assemblies configured to engage the bottom portion 614 of the cart 600. In some embodiments, the one or more pin assemblies engage the cart 600 to couple the vehicle 10 to the cart 600.

FIG. 23 shows a coupling assembly, shown as cart interface 700, which includes a mounting plate or base plate, shown as mounting interface 702, an actuator 704 (e.g., a linear actuator, hydraulic actuator, electric actuator, pneumatic actuator, etc.), a cam assembly or rotating plate, shown as cam plate 706, a first pin assembly 708 coupled to the cam plate 706, and a second pin assembly 710 coupled to the cam plate 706. The first pin assembly 708 and the second pin assembly 710 are configured to engage the bottom portion 614 of the cart 600. In some embodiments, the first pin assembly 708 and the second assembly 710 engage a portion of the channel 626 of the cart 600. In some embodiments, the mounting interface 702 is coupled to the frame 12 of the vehicle 10. In other embodiments, the mounting interface 702 is integrally formed with the frame 12 or the top surface 30 of the vehicle 10. In some embodiments, the cart interface 700 includes more or fewer pin assemblies than a first pin assembly 708 and a second pin assembly 710.

The actuator 704 is coupled to the mounting interface 702 by a first mounting bracket 712. In some embodiments, the actuator 704 is rotatably or pivotably coupled to the first mounting bracket 712 to permit movement of the actuator 704 relative to the mounting interface 702 (e.g., as the cam plate 706 rotates). In some embodiments, the actuator 704 includes an electric motor, which may be configured to drive, power, or move the actuator 704 to actuate. In some embodiments, the actuator 704 is an electric linear actuator. A distal end portion of the actuator 704 is further coupled to the cam plate 706.

The cam plate 706 defines one or more apertures or aperture pairs, shown as a first aperture 714, a second aperture 716, a third aperture 718, and a fourth aperture 720. The first aperture 714 is positioned towards the bottom (e.g., in a direction towards the mounting interface 702) of the cam plate 706 and receives a fastener (e.g., bolt, rivet, screw, or other fastening device) to pivotally couple an end portion of the actuator 704 to the cam plate 706. The second aperture 716 is positioned towards the front (e.g., in a direction away from the actuator 704) of the cam plate 706 and receives a fastener to pivotally couple the cam plate 706 to the mounting interface 702 by a second mounting bracket 722. The third aperture 718 is positioned towards the top (e.g., in a direction away from the mounting interface 702) of the cam plate 706 and receives a fastener to pivotally couple the cam plate 706 to the first pin assembly 708 by or through a first linkage 724. The fourth aperture 720 is positioned towards the rear (e.g., in a direction towards the actuator 704) of the cam plate 706 and receives a fastener to pivotally couple the cam plate 706 to a second pin assembly 710 by or through a second linkage 726. In some embodiments, the position and/or quantity of the first aperture 714, the second aperture 716, the third aperture 718, or the fourth aperture 720 may vary based on one or more of a shape or size of the cam plate 706, the position or orientation of the actuator 704, the position or orientation of the first mounting bracket 712 or the second mounting bracket 722, or the position, orientation, or quantity of pin assemblies (e.g., the first pin assembly 708, the second pin assembly 710).

FIG. 24 shows a cross-sectional view of the cart interface 700, according to an exemplary embodiment. Referring to FIGS. 23 and 24, the first pin assembly 708 includes the first linkage 724, a first rod, shaft, or sliding member, shown as first pin 728, coupled to the first linkage 724, a second rod or shaft, shown as driving pin 62, a biasing element, shown as spring 730, and a housing 732 that receives a portion of the pin 728 and the driving pin 62. In some embodiments, the pin 728 is configured to move along a central axis defined by the housing 732 and engage the spring 730, which in turn engages the driving pin 62. The housing 732 limits movement of the driving pin 62 and the pin 728 except along the central axis. In such embodiment, the engagement of the spring 730 with the driving pin 62 applies a biasing force onto the driving pin 62 that biases the driving pin 62 to move upward along the central axis defined by the housing 732, toward the plate 630 of the channel 626.

The spring 730 has an uncompressed length. If the driving pin 62 is not in engagement with plate 630, the spring 730 is permitted to expand to the uncompressed length without resistance. Accordingly, in such a situation, the driving pin 62 has a predetermined vertical offset distance from the pin 728. Varying the vertical position of the pin 728 raises or lowers the driving pin 62. If the driving pin 62 engages the plate 630, the plate 630 limits upward movement of the driving pin 62 and begins to compress the spring 730. Varying the vertical position of the pin 728 increases or decreases the biasing force of the spring 730 and thus the biasing force applied to the plate 630 through the driving pin 62.

In some situations, such as when the vehicle 10 drives relative to the cart 600, the drive pin 62 moves along a channel 626 (e.g., along one of the longitudinal axis 632 or the lateral axis 634). As the drive pin 62 moves along the channel 626, the driving pin 62 may encounter one of the positioning members 638. The driving pin 62 may engage the positioning member 638, and the positioning member 638 may force the driving pin 62 downward and compress the spring 730. Once the driving pin 62 reaches the space between the positioning members 638, the spring 730 may force the driving pin 62 upward and into the space.

The second pin assembly 710 includes the second linkage 726, a turning pin 64, and a housing 736 that receives a portion of the turning pin 64. In some embodiments, the turning pin 64 is configured to move along a central axis defined by the housing 736 and engage the plate 630 of the channel 626. Because the second linkage 726 is directly coupled to the turning pin 64, the turning pin 64 does not have the freedom of movement relative to the second linkage 726 that the driving pin 62 is provided by the spring 730. Accordingly, each position of the second linkage 726 has a corresponding position of the turning pin 64.

The first pin assembly 708 and the second pin assembly 710 are coupled to one another by a plate 738. The plate 738 includes a first aperture 740 that receives the housing 732 of the first pin assembly 708 and a second aperture 742 that receives the housing 736 of the second pin assembly 710. The housing 732 and the housing 736 are both fixedly coupled to the plate 738. Accordingly, the plate 738 prevents movement of the housing 732 relative to the housing 736.

Referring to FIGS. 23 and 24, the cart interface 700 has one degree of freedom (e.g., as illustrated by two-sided arrows). By way of example, the actuator 704 may actuate (e.g., extend or retract) to move or position the cam plate 706 along a substantially horizontal axis or substantially parallel axis relative to the mounting interface 702. As such, the actuator 704 translates to position a lower portion (e.g., towards the first aperture 714) of the cam plate 706. By way of another example, as the actuator 704 translates the lower portion of the cam plate 706, the actuator 704 causes the cam plate 706 to pivot (e.g., rotate) about the second aperture 716. As the cam plate 706 pivots about the second aperture 716, lower ends of the first linkage 724 and the second linkage 726 also rotate about the lateral axis of the second aperture 716. This rotation causes the first linkage 724 to move the first pin assembly 708 along the housing 732 and causes the second linkage 726 to move the second pin assembly 710 along a substantially vertical axis or substantially perpendicular axis relative to the mounting interface 702 to engage or disengage the plate 630 of the channel 626.

In operation, the actuator 704 may be used to reposition the driving pin 62 and the turning pin 64 and control engagement between the vehicle 10 and the cart 600. Each position of the actuator 704 may have a corresponding position of the cam plate 706. Accordingly, by controlling the extension of the actuator 704, the positions of the driving pin 62 and the turning pin 64 may be controlled. In some embodiments, the actuator 704 includes a sensor 112 that provides feedback regarding the position or extended length of the actuator 704. The controller 102 may utilize this feedback to perform closed-loop control over the position of the cam plate 706.

In some embodiments, the actuator 704 extends fully, moving the cam plate 706 to an extreme clockwise position, referred to as a fully retracted position. In the fully retracted position, the driving pin 62 and the turning pin 64 are retracted low enough to where neither the driving pin 62 nor the turning pin 64 can enter into the channel 626. Accordingly, the cart interface 700 does not interface (e.g., is incapable of interfacing) with the cart 600. The fully retracted position may be useful when it is desirable for the vehicle 10 navigate beneath a cart 600 without engaging the cart 600. The actuator 704 may return the cam plate 706 to the fully retracted position at any time to release the vehicle 10 from engagement with a cart 600.

In some embodiments, the actuator 704 retracts or actuates the cam plate 706 to pivot counterclockwise about the second aperture 716 to an extended or single engagement position. In the single engagement position, the cam plate 706 is positioned such that the second driving pin 62 of the first pin assembly 708 extends high enough to enter into the channel 626, but the turning pin 64 of the second assembly 710 is low enough to prevent the turning pin 64 from engaging with the channel 626. The single engagement position may be used when initially coupling the vehicle 10 to a cart 600. By way of example, a vehicle 10 may begin by approaching the cart 600. The vehicle 10 may align the driving pin 62 with a channel 626 of the cart 600. The increased width of the second portion 635 may facilitate this alignment. As the vehicle 10 continues to move toward the cart 600, the tapered shape of the second portion 635 may automatically align the first portion 633 with the driving pin 62.

The vehicle 10 may continue to move along the length of the channel 626 until the driving pin 62 reaches a positioning member 638. The spring 730 may compress to permit the driving pin 62 to move along the positioning member 638 until the driving pin 62 reaches the space between the driving pints 62. The spring 730 may then force the driving pin 62 into the space between the positioning members 638. Engagement between the tall, flat walls of the positioning members 638 and the driving pin 62 prevents the driving pin 62 from leaving the space. Accordingly, the cart 600 is then positionally tied (i.e., forced to move along the same path) as the vehicle 10. In this configuration, the substantially vertical axis 636 and the central axis 46 of the vehicle 10 may be aligned. Accordingly, the vehicle 10 can freely rotate about its central axis 46 to adjust the orientation of the vehicle 10 relative to the cart 600. By way of example, the vehicle 10 may drive in a first direction (e.g., north), then turn and drive in a second direction (e.g., west) without varying an orientation of the cart 600.

In some embodiments, the actuator 704 extends to actuate the cam plate 706 to pivot about the second aperture 716 to a neutral or dual engagement position. In the dual engagement position, the cam plate 706 is positioned such that the driving pin 62 of the first pin assembly 708 and the turning pin 64 of the second assembly 710 are raised to a height where both the driving pin 62 and the turning pin 64 would extend into the channel 626. If the turning pin 64 is aligned with one of the channels 626, the turning pin 64 will enter into the channel 626 and prevent rotation of the cart 600 relative to the vehicle 10. Accordingly, the dual engagement position may be useful to adjust the orientation of the cart 600. Due to the arrangement of the channels 626, the vehicle 10 may have twice as many orientations where the turning pin 64 may enter a channel 626 as there are channels 626 (e.g., two for each channel 626).

If the actuator 704 attempts to bring the turning pin 64 to the dual engagement position without the turning pin 64 being aligned with one of the channels 626, the turning pin 64 may instead engage a guide 628 and/or a frame plate 627. Because the frame plates 627 are flush with the guides 628, the vehicle 10 may simply rotate to slide the turning pin 64 along the frame plates 627 and the guides 628 until alignment is reached. At that point, the actuator 704 may force the turning pin 64 into the channel 626.

In the single engagement position and the dual engagement position, the turning pin 64 may be separated from the plate 630 or may lightly touch the plate 630. Accordingly, minimal vertical force is transferred between the cart 600 and the vehicle 10. Because of this, the vehicle 10 generally supports only the weight of the vehicle 10. While the cart 600 and/or any products supported by the cart 600 may have a significant weight, the majority of that weight may be directed to the ground through the casters 610. Accordingly, the structure of the vehicle 10 can be made lighter and more cost effective, as the vehicle 10 does not have to support the additional weight of the cart load.

In some embodiments, the actuator 704 is configured to actuate the cam plate 706 so that the driving pin 62 and the turning pin 64 are in a traction configuration or traction position. By way of example, while the vehicle 10 is driving the cart 600 (e.g., the driving pin 62 is extended upward and arranged between the positioning members 638 and the turning pin 64 is extended upward and received within at least one of the channels 626 in the dual engagement position), the controller 102 may detect, via the sensors 112 (e.g., a wheel encoder, a speed sensor, etc.), that one or more of the tractive elements 44 have lost or reduced traction (e.g., detect wheel slip, or wheel traction below a predefined threshold). In response to detecting that one or more of the tractive elements have lost or reduced traction, the controller 102 may instruct the actuator 704 to rotate the cam plate 706 (e.g., counterclockwise from the perspective of FIG. 23) so that the driving pin 62 remains between the positioning members 638 and the turning pin 64 is actuated further upwardly toward the plate 630. Specifically, the turning pin 64 is actuated so that a distal end of the turning pin 64 engages the plate 630, which acts to lift the cart 600 and apply a downward force (e.g., toward a ground on which the vehicle 10 is traveling) on the mounting interface 702. The downward force on the mounting interface 702 is transferred to the frame 12 and to the tractive elements 44 to in an attempt to increase traction. Once the controller 102 determines that the tractive elements 44 have stopped spinning, the controller 102 may command the actuator 704 to return the cam plate 706 to the dual engagement position.

Alternative Cart Interface

Referring generally to FIGS. 25-38, a cart interface or coupling assembly is shown as cart interface 3000, according to an exemplary embodiment. The cart interface 3000 may be substantially similar to the cart interface 700 except as otherwise specified herein. Accordingly, any description with respect to the cart interface 700 may apply to the cart interface 3000 except as otherwise specified herein. Additionally, any embodiment of the vehicle 10 that includes the cart interface 700 may include the cart interface 3000 in place of the cart interface 700.

Figure 25:
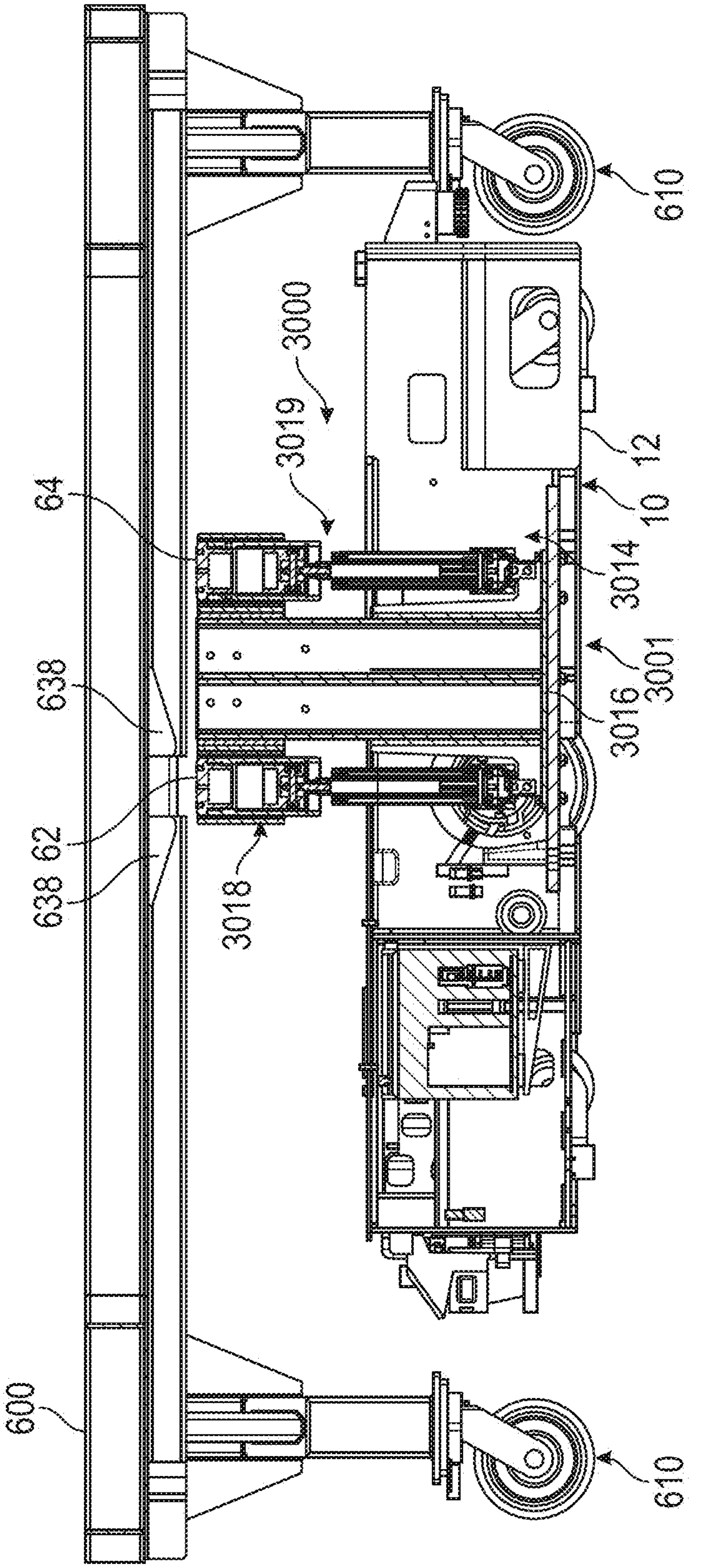
FIG. 25 is a perspective view of the vehicle of FIG. 1 equipped with a cart interface engaging the cart of FIG. 14, according to an exemplary embodiment.
Figure 26:
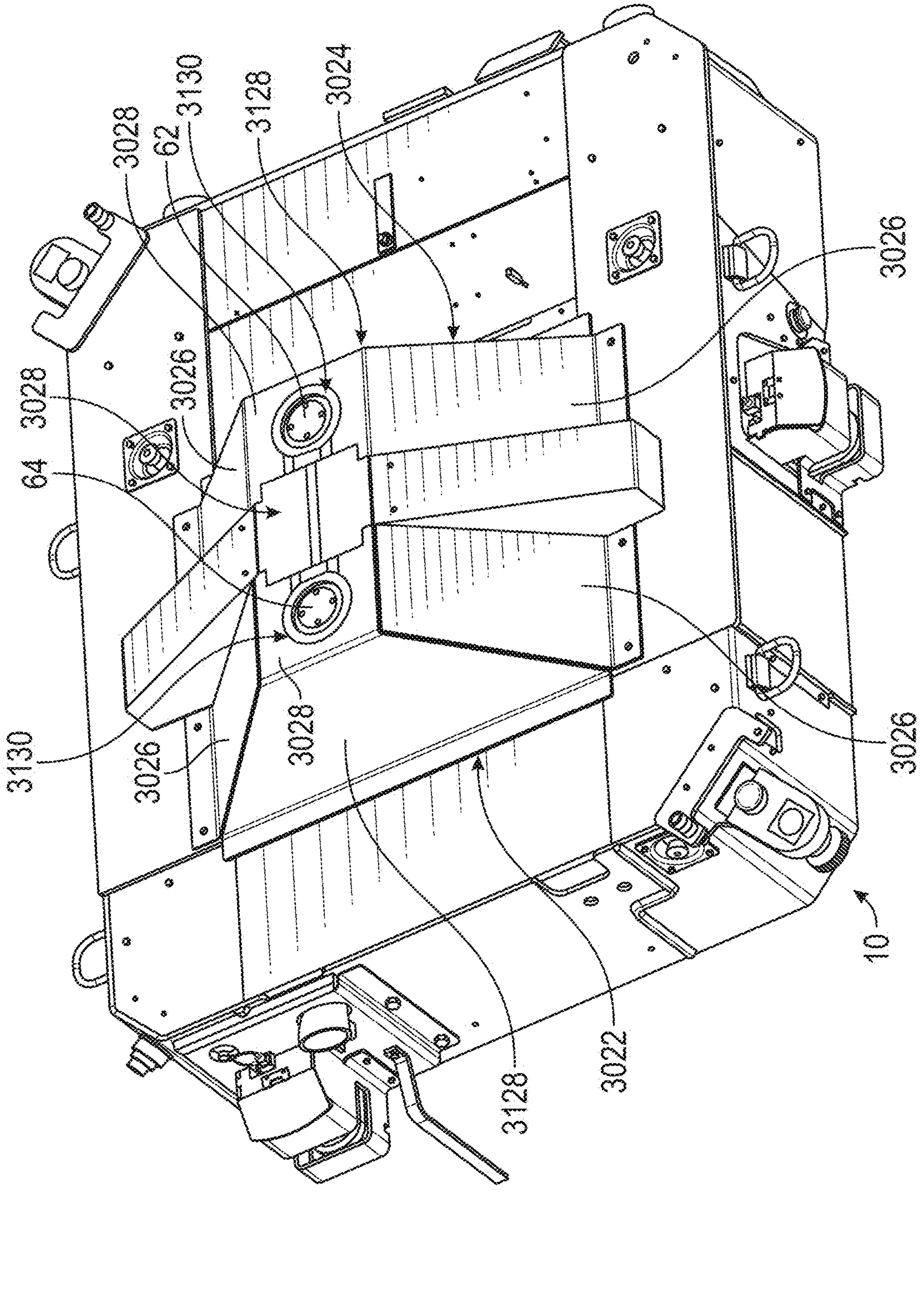
FIG. 26 is a perspective view of the vehicle of FIG. 1 with the cart interface of FIG. 25, according to an exemplary embodiment.
Figure 27:
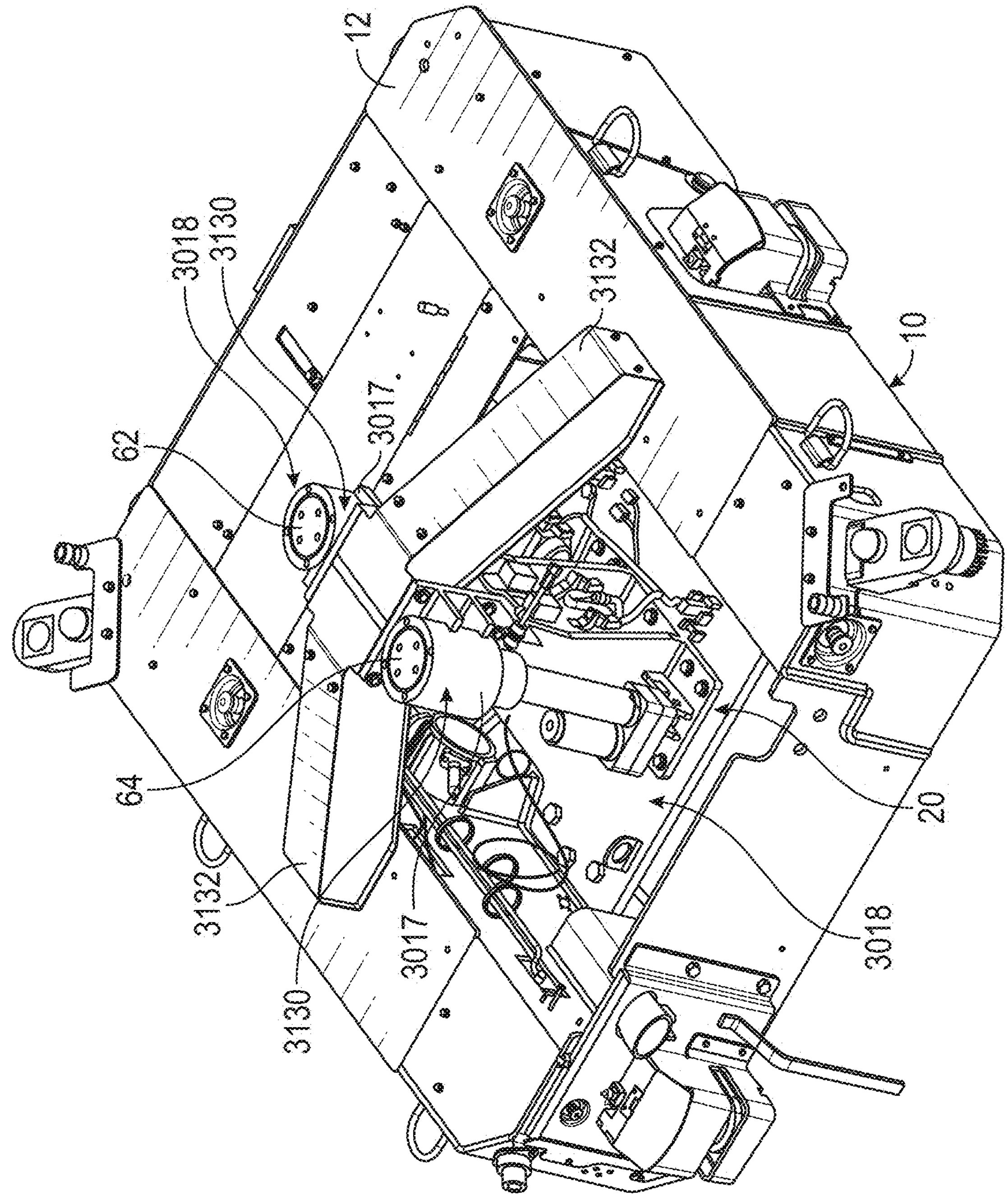
FIG. 27 is a perspective view of the vehicle of FIG. 1 with the cart interface of FIG. 25 with a pair of covers removed, according to an exemplary embodiment.

Referring to FIGS. 25-27, the cart interface 3000 includes a driving pin 62 and a turning pin 64. The driving pin 62 and the turning pin 64 engage the cart 600 to selectively cause the cart 600 to move with the vehicle 10 (e.g., selectively couple the cart 600 to the vehicle 10). FIG. 25 shows the vehicle 10 outfitted with the cart interface 3000. As shown in FIG. 26, the cart interface 3000 includes a first cover 3022 and a second cover 3024 that cover portions of the cart interface 3000 and prevent debris from entering into the vehicle 10 around the cart interface 3000. Both the first cover 3022 and the second cover 3024 have a pair of side surfaces 3026 (e.g., angled with respect to a horizontal plane, facing laterally outward), a top surface 3028, and a pair of longitudinal surfaces 3128 (e.g., a front surface and a rear surface). The side surfaces 3026 and the longitudinal surfaces 3128 are angled relative to a horizontal plane, such that the side surfaces 3026 and the longitudinal surfaces 3128 redirect any material (e.g., fasteners, rocks, dirt, or other debris) dropped onto the first cover 3022 and the second cover 3024 away from the cart interface 3000. The side surfaces 3026 face laterally outward (e.g., upward and laterally outward), the longitudinal surface 3128 of the first cover 3022 faces forward (e.g., upward and forward), and the longitudinal surface 3128 of the second cover 3024 faces rearward (e.g., upward and rearward).

The first cover 3022 and the second cover 3024 each define a hole, opening, or passage, shown as pin aperture 3130. The aperture 3130 of the second cover 3024 receives the driving pin 62. The aperture 3130 of the second cover 3024 receives the turning pin 64. The apertures 3130 facilitate extension of the driving pin 62 and the turning pin 64.

As shown in FIG. 27, the cart interface 3000 is received in the implement recess 20 defined by the frame 12 of the vehicle 10. The cart interface 3000 may be coupled to the frame 12 of the vehicle 10. The cart interface 3000 includes a first actuator assembly 3018 and a second actuator assembly 3019 coupled to and supported by a frame assembly 3001. The frame assembly 3001 is coupled to the frame 12 of the vehicle 10. By way of example, the frame assembly 3001 may be removably coupled to the frame 12 using a series of fasteners that pass through the frame assembly 3001 and engage the frame 12. A pair of actuator assemblies, shown as actuator assembly 3018 and actuator assembly 3019, include and control motion of the driving pin 62 and the turning pin 64, respectively. By way of example, the first actuator assembly 3018 may raise and lower the driving pin 62 relative to the frame 12. Similarly, the second actuator assembly 3019 may raise and lower the turning pin 64 relative to the frame 12.

Figure 28:
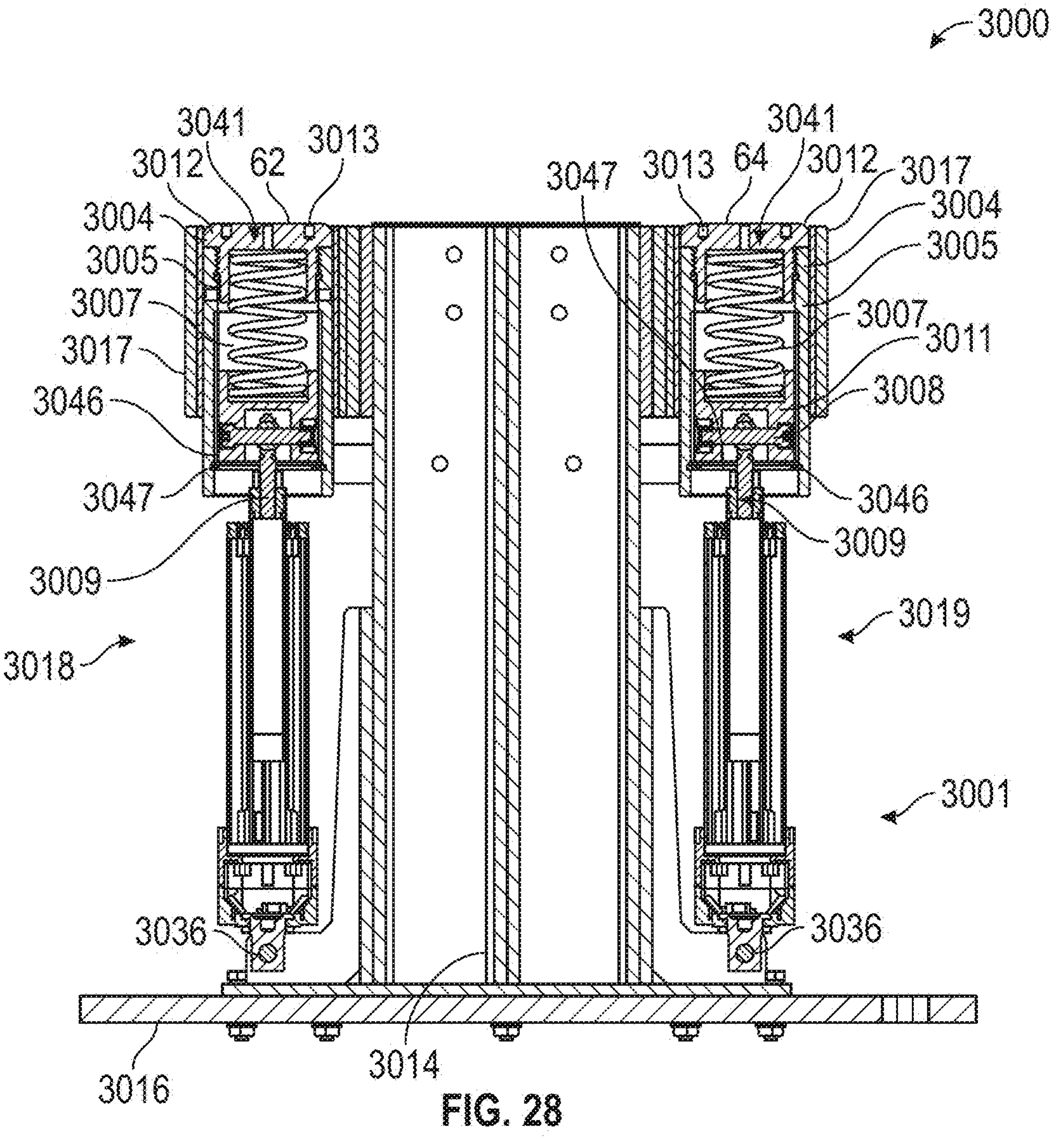
FIG. 28 is a side section view of the cart interface of FIG. 25, according to an exemplary embodiment.

Referring to FIGS. 27 and 28, the frame assembly 3001 includes a central structural portion or base, shown as base frame 3014. The base frame 3014 connects and supports the other components of the frame assembly 3001. The base frame 3014 extends vertically from a lower end portion to an upper end portion.

The frame assembly 3001 further includes a pair of receivers, receiving cups, annular members, or support arms, shown as guiding sleeves 3017. The guiding sleeves 3017 are each fixedly coupled to a top end portion of the base frame 3014. A first one of the guiding sleeves 3017 extends longitudinally forward from the base frame 3014 and receives and supports the pin 62. The other of the guiding sleeves 3017 extends longitudinally rearward from the base frame 3014 and receives and supports the turning pin 64.

The base frame 3014 includes a base plate or mounting plate, shown as mounting interface 3016, that is fixedly coupled to a lower end of the base frame 3014. The mounting interface 3016 is directly and fixedly coupled to the frame 12 to couple the cart interface 3000 to the vehicle 10. The mounting interface 3016 and the mounting interface 702 may have similar mounting features to make the cart interface 3000 interchangeable with the cart interface 700. The mounting interface 3016 generally extends horizontally (e.g., within a horizontal plane). The base frame 3014 is fixedly coupled to the mounting interface 3016 and extends upward from a top surface of the mounting interface 3016.

Referring to FIGS. 26 and 27, the frame assembly 3001 further includes a pair of support structures, outriggers, or lateral frame arms, shown as support arms 3132. The support arms 3132 are each fixedly coupled to the upper end portion of the base frame 3014 and each extend laterally outward and downward from the base frame 3014. A distal end portion of each support arms 3132 is fixedly coupled to a top surface of the frame 12 of the vehicle 10. The support arms 3132 may increase the stability of the frame assembly 3001 and limit lateral movement of the driving pin 62 and the turning pin 64 relative to the frame 12 of the vehicle 10.

Figure 29:
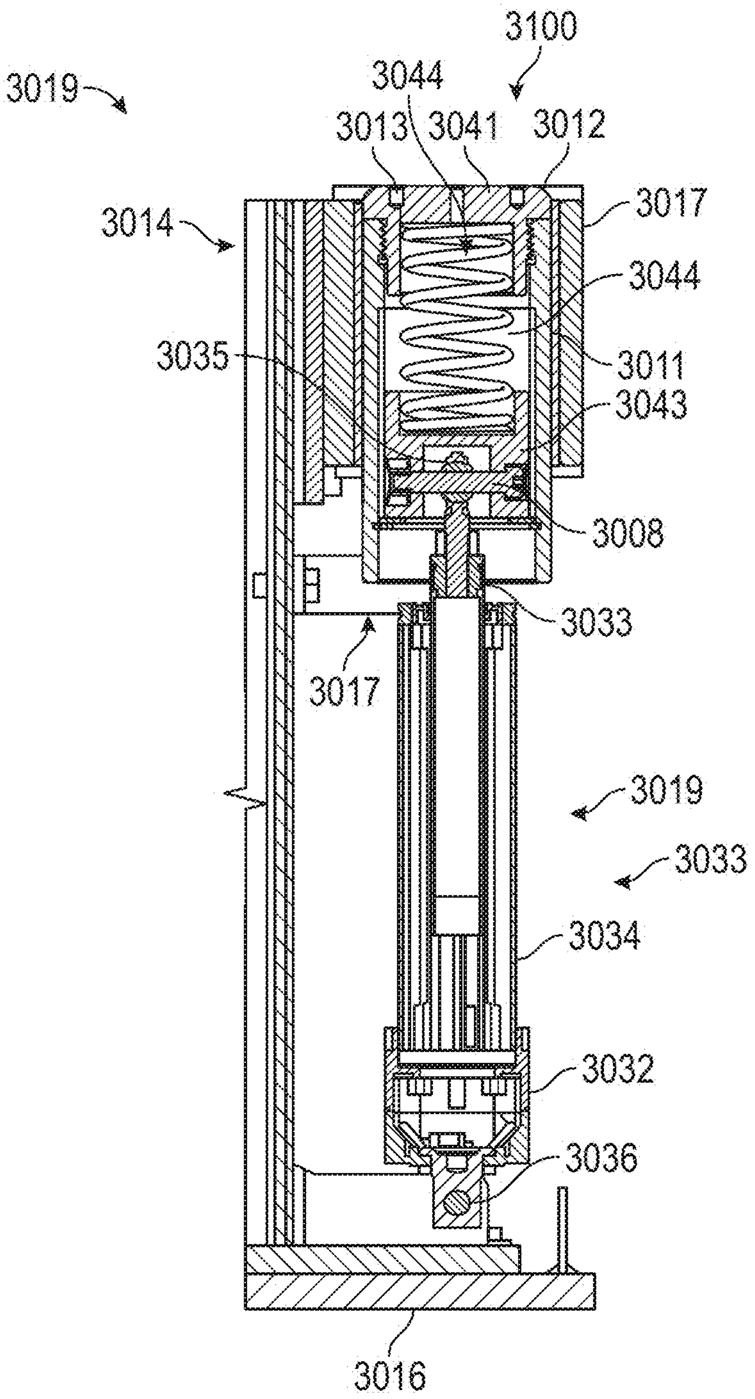
FIG. 29 is a side section view of a first pin assembly of the cart interface of FIG. 25, according to an exemplary embodiment.
Figure 31:
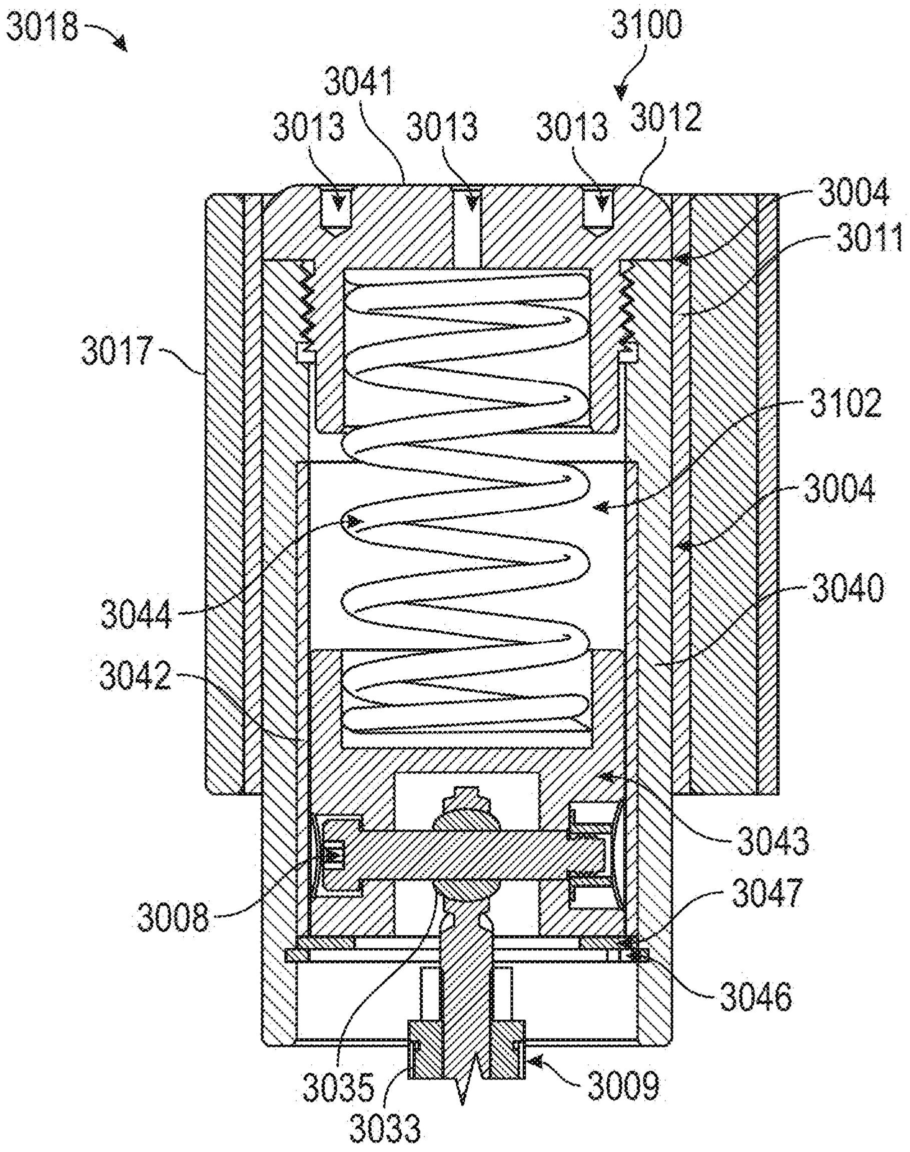
FIG. 31 is a section view of the first pin assembly of FIG. 29, according to an exemplary embodiment.

Referring to FIGS. 28, 29, and 31, the arrangements of the first actuator assembly 3018 and the second actuator assembly 3019 are shown according to an exemplary embodiment. Specifically, FIG. 28 shows both the first actuator assembly 3018 and the second actuator assembly 3019, FIG. 29 shows the second actuator assembly 3019, and FIG. 31 shows a portion of the first actuator assembly 3018. The first actuator assembly 3018 and the second actuator assembly 3019 may have similar constructions, such that the description of the components and layout of the first actuator assembly 3018 may similarly apply to the second actuator assembly 3019 and vice versa.

The first actuator assembly 3018 and the second actuator assembly 3019 each include a linear actuator (e.g., an electric linear actuator), shown as actuator 3030, and a protraction, pin, or sliding assembly, shown as pin assembly 3100. The actuator 3030 of the first actuator assembly 3018 may control raising and lowering of the pin assembly 3100 of the first actuator assembly 3018. Similarly, the actuator 3030 of the first actuator assembly 3018 may control raising and lowering of the pin assembly 3100 of the second actuator assembly 3019. The pin assembly 3100 of the first actuator assembly 3018 may serve as or include the driving pin 62. The pin assembly 3100 of the second actuator assembly 3019 may serve as or include the turning pin 64.

Figure 30:
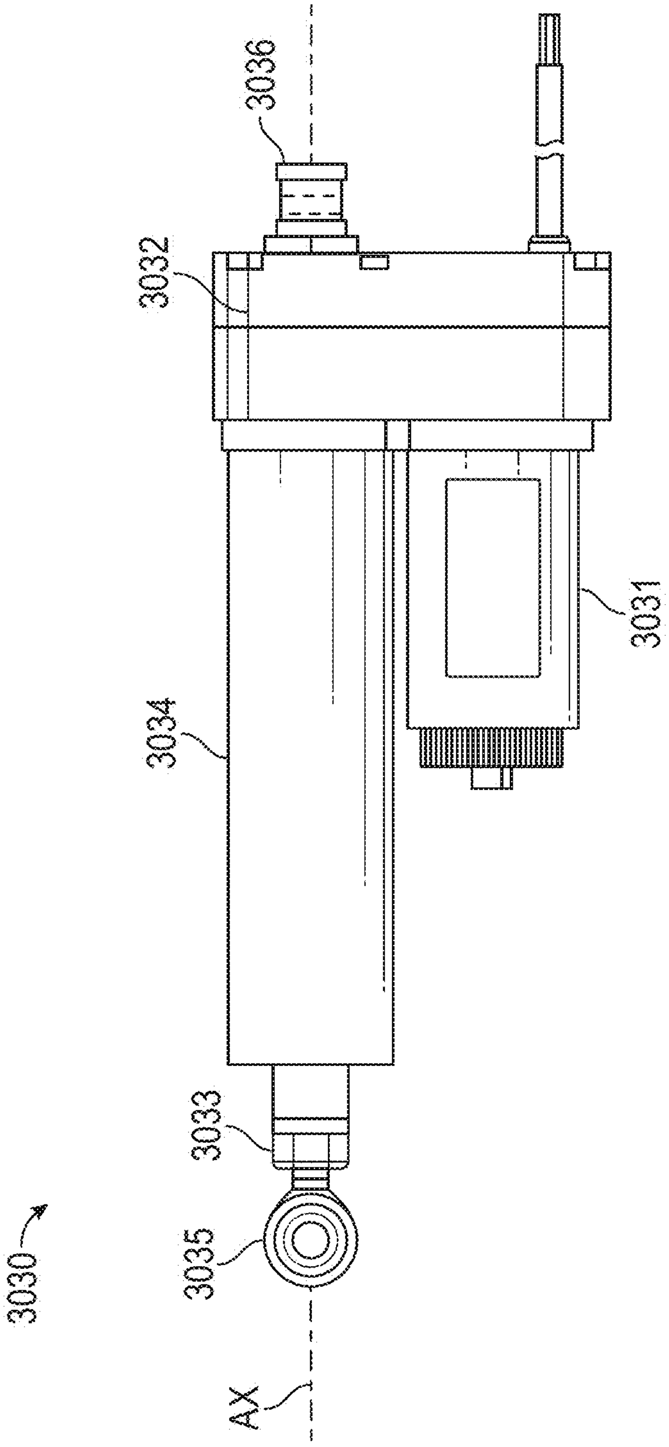
FIG. 30 is a side view of an actuator assembly of the cart interface of FIG. 25, according to an exemplary embodiment.

Referring to FIGS. 28 and 30, each of the actuators 3030 includes a motor 3031 (e.g., an electric motor, a hydraulic motor, a pneumatic motor, etc.), a power transmission or gearbox, shown as transmission 3032, a rod 3033, and a housing, shown as body 3034. The motor 3031 is coupled to the rod 3033 by the transmission 3032. The rod 3033 is slidably coupled to the body 3034, such that the rod 3033 is received within the body 3034 in a telescoping arrangement. Operation of the motor 3031 causes the rod 3033 to extend and retract relative to the body, varying an overall length of the actuator 3030. The rod 3033 has a first actuator interface 3035 at a first end of the actuator 3030 which is pivotably coupled to the first pin assembly 3002. The body 3034 has a second actuator interface 3036 at a second end of the actuator 3030 that is pivotably coupled to the frame assembly 3001 (e.g., to the base frame 3014).

In operation, the motor 3031 rotates to extend and retract the first actuator 3030 along an axis AX that is centered along the rod 3033 and the body 3034. Rotational mechanical energy from the motor 3031 may be transferred to the actuator rod 3009 by the transmission 3032. The motor 3031 my rotate in a first direction to extend the actuator 3030 outwards and raise the pin assembly 3100. The motor 3031 may rotate in an opposing second direction to retract the actuator 3030 inward and lower the pin assembly 3100. The actuator 3030 may be continuously repositionable throughout a range of motion between a fully retracted position and a fully extended position. In some embodiments (e.g., where the actuator rod 3009 includes a screw that is rotated to extend and retract the actuator rod 3009), the motor 3031 is capable of holding the actuator 3030 at any desired position within the range of motion.

Operation of the motor 3031 may be controlled by the controller 102. By way of example, the controller 102 may supply electrical energy from the batteries 110 to the motor 3031 to control operation of the motor 3031. The controller 102 may control the speed and direction of the actuator 3030 and whether the actuator 3030 is holding its current position. In some embodiments, a sensor 112 (e.g., an encoder, a linear potentiometer, etc.) provides sensor data indicating a current extended length of the actuator 3030. This sensor data may be used by the controller 102 to provide closed-loop control over the length of the actuator 3030.

Referring to FIGS. 29 and 31, each pin assembly 3100 includes an annular member, shown as pin body 3040, and an upper member, shown as pin cap 3012. The first pin body 3040 has an annular outer surface, such that the first pin body 3040 is substantially cylindrical. The threaded pin cap 3012 is in threaded engagement with the first pin body 3040, such that the first pin body 3040 is fixedly coupled to the threaded pin cap 3012. Together, the first pin body 3040 and the threaded pin cap 3012 define an internal volume 3102 (e.g., an internal pin volume) of the pin assembly 3100. The pin cap 3012 has a top surface 3041. A series of recesses or passages, shown as spanner wrench passages 3013, extend vertically downward from the top surface 3041 and into the threaded pin cap 3012. The spanner wrench passages 3013 permit engagement between a spanner wrench or other levering tool and the threaded pin cap 3012 to facilitate tightening or loosening the threaded connection between the threaded pin cap 3012 and the first pin body 3040.

Figure 32:
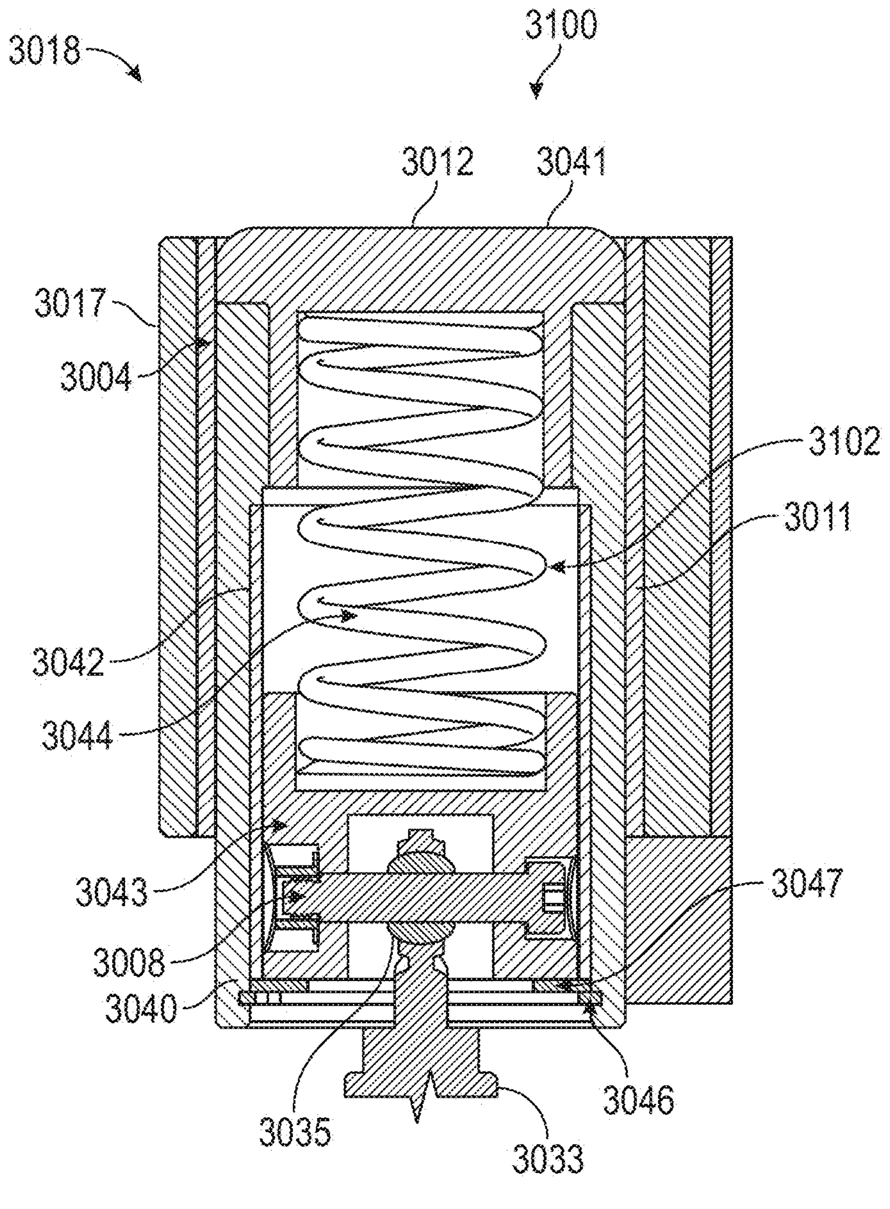
FIG. 32 is a section view of the first pin assembly of FIG. 29, according to another exemplary embodiment.

Referring to FIG. 32, an alternative embodiment of the pin assembly 3100 is shown according to an exemplary embodiment. Specifically, FIG. 32 illustrates an alternative attachment configuration of the threaded pin cap 3012 to the first pin body 3040. The pin assembly 3100 of FIG. 32 may be used in place of any of the other pin assemblies 3100 disclosed herein. In the embodiment of FIG. 32, the first pin cap 3012 is shown as being inserted and welded into the first pin body 3040. By welding the threaded pin cap 3012 to the first pin body 3040, the spanner wrench passages 3013 may be omitted.

Referring again to FIGS. 29 and 32, each guiding sleeve 3017 receives a bushing member or friction-reducing member, shown as bearing 3011, that is fixedly coupled to the guiding sleeve 3017. By way of example, the bearing 3011 may be or include a composite material. The bearing 3011 defines a vertical passage or aperture, shown as pin passage 3004, that extends vertically from a top surface of the guiding sleeves 3017 to a bottom surface of the guiding sleeves 3017. The pin assembly 3100 is received within the pin passage 3004. The bearing 3011 slidably couples the pin assembly 3100 to the guiding sleeve 3017, such that the pin assembly 3100 is slidable (e.g., vertically, up and down, etc.) along the length of the pin passage 3004. The bearing 3011 may limit lateral and longitudinal movement of the pin assembly 3100, maintaining the orientation of the pin assembly 3100 within the pin passage 3004. Accordingly, the pin assembly 3100 may remain centered within the pin passage 3004 while being translatable along the axis AX.

The pin body 3040 receives a bushing member or friction-reducing member, shown as bearing 3042, fixedly coupled to the first pin body 3040. The bearing 3042 may be annular and may define a circumference of the internal volume 3102. The bearing 3042 may form the internal volume 3102 as a vertical passage or aperture that is centered within the pin passage 3004 and the pin body 3040.

An adapter, sliding member, sliding element, or cup, shown as spring cup 3043, is received within the internal volume 3102. Specifically, the spring cup 3043 is received within the bearing 3042. The bearing 3042 may facilitate relative vertical movement of the first pin body 3040 and the spring cup 3043. Accordingly, the spring cup 3043 may move along a length of the internal volume 3102.

The spring cup 3043 is coupled to the first actuator interface 3035 by a fastener, shown as shoulder bolt 3008. The shoulder bolt 3008 extends laterally through the spring cup 3043 and through an aperture defined by the first actuator interface 3035 of the actuator rod 3009. The shoulder bolt 3008 may be in threaded engagement with a portion of the spring cup 3043 to fixedly couple the shoulder bolt 3008 to the spring cup 3043. The shoulder bolt 3008 may pivotably couple the spring cup 3043 to the end of the actuator rod 3009, such that the spring cup 3043 moves with the actuator rod 3009 as the actuator 3030 extends and retracts.

A biasing element, shown as compression spring 3044, is received within the internal volume 3102 between the threaded pin cap 3012 and the spring cup 3043. The spring cup 3043 defines a first recess that receives a first, lower end of the compression spring 3044. The threaded pin cap 3012 defines a second recess that receives a second, upper end of the compression spring 3044. The compression spring 3044 couples the pin assembly 3100 to the spring cup 3043 and the actuator 3030 while permitting movement of the pin assembly 3100 relative to the first pin assembly 3002. The compression spring 3044 applies an upward biasing force onto the threaded pin cap 3012 that forces the threaded pin cap 3012 away from the spring cup 3043. Accordingly, the compression spring 3044 biases the first pin assembly 3002 upward.

The first pin assembly 3002 further includes a fastener or snap ring, shown as internal circlip 3046, that is received within an annular groove along an inner surface of the first pin body 3040. The annular groove limits vertical movement of the internal circlip 3046. A washer or spacer, shown as spacer 3047, is positioned within the internal volume 3102 between the internal circlip 3046 and the spring cup 3043. Accordingly, engagement between the bottom portion of the spring cup 3043 and the top portion of the spacer 3047 and engagement between and the top portion of the internal circlip 3046 and the bottom portion of the spacer 3047 limit downward movement of the spring cup 3043 relative to the first pin body 3040. Accordingly, the internal circlip 3046 and the spacer 3047 limit extension of the compression spring 3044.

Referring to FIGS. 28 and 33-38, in operation, the actuators 3030 of the first actuator assembly 3018 and the second actuator assembly 3019 reposition the driving pin 62 and turning pin 64 to engage the cart 600. The actuators 3030 may be controlled by the controller 102 (e.g., autonomously, manually, according to a predefined set of instructions, etc.). The actuators 3030 may be independently controlled by the controller 102, such that operation of the first actuator assembly 3018 is independent of operation of the second actuator assembly 3019. By way of example, the actuator 3030 of the first actuator assembly 3018 may reposition the driving pin 62 without requiring movement of the turning pin 64 (e.g., regardless of whether the turning pin 64 is moving or stationary). Similarly, the actuator 3030 of the second actuator assembly 3019 may reposition the turning pin 64 without requiring movement of the driving pin 62 (e.g., regardless of whether the driving pin 62 is moving or stationary).

Throughout operation, a downward force may be applied to each pin assembly 3100 (e.g., on the top surface 3041) to cause compression of the compression spring 3044, permitting the first pin body 3040 to move downward relative to the spring cup 3043. The compression spring 3044 resists this movement so that when downward force is removed, the biasing force of the compression spring 3044 causes the pin assembly 3100 to return to its original position where the bottom portion of the spring cup 3043 is engaged with the internal circlip 3046 and the spacer 3047. Accordingly, the actuators 3030 may raise and lower the driving pin 62 and the turning pin 64, but the driving pin 62 and the turning pin 64 may be forced downward or biased upward without requiring movement of the actuator 3030.

Referring to FIGS. 33-38, a process or method of connecting the cart interface 3000 with the cart 600 is shown according to an exemplary embodiment. The process may be similar to the process used to engage the cart interface 700 with the cart 600, except as otherwise specified herein.

Figure 38:
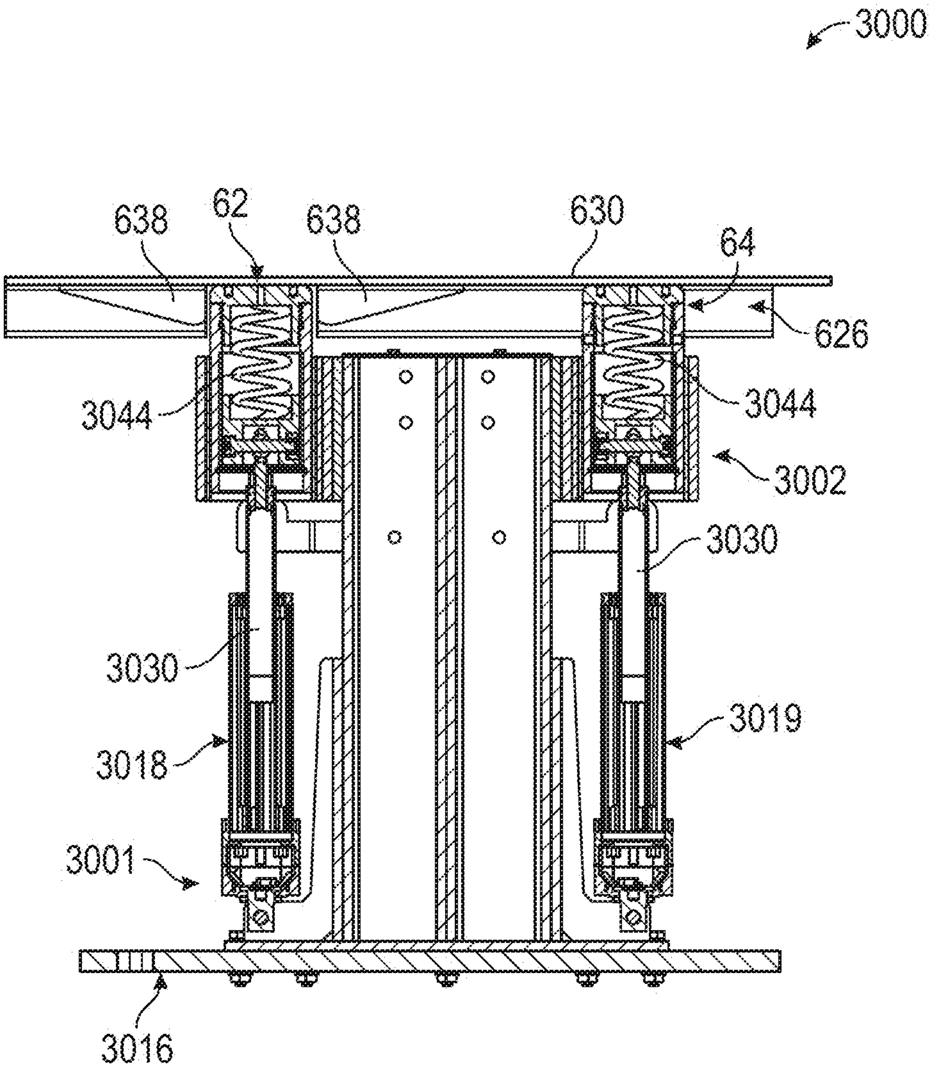
FIG. 38 is a side section view the cart interface of FIG. 25 and the cart of FIG. 14 in a sixth configuration, according to an exemplary embodiment.

Throughout this process, the actuators 3030 move the pin assemblies 3100 to three different positions: a lowered position (e.g., shown in FIG. 33), an intermediate position or engagement position (e.g., shown in FIG. 34), and a raised position or lifting position (e.g., shown in FIG. 38). In the lowered position, the pin assemblies 3100 are offset below the cart 600, such that the vehicle 10 may drive beneath the cart 600 without engaging the cart 600. In the intermediate position, the pin assemblies 3100 are raised to a height where pin assemblies 3100 may be received within the channels 626, but where the pin assemblies 3100 still are not high enough to contact the plate 630. In the raised position, the pin assembly 3100 are raised sufficiently to engage the plate 630.

Figure 33:
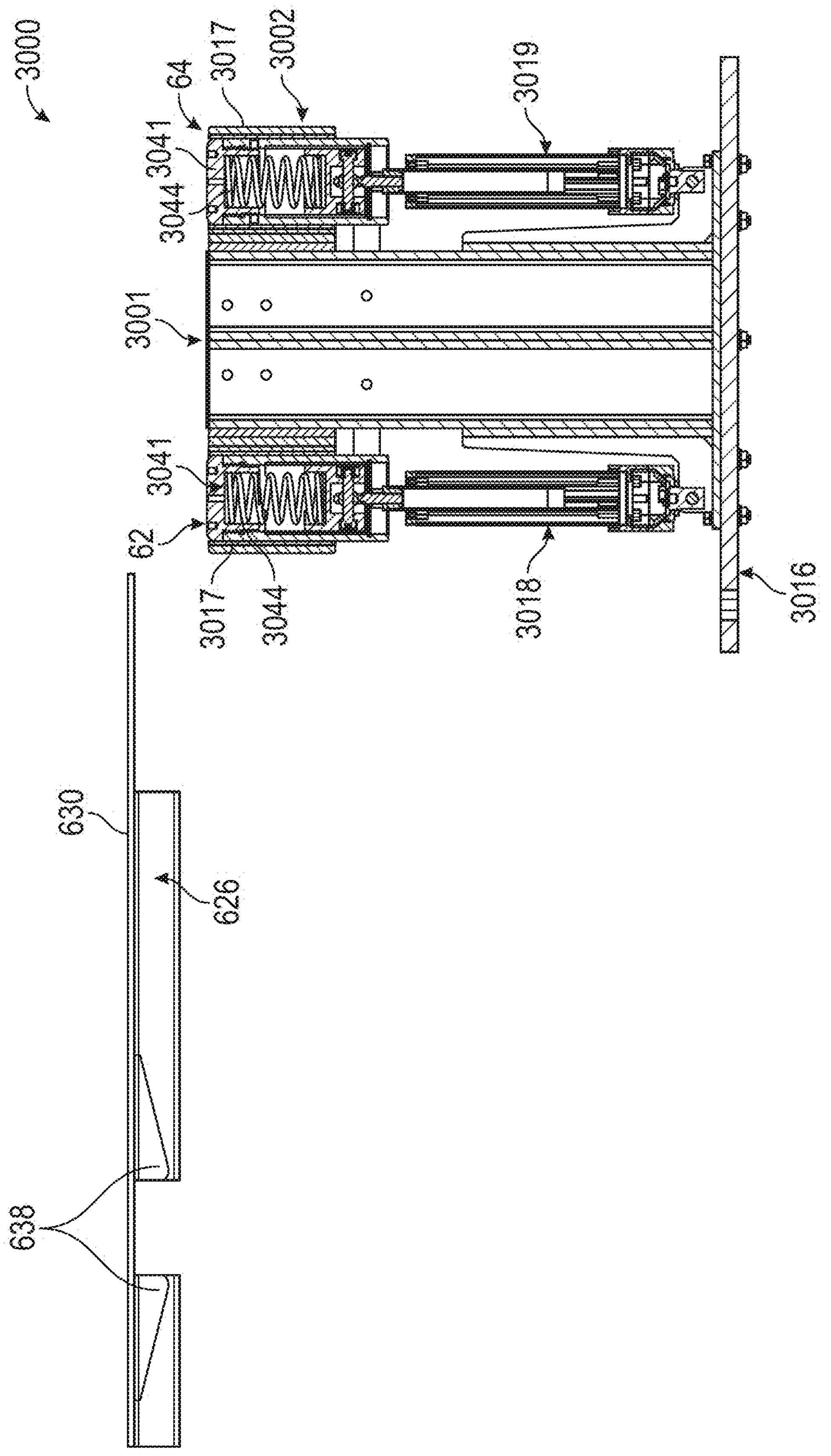
FIG. 33 is a side section view the cart interface of FIG. 25 and the cart of FIG. 14 in a first configuration, according to an exemplary embodiment.

FIG. 33 shows the cart interface 3000 disconnected from the cart 600. In this configuration, the driving pin 62 and the turning pin 64 are in respective lowered positions, which lowers the overall height of the vehicle 10 such that the vehicle 10 can drive freely beneath the cart 600 without coming into contact with the cart 600.

Figure 34:
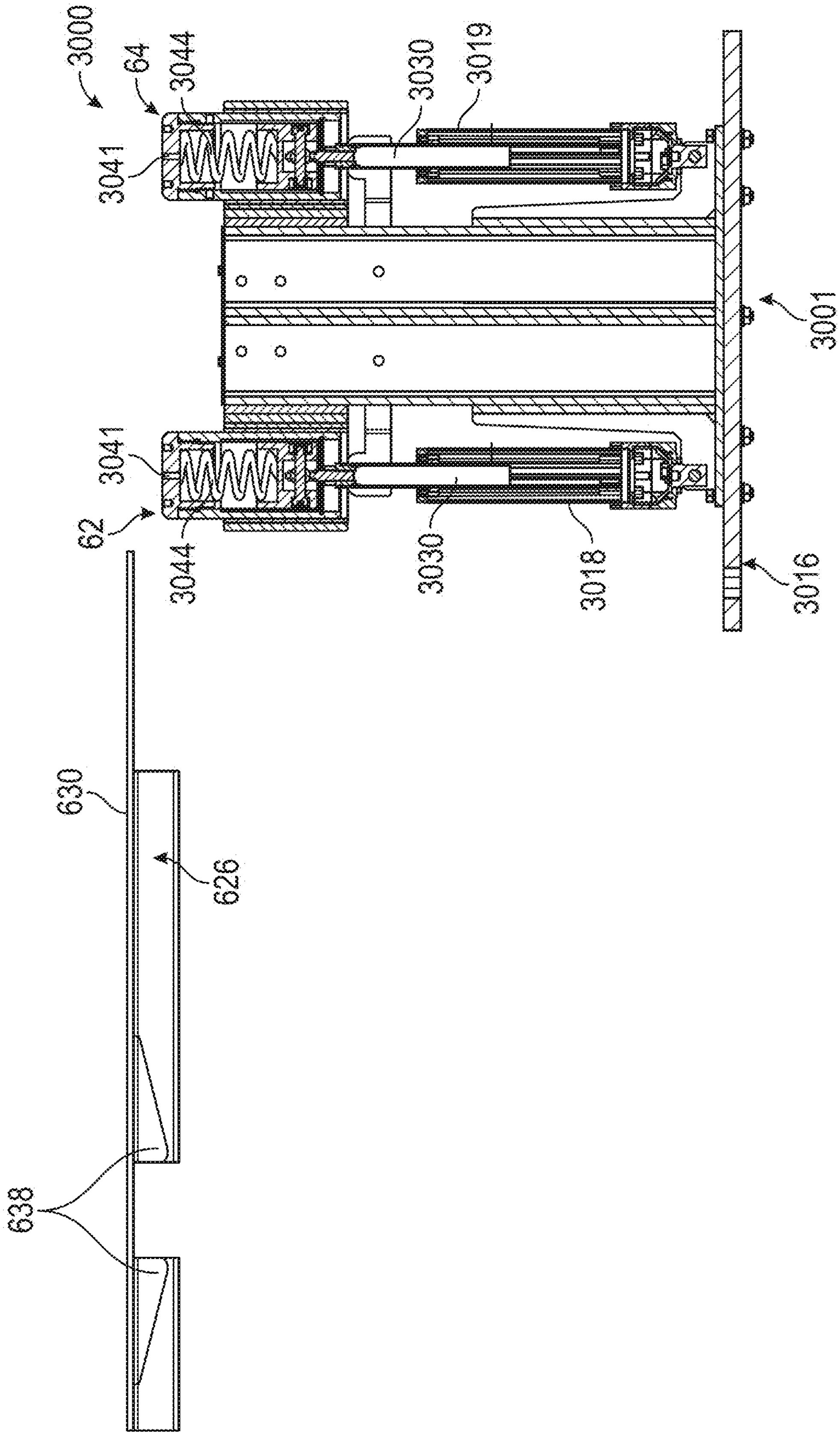
FIG. 34 is a side section view the cart interface of FIG. 25 and the cart of FIG. 14 in a second configuration, according to an exemplary embodiment.
Figure 35:
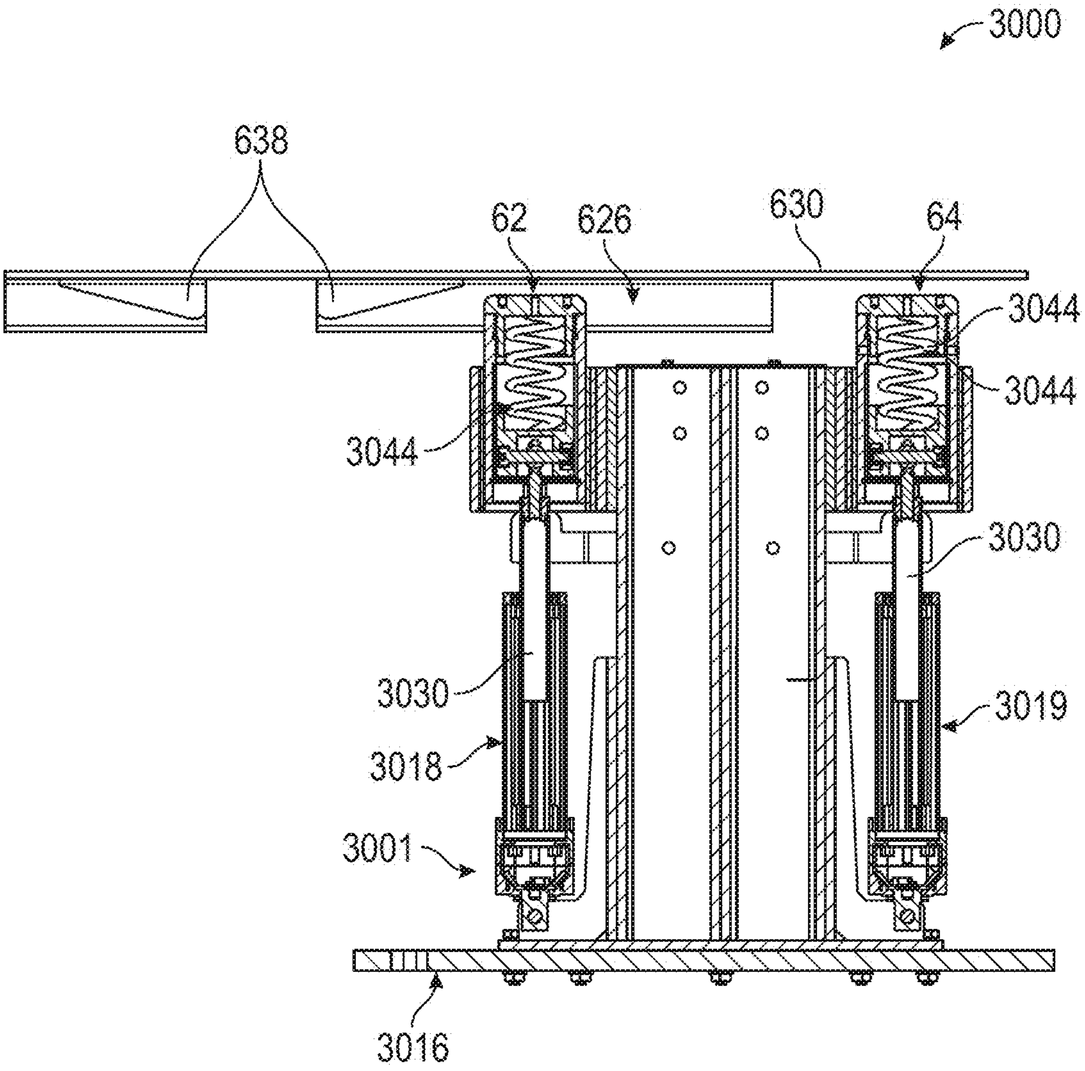
FIG. 35 is a side section view the cart interface of FIG. 25 and the cart of FIG. 14 in a third configuration, according to an exemplary embodiment.

FIG. 34 illustrates the cart interface 3000 separated from the cart 600 with the driving pin 62 and the turning pin 64 raised to the intermediate position. In the intermediate position, the driving pin 62 and the turning pin 64 are at a sufficient height to be received within the channel 626. In the configuration of FIG. 35, the vehicle 10 has driven toward the cart 600, such that the driving pin 62 and the turning pin 64 are received within the channel 626.

Figure 36:
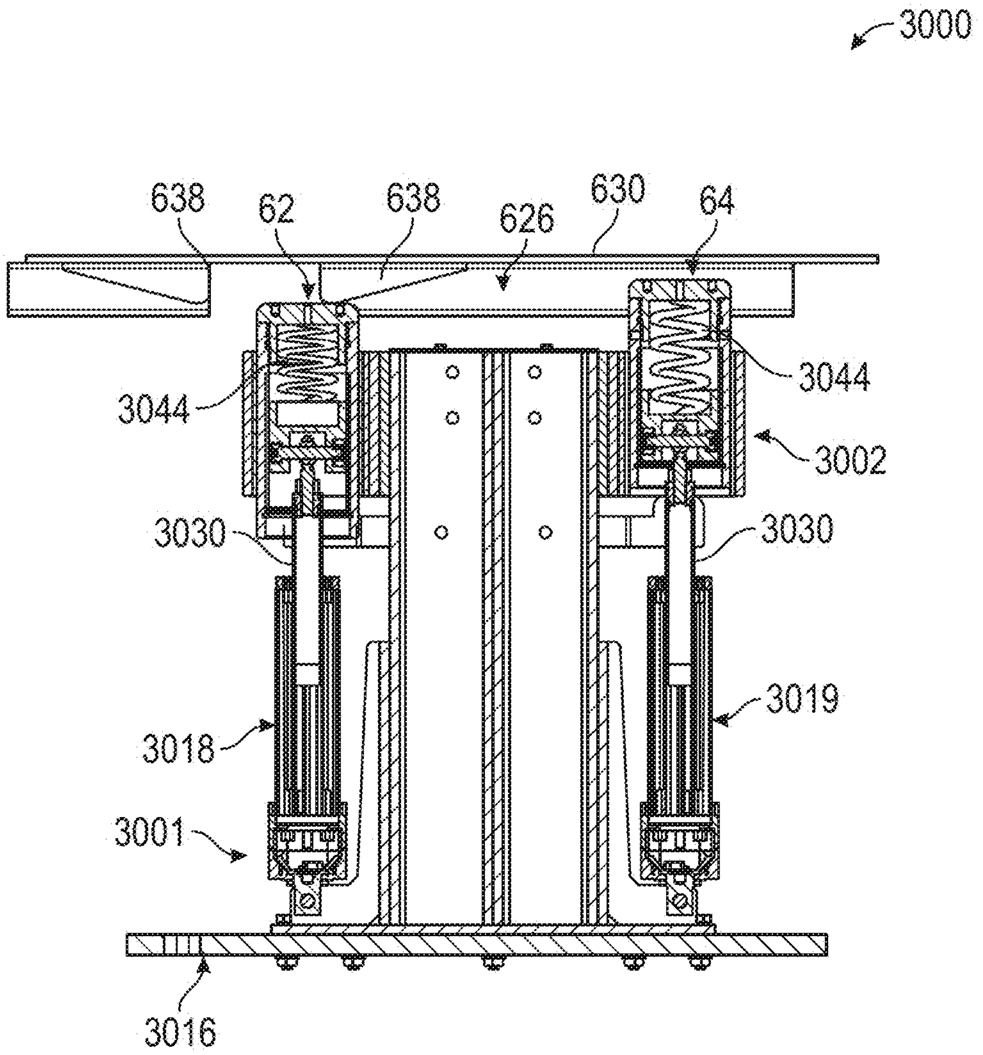
FIG. 36 is a side section view the cart interface of FIG. 25 and the cart of FIG. 14 in a fourth configuration, according to an exemplary embodiment.

In the configuration of FIG. 36, the vehicle 10 is driven forward until the driving pin 62 engages a positioning member 638. The driving pin 62 is forced downward by contact with the positioning member 638, and the compression spring 3044 of the driving pin 62 is forced to compresses, permitting the driving pin 62 to move downward without adjusting the extended length of the actuator 3030.

Figure 37:
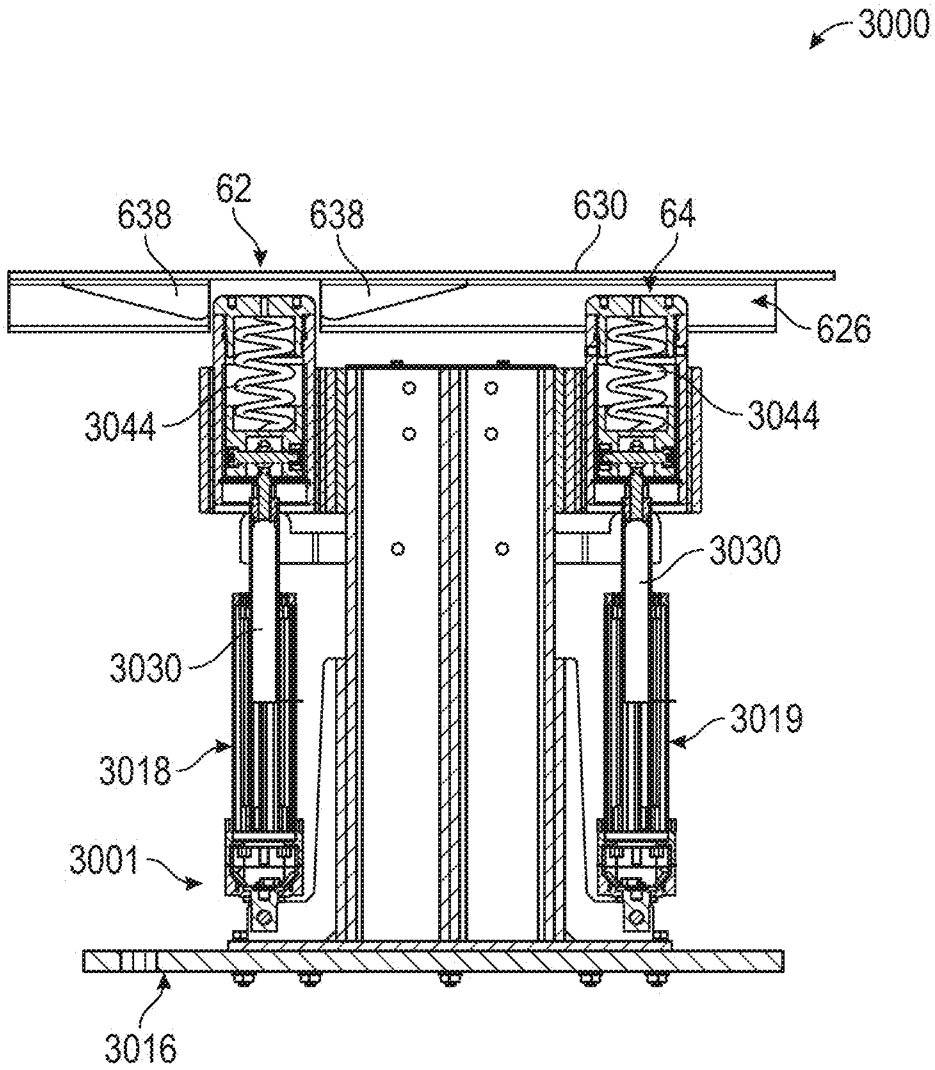
FIG. 37 is a side section view the cart interface of FIG. 25 and the cart of FIG. 14 in a fifth configuration, according to an exemplary embodiment.

In the configuration of FIG. 37, the vehicle 10 drives forward until the driving pin 62 aligns with the space between the positioning members 638. The driving pin 62 is captured between the positioning members 638, and the turning pin 64 is captured within the channel 626, such that movement of the cart 600 relative to the cart interface 3000 is limited (e.g., prevented).

In the configuration of FIG. 38, the driving pin 62 and the turning pin 64 are raised to the raised position, such that the driving pin 62 and the turning pin 64 push upward on the bottom surface of the plate 630. This causes a portion of the weight of the cart 600 and the objects supported by the cart 600 to be supported by the vehicle 10, which in turn increases traction of the tractive elements 44.

To disengage the cart interface 3000 from the cart 600, the actuators 3030 may return the driving pin 62 and the turning pin 64 to the lowered positions. Lowering the turning pin 64 without lowering the driving pin 62 may permit rotation of the vehicle 10 relative to the cart 600 about the substantially vertical axis 636 while still limiting translation of the cart 600 relative to the vehicle 10. Lowering both the driving pin 62 and the turning pin 64 may completely disengage the cart interface 3000 from the cart 600.

As utilized herein with respect to numerical ranges, the terms “approximately,” “about,” “substantially,” and similar terms generally mean +/−10% of the disclosed values. When the terms “approximately,” “about,” “substantially,” and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single-or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the production system as shown in the various exemplary embodiments is illustrative only. Additionally, any element disclosed in one embodiment may be incorporated or utilized with any other embodiment disclosed herein. For example, the cart interface 700 of the exemplary embodiment shown in at least FIGS. 23 and 24 may be incorporated in the vehicle 10 of the exemplary embodiment shown in at least FIGS. 1-6. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A cart comprising:

a chassis including one or more frame members, the chassis including a platform configured to support a product;

one or more casters coupled to the chassis and configured to support the chassis; and a first channel and a second channel coupled to the chassis, the first channel extending along a longitudinal axis and the second channel extending along a lateral axis, the first channel and the second channel each including:

a first guide and a second guide offset from one another and each including a first portion and a second portion, wherein the first portions extend substantially parallel to one another, and wherein the second portions extend away from one another as the second portions extend away from the first portions.

2. The cart of claim 1, further comprising a frame plate extending between the first portion of the first guide the first channel and the first portion of the first guide of the second channel.

3. The cart of claim 2, wherein the first channel and the second channel are positioned below the platform, and wherein a bottom surface of the frame plate is coplanar with a bottom surface of the first guide of the first channel.

4. The cart of claim 1, further comprising one or more legs extending vertically between the platform and the one or more casters.

5. The cart of claim 4, wherein each caster includes a pin reconfigurable between:

a first state in which the caster is prevented from rotating about a vertical axis; and a second state in which the pin permits the caster to rotate about the vertical axis.

6. The cart of claim 1, wherein the first channel is longer than the second channel.

7. The cart of claim 1, wherein the first channel and the second channel each include a flat member extending between the first guide and the second guide and facing downward.

8. The cart of claim 7, further comprising a ramp coupled to the flat member of the first channel and positioned between the first guide and the second guide of the first channel, wherein the ramp is sloped such that the ramp extends downward and away from the flat member of the first channel.

9. The cart of claim 8, wherein the ramp is a first ramp, further comprising a second ramp coupled to the flat member of the first channel and positioned between the first guide and the second guide of the first channel, wherein the second ramp is sloped such that the second ramp extends downward and away from the flat member of the first channel as the second ramp extends toward the first ramp.

10. The cart of claim 8, wherein the first channel intersects the second channel at an intersection point.

11. The cart of claim 10, wherein the ramp is sloped such that the ramp extends downward and away from the flat member of the first channel as the ramp extends toward the intersection point.

12. The cart of claim 11, wherein the ramp is a first ramp, further comprising a second ramp coupled to the flat member of the second channel and positioned between the first guide and the second guide of the second channel, wherein the second ramp is sloped such that the second ramp extends downward and away from the flat member of the second channel as the second ramp extends toward the intersection point.

13. The cart of claim 1, further comprising a cradle slidably coupled to the platform and configured to support the product.

14. The cart of claim 13, further comprising an actuator configured to reposition the cradle relative to the platform between a first position and a second position.

15. The cart of claim 14, further comprising a first switch and a second switch coupled to the chassis, wherein the first switch is configured to control movement of the actuator when operated simultaneously with the second switch, and wherein the second switch is configured to prevent movement of the actuator when the second switch is not being operated by a user.

16. The cart of claim 14, wherein the cradle is a first cradle and the product is a first product, further comprising a second cradle configured to support a second product, wherein the second cradle is fixedly coupled to the platform, and wherein the second cradle extends beneath the first cradle when the first cradle is in the first position.

17. The cart of claim 1, further comprising a hitch extending from a front portion of the cart along the longitudinal axis.

18. A cart comprising:

a chassis;

a caster supporting the chassis;

a first channel and a second channel coupled to the chassis, the first channel extending along a longitudinal axis and the second channel extending along a lateral axis, the first channel and the second channel each including:

a pair of guides each including a first portion and a second portion;

a flat member coupling the guides to the chassis; and a pair of ramps coupled to the flat member, wherein each ramp slopes downward from the flat member; and a frame plate extending between one of the guides of the first channel and one of the guides of the second channel.

19. The cart of claim 18, wherein a bottom surface of the frame plate is coplanar with bottom surfaces of the one of the guides of the first channel and the one of the guides of the second channel.

20. A cart comprising:

a chassis including one or more frame members and one or more support members extending between adjacent frame members;

one or more legs extending downward from the from the chassis;

one or more casters coupled to each of the one or more legs;

a first channel and a second channel coupled to a bottom portion of the chassis, the first channel defining a longitudinal axis and the second channel defining a lateral axis, the first channel and the second channel each including:

a pair of guides each including a first portion and a second portion, wherein the first portions extend substantially parallel to one another, and wherein the second portions are angled to increase a distance between the second portions as the second portions extend away from the first portions;

a flat member coupling the guide to the frame members; and one or more positioning members coupled to the flat member;

one or more frame plates extending between adjacent portions of the first channel and the second channel;

a third channel and a fourth channel coupled to a top portion of the chassis, each of the third channel and the fourth channel configured to receive a cradle;

an actuator coupled to the chassis and configured to reposition the cradle; and a first switch and a second switch coupled to the top portion of the chassis, wherein the first switch is configured to control movement of the actuator when operated simultaneously with the second switch.

* * * * *